(12) United States Patent
Vaara

(10) Patent No.: US 12,439,895 B2
(45) Date of Patent: Oct. 14, 2025

(54) STRUCTURE OF A HONEYCOMB FRAME

(71) Applicant: PARADISE HONEY OY, Kerkkoo (FI)

(72) Inventor: Juhani Vaara, Kerkkoo (FI)

(73) Assignee: PARADISE HONEY OY, Kerkkoo (FI)

( * ) Notice: Subject to any disclaimer, the term of this patent is extended or adjusted under 35 U.S.C. 154(b) by 139 days.

(21) Appl. No.: 17/791,855

(22) PCT Filed: Jan. 11, 2021

(86) PCT No.: PCT/FI2021/050013
§ 371 (c)(1),
(2) Date: Jul. 8, 2022

(87) PCT Pub. No.: WO2021/140280
PCT Pub. Date: Jul. 15, 2021

(65) Prior Publication Data
US 2023/0043828 A1    Feb. 9, 2023

(30) Foreign Application Priority Data

Jan. 9, 2020 (FI) .................................. U20200006
Jun. 16, 2020 (FI) .................................. U20200076

(51) Int. Cl.
*A01K 47/04* (2006.01)
*A01K 47/02* (2006.01)

(52) U.S. Cl.
CPC .............. *A01K 47/04* (2013.01); *A01K 47/02* (2013.01)

(58) Field of Classification Search
CPC ................................ A01K 47/02; A01K 47/04
See application file for complete search history.

(56) References Cited

U.S. PATENT DOCUMENTS

| 3,303,519 | A | * | 2/1967 | Jay | A01K 59/00 |
|---|---|---|---|---|---|
| | | | | | 449/5 |
| 4,234,985 | A | * | 11/1980 | Pierce | A01K 47/02 |
| | | | | | 449/43 |
| 4,639,962 | A | * | 2/1987 | Hogg | A01K 47/02 |
| | | | | | 449/17 |
| 10,729,109 | B1 | * | 8/2020 | Wolfe, II | A01K 49/00 |
| 2014/0024289 | A1 | * | 1/2014 | Fendrik | A01K 51/00 |
| | | | | | 449/42 |

(Continued)

FOREIGN PATENT DOCUMENTS

| CN | 104823879 | | 8/2015 |
|---|---|---|---|
| CN | 104823879 | A  * | 8/2015 |

(Continued)

OTHER PUBLICATIONS

Wang, Translation of CN-104823879, Aug. 12, 2015 (Year: 2015).*

(Continued)

*Primary Examiner* — William L Gmoser
(74) *Attorney, Agent, or Firm* — NIXON & VANDERHYE

(57) ABSTRACT

Disclosed is a new beekeeping-related structure of a honeycomb frame to be emptied while inside a beehive box of a beehive, which enables the honeycomb to be conveniently opened by an opening mechanism to draining position, i.e., to honey extraction position, and thus also to drain it very quickly from honey.

20 Claims, 24 Drawing Sheets

(56) References Cited

U.S. PATENT DOCUMENTS

| | | | |
|---|---|---|---|
| 2014/0370781 A1* | 12/2014 | Anderson | A01K 47/04 449/5 |
| 2017/0280691 A1 | 10/2017 | Lou | |
| 2018/0035651 A1 | 2/2018 | Anderson | |
| 2019/0183098 A1 | 6/2019 | Anderson et al. | |
| 2020/0120902 A1* | 4/2020 | Jeong | A01K 47/02 |
| 2020/0236910 A1* | 7/2020 | Gibson | A01K 47/02 |
| 2021/0084870 A1* | 3/2021 | Yost | A01K 59/04 |

FOREIGN PATENT DOCUMENTS

| | | |
|---|---|---|
| KR | 10-2019-0106179 | 9/2019 |
| WO | 2018/079902 | 5/2018 |

OTHER PUBLICATIONS

International Search Report for PCT/FI2021/050013 dated Apr. 26, 2021, 5 pages.
Written Opinion of the ISA for PCT/FI2021/050013 dated Apr. 26, 2021, 9 pages.

\* cited by examiner

CROSS SECTION A-A

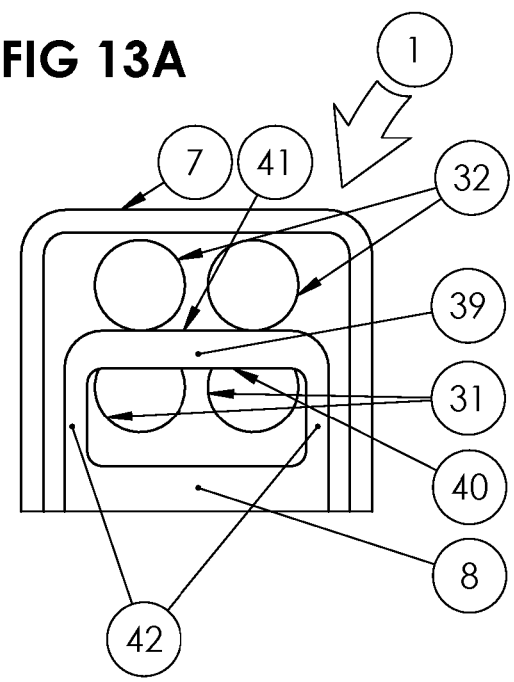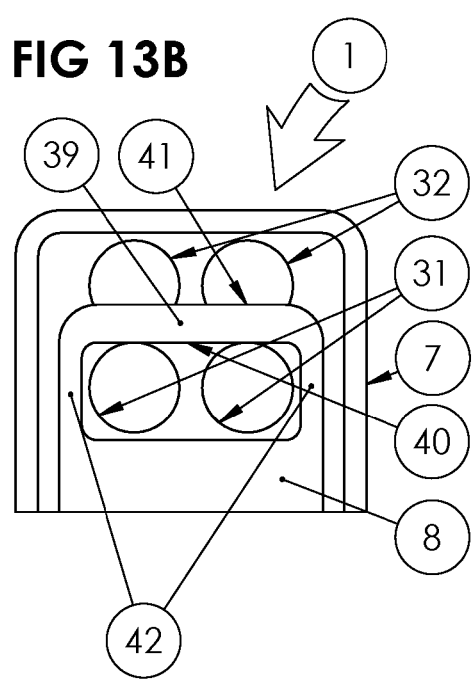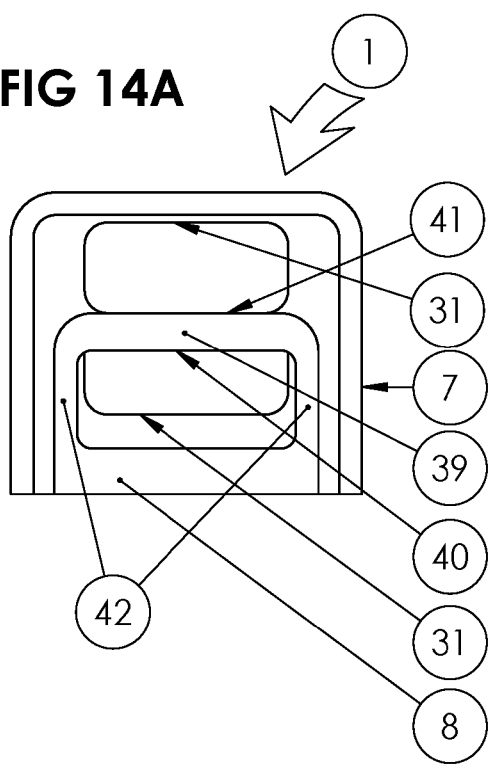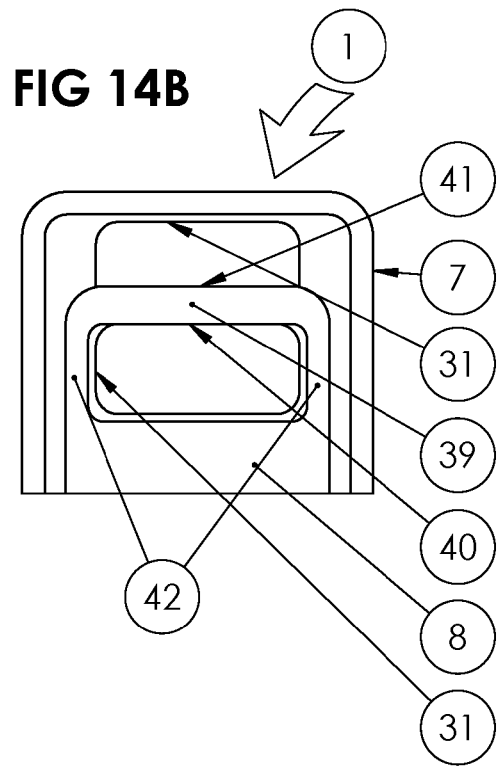

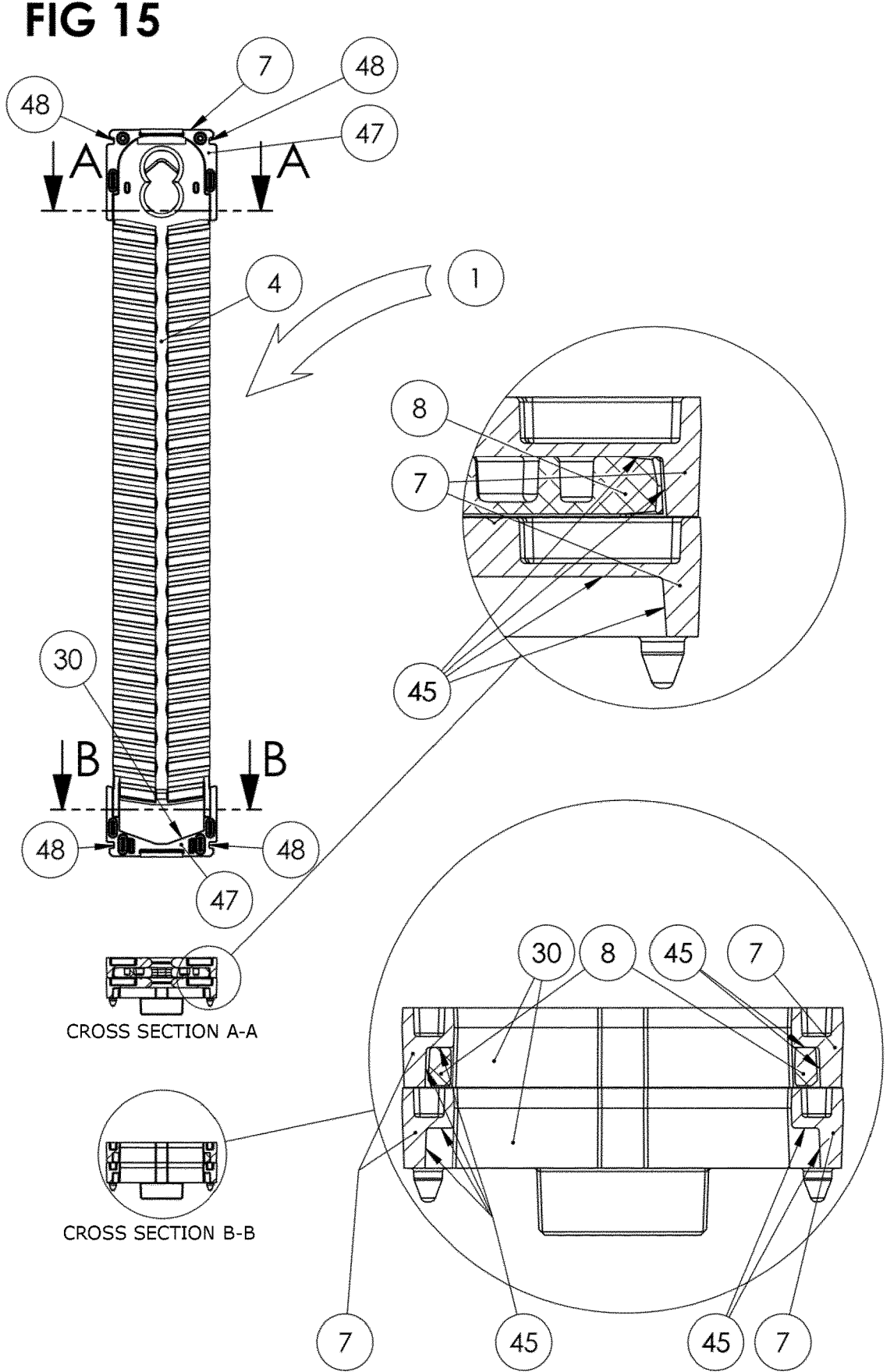

CROSS SECTION C-C

STRUCTURE OF A HONEYCOMB FRAME

This application is the U.S. national phase of International Application No. PCT/FI2021/050013 filed Jan. 11, 2021 which designated the U.S. and claims priority to FI U20200076 filed Jun. 16, 2020 and FI U20200006 filed Jan. 9, 2020, the entire contents of each of which are hereby incorporated by reference.

TECHNICAL FIELD

The subject of this invention is a new structure of a beekeeping-related honeycomb frame, which is emptied from honey while inside a beehive box of a beehive. The new structure of a honeycomb frame enables convenient opening of the honeycomb frame to draining position, which is also called emptying position, and also, it's very fast drainage from honey.

BACKGROUND AND KNOWN TECHNOLOGY

Nowadays in the field of beekeeping exists and is used various different honeycomb frames which are designed to be emptied from honey inside a beehive box and the honey is intended to drain out from the honeycomb frame into some container, such as a can or a bottle.

One problem in the currently known solutions is that the current honeycomb frames, which are designed to be emptied from honey inside the beehive box, drain from honey rather slowly unless the type of honey being drained is liquid-like with its corresponding compositions. This slowness of the draining leads to that the honeycomb frame is left to drain typically for several hours, which results in delay for the beekeepers because the beehives needed to be drained are usually located somewhere else than in the home yard and thus for the user it is not necessarily appropriate to wait on site for the honeycomb frames to drain before the honey can be collected. Alternatively, the beekeeper needs to come again later to the site to collect the honey which can cause additional travelling expenses and also time is wasted too much in travelling back and forth between the beehive locations.

Some currently known honeycomb frames are assembled together using a tightening wire, which is wrapped around the honeycomb frame in multiple locations so that it provides sufficient support when tightened so that it holds the honeycomb frame components assembled together. Typically, a honeycomb frame tightened using this kind of wire does not stay intact when it is for instance tilted enough in which case some components of the honeycomb frame bulge out from the assembly and then immediately the whole honeycomb frame breaks down into its components and it is thus necessary to be again assembled starting from the beginning.

Many current honeycomb frames, which are meant to be drained inside the beehive box of a beehive, are opened using a special opening lever, which when turned, results in the moving parts of the honeycomb inside the honeycomb frame to move to a position in which the honeycomb structure is opened and same time the bee-built wax surface inside the honeycomb cells breaks down. Also, same time a continuous channel extending from the top of the honeycomb to the bottom of the honeycomb is formed into the honeycomb frame. In the open position, which is also called draining position, the honey, which is produced by the bees, can drain down inside the honeycomb and from there into a honey channel located in the bottom of the honeycomb frame and along this honey channel exit the honeycomb frame through a hole located in one of the end bars. A hose or for instance a rigid pipe is typically connected to this hole through which the honey drains out in a controlled manner into for instance a honey jar or some other container.

In the current honeycomb frames one other remarkable problem is that especially using the opening mechanism of the honeycomb frames is challenging for the operator due to the fact that turning the opening lever is a procedure that requires quite a lot of strength. The current new honeycomb frame structure brings a solution also for this problem.

As a default in connection with this invention a honeycomb and more shortly a comb means a honeycomb structure formed by moving and stationary cell forming parts in a honeycomb frame which is meant to be drained inside a beehive box.

SUMMARY OF THE INVENTION

This new invention enables a more simple and effortless functioning of the opening mechanism in honeycomb frames and in addition to that the implementations of this new invention enable opening/draining of the inside beehive box-drainable honeycomb frame remarkably faster than the previously known solutions and thus makes it possible that a beekeeper/user waits on site for couple of minutes and then after that collects the honey from the container into which the honey drained. This new invention is a remarkable improvement with regard to the opening mechanism of all the known inside beehive-drainable honeycomb frame solutions, some of the new features of this invention concerning especially those solutions in which the honeycomb is split in half symmetrically or almost symmetrically from the top corners and bottom corners of the honeycomb cells so that each half of the honeycomb has one vertical sidewall in each honeycomb cell. In addition, some of the features of the new invention suit excellent for use in all existing honeycomb frames regardless of how and from which locations the honeycomb formed by the honeycomb frame is split and in which direction it is regarding the gravity field.

According to one implementation of the invention the vertical sidewalls of the cells of either stationary or moving honeycomb cell forming parts are equipped with tear-shaped drainage apertures, which remarkably facilitate draining of honey out from the honeycomb frame when the honeycomb is in open-position the open-position being also known as draining position. These drainage apertures are formed so that while the honeycomb is in closed position there are no passages formed between any adjacent honeycomb cells. In addition, the tip of the tear in these drainage apertures is shaped to point diagonally downwards and towards the center base frame of either the moving or the stationary honeycomb cell forming part so that draining of honey inside the honeycomb frame is directed downwards and same time inwards towards the middle part of the honeycomb frame reducing the risk of honey draining downwards partially outside the honeycomb. The center base frame in these embodiment examples of the invention forms also the bottom of the honeycomb cells on both sides of the honeycomb in the halves of the honeycomb or in other words in the halves of the honeycomb cells of the stationary honeycomb cell forming parts and the moving honeycomb cell forming parts. Of course, this could be implemented also using some other kind of center base frame to function according to the invention. In this example a drainage aperture comprises the whole vertical side wall apart from the outer edge of the honeycomb into which a side wall is formed which has no drainage aperture because the rigidity of the structure is maintained as such that it endures without warping the forces which load the structure and which result from opening the honeycomb frame. The width of this area measuring from the outer edge of the honeycomb inwards is approximately two to ten times the thickness of the side wall of the honeycomb cells, but of course this width can differ from these dimensions and after minor changes it functions in the same way as the version which is presented in this example. As described above, the tips of the drainage aperture that comprises a particular area, which is rectangular-shaped, are filleted except the lowest tip in the side of the center base frame, which is shaped sharp. The filleted tips are shaped as filleted due to the rigidity and manufacturing of the surrounding nearby area of the drainage aperture so the shape of the aperture can be as well as described above except that all the tips of the aperture are sharp. The drainage aperture is tear-shaped in the examples, but this invention functions still also in the case of some other shape of the drainage aperture, like for instance circular, oval-shaped or some other shape.

In the honeycomb frame, according to one embodiment example, these drainage apertures are positioned to every other side wall of the honeycomb parts or in other words according to one beneficial embodiment example to only the side walls of either the moving honeycomb cell forming parts or the stationary honeycomb cell forming parts, but normally not to both in the same honeycomb frame, because then passages would be formed on the side walls of the honeycomb of the honeycomb frame also in the intact position of the honeycomb frame which is also known as closed position and also as honey collection position. In special cases of the embodiments, which are later more in detail explained, of course the drainage apertures can be placed to both parts, the stationary honeycomb cell forming parts and the moving honeycomb cell forming parts. In such special cases of the embodiments, the drainage apertures are differently shaped in the referred parts due to the fact that in the intact position, also known as the closed position or the honey collection position, the side wall of the honeycomb cells is intact. In other words, if for instance in the moving honeycomb cell forming part is an aperture on a particular location in the side wall, then the side wall of the corresponding honeycomb cell half of the stationary honeycomb cell forming part, which honeycomb cell half is in the same location in vertical direction, is intact so that the formed side wall is intact in the closed position.

The structure of the honeycomb frame, which is according to the invention, comprises at least the opening mechanism, the stationary honeycomb cell forming parts and the moving honeycomb cell forming parts the moving honeycomb cell forming parts according to one embodiment example of the invention including drainage apertures formed as follows: In one beneficial embodiment example of the invention the drainage apertures are shaped to the side wall of the honeycomb in the moving honeycomb cell forming part, which drainage apertures are shaped to start from immediate proximity of the center base frame of the moving honeycomb cell forming part and to end before the outer edge of the honeycomb side wall. In this beneficial embodiment example of the invention the structure of the honeycomb frame also comprises separate end bars, but of course the structure of the honeycomb frame according to the invention can be implemented without these end bars.

A honeycomb frame according to one beneficial embodiment example of the invention comprises honeycomb pairs interlocked together in a row, which together form the honeycomb. One such honeycomb pair comprises a stationary honeycomb cell forming part which is at the same time a part of the base frame of the honeycomb frame, which stationary honeycomb cell forming part can be called for instance a cell frame and in addition, a moving honeycomb cell forming part, which can be called for instance a cell strip, which is placed partially inside this cell frame according to one embodiment example of the invention. The cell strip can be of course placed, depending on the relative shaping of the cell strip and the cell frame, either partially or completely inside a space or a groove shaped to the cell frame or on the other hand in the case of one other embodiment example of the invention even completely outside the cell frame so that the cell strips are supported to the cell frames and movable relative to the cell frame according to a certain limited movement path for instance with the help of a special guiding groove or a special guiding protrusion shaped to the cell frame and a correspondingly shaped guiding locking protrusion or a guiding locking groove the guiding locking protrusion being placed into the guiding groove which interlocks each cell strip to each corresponding cell frame. So, the cell frame stays always stationary relative to the honeycomb frame and the cell strip can move according to its allowed and limited movement path usually in the vertical direction, which movement path is defined by how much it is possible for the cell strip to physically move inside the space which is reserved for it. In addition, in this beneficial embodiment example of the invention the cell strip is supported to be attached to the cell frame so that it can move, for instance, with the help of a guiding locking groove or a similar arrangement only in one direction even though the opening mechanism would sometimes twist or push the cell strip momentarily also towards some other direction. In addition, in one beneficial embodiment example of the invention the cell strip is placed into a groove, which is shaped to the cell frame, and in addition a protrusion is shaped to that surface of the cell frame which is located against the cell strip and for this protrusion a counter groove is shaped to the cell strip and into which counter groove the protrusion fits so that the cell strip can move to its upper position and to its lower position without the protrusion touching the cell strip at any stage during the movement or would prevent the cell strip from moving. This is especially beneficial while a honeycomb frame according to the invention is being assembled in which stage due to the protrusion and the counter groove it is not possible to place a cell strip incorrectly the wrong way into the groove of a cell frame, which groove is a space reserved for the cell strip, but only so that the protrusion of each cell frame protrudes into the counter groove of each cell strip in the case of each honeycomb pair. Of course, this protrusion and counter groove can be implemented also so that the protrusion is shaped to the cell strip and the counter groove is shaped to the cell frame in which case the structure according to the invention also functions as it has been described to function in the descriptions of the embodiments of the invention. Of course, there can be one or more pairs of these protrusions and counter grooves in a cell strip and a cell frame which are according to the invention.

A Honeycomb frame according to one beneficial embodiment of the invention comprises cell strips and cell frames of a honeycomb frame, which is meant to be drained inside a beehive box, and end bars of a honeycomb frame, which is meant to be drained inside a beehive box, and an opening mechanism, which in this beneficial embodiment example of the invention is a cross sectionally round shaft, which, for instance, is attachable to a cordless drilling machine or to some other electrically operated tool, which produces rotating motion, the free end of the shaft having a sharp conical shape. At least one of the end bars is equipped with two vertically on top of each other aligned guiding holes of the opening shaft in the upper portion of the end bar and also the cell frame is equipped with similar guiding holes of the opening shaft. In one beneficial embodiment example the cell strip is equipped with a hexagonal-shape guiding aperture through which the opening shaft is pushed when the honeycomb frame is opened.

In this beneficial embodiment example of the invention the opening mechanism of the honeycomb frame functions as follows: When the honeycomb frame is opened from the honey collection position to the draining position, the opening shaft is pushed from outside the honeycomb frame and beehive box into the frame through a first guide hole while the opening shaft is rotated around its longitudinal center axis with, for instance, a cordless drill machine. While the opening shaft protrudes deeper inside the frame, the sharp conical-shaped free end protrudes one at a time through all the first guide holes of the cell frames and also one at a time through all the hexagonal-shaped guiding apertures of the cell strips, at which point the two topmost sides of the hexagonal-shaped guiding aperture, that is, two first edges touch the surface of the opening shaft and eventually the opening shaft moves the cell strip in question upwards by pushing these two first edges. The hexagonal guiding aperture of the cell strip and the circular guide holes of the cell frame are shaped so that when the opening shaft is in a guide hole and is the size of its normal base diameter at that point on the opening shaft which pierces the guide hole in question, each adjacent cell strips have been moved up to the draining position. Thus, when rotating the opening shaft and simultaneously pushing it deeper inside the frame, opens each cell strip to the draining position one at a time. The rotation of the opening shaft while opening reduces the required force, which is needed when the user pushes, for instance with the help of a cordless drilling machine, the opening shaft forward inside the honeycomb frame. In this example the opening shaft can be rotated in either rotation direction the same action, that is, the honeycomb frame opening to the draining position still being realized. When the honeycomb frame is in honey collection position, bees build the interior walls of the honeycomb, which forms inside the honeycomb frame while it is in honey collection position, by coating the honeycomb cell surfaces with beeswax and by polishing those beeswax-coated surfaces before starting to produce honey so, the pushing force needed to open the honeycomb to the draining position varies naturally case-by-case depending on how tight the cell strips are attached to the cell frames due to the honeycomb building and finishing work done by the bees. This getting stuck is greatly affected by, among other factors, the prevailing temperature inside the beehive.

Also, it is mentioned that when opening a honeycomb frame, which is equipped with a structure according to the invention, with the help of a cordless drilling machine to the draining position, in some cases it is beneficial to use the impact function of the cordless drilling machine while opening so that the stuck cell strips move easier to the draining position.

In one beneficial embodiment example of the invention an internal thread has been shaped to the first guide holes and two second guide holes of the cell frames, which thread comprises at least a part of the surface inside the holes in question. An external axial thread, which fits the internal thread, has been shaped to that area of the surface of the opening shaft, which has the normal base diameter of shaft and starts from the conical-shaped end, the thread being shaped to extend simultaneously through one or more consecutive cell frames. The pitch and the shape of the thread and also the pitch and the shape of the conical-shaped free end is in this beneficial embodiment example such that when the opening shaft moves forward by a distance of one pitch inwards into the honeycomb frame, the opening shaft moves simultaneously one or more cell strips to the draining position or to the honey collection position. Then when opening the honeycomb frame to the draining position while rotating the opening shaft by, for instance, using a cordless drilling machine and simultaneously pushing the opening shaft more inwards into the honeycomb frame and while the thread of the opening shaft being mounted on a thread of one or more cell frames, this formed threaded mechanism pulls then the opening shaft by a length of one pitch inwards into the honeycomb frame during each one full rotation cycle of the opening shaft around its own axis so this threaded structure reduces the user generated pushing force needed to push the opening shaft into the honeycomb frame. In one other beneficial embodiment example of the invention the opening shaft is equipped with otherwise similar thread on its surface, but the conical-shaped free end of the opening shaft is equipped instead of a thread on the conical surface as in the previous example, a smooth, conical and not-threaded surface. The pitch of the thread in these embodiment examples is such that during one full rotation cycle around its longitudinal axis and while being set/mounted on the thread, the opening shaft moves forward inside the honeycomb frame by one thickness of the cell frame, but of course in many cases it is beneficial to shape the pitch of the thread so that it differs from the pitch which is presented in this example. In one other embodiment example the first edges of a guider protrusion of the cell strips, which guider protrusion is later explained more in detail, form at least part of this same thread as internal thread inside a hole, with which same, but external shaft thread the surface of the opening shaft is equipped with. In this embodiment the threaded area of the cell strip and the first guide hole form in the draining position together a threaded and at least partial aperture in which formed aperture there is a continuous thread onto which the opening shaft is set/mounted and correspondingly in the honey collection position this at least partially threaded aperture of the cell strip and a second guider hole of the cell frame form an aperture with a continuous thread and onto which the opening shaft is set/mounted. In one beneficial embodiment example in the cell strip or in the cell frame or in both at least one guide hole or aperture or a guide aperture, of which at least one is shaped at least partially threaded, is made of different material and is a separate part which is mounted in its place, which separate part can be made of, for instance, a material which is remarkably more durable than the other parts of the honeycomb frame.

Also, in one beneficial embodiment the first guide hole forms together with a guider protrusion a threaded and at least partial hole, which consists of two parts, the thread of which is formed into the formed shape only in the draining position and correspondingly the second guide hole forms together with the guide protrusion a threaded and at least partial hole then when the cell strip in question is in the honey collection position.

In addition, in one embodiment the opening shaft is equipped with a partial discontinuous thread.

The conical surface of the opening shaft in the free end is also in some beneficial embodiments shaped so that the conicity of the shape varies in different locations of the free end, for instance in one beneficial embodiment so that the conical shape is gradual, that is, the diameter of the cross section increases slowly in the tip, that is, in the apex of the conical shape so that initiating the movement of each possibly stuck cell strip is done using a small force and a longer pushing movement and after this when the cell strip is in motion, it moves to another position, that is, to the draining position or honey collection position faster due to the conicity of the conical shape of the free end changing to steeper so that when using the same or shorter pushing movement, the cell strip moves a longer distance in its groove/space. It is mentioned for clarity that initiating the movement of each cell strip starting from the state/position into which it is stuck to, is the procedure that requires the greatest amount of force from the user. After releasing from being stuck, each cell strip of course moves in normal use and in ordinary beekeeping circumstances freely in its movement space although of course so that friction between the components of the honeycomb frame still resists the movement of the cell strips and also this movement is resisted by, for instance, friction caused by honey located inside the honeycomb frame and/or some other phenomenon that generates motion resistance.

In one beneficial embodiment of the invention the structure according to the invention also comprises end bars in both ends of the honeycomb frame. To one of these end bars a first guide hole and a second guide hole has been shaped and into these mentioned guide holes a thread has been shaped inside. In this embodiment the cell frames and other structures, which are pierced by the opening shaft, a thread is not needed when the thread of the opening shaft is so long that it still reaches also while piercing the whole honeycomb frame on to the thread of the mentioned guide holes. Of course, this can be implemented also, for instance, so that both end bars are equipped with both guide holes, the first guide hole and the second guide hole or, for instance, so that the in one end there is a first guide hole in the end bar and in the other end there is a second guide hole in its end bar.

It is mentioned also that the structure according to the invention functions as it is described to function in the case of any possible different combination of different embodiments of the invention.

In one embodiment example of the invention the draining position of a honeycomb frame, the structure of which being according to the invention, is, unlike in the previous examples, in the lower extreme position of the movement path of the cell strip and thus correspondingly the honey collection position is then in the upper extreme position. Then switching to the honey collection position from the draining position is realized by pushing the opening shaft into the second guide hole and the switching from the honey collection position to the draining position is realized by pushing the opening shaft into the first guide hole. For a person skilled in the art, it is clear after seeing all the different embodiments of this invention that in which position the draining position and honey collection position are located depends on how the cell frame and the cell strip of a honeycomb frame, the structure of which is according to the invention, are mutually shaped.

In one beneficial embodiment example of the invention the edges of the cell strip, which touch the opening shaft, are shaped so that when the guide holes are located vertically aligned and arranged on top of each other and when the honey collection position is located in the lower extreme position of the cell strip, a honeycomb frame according to this embodiment is turned to the honey collection position from the draining position by pushing the opening shaft into the second guide hole and correspondingly turning to the draining position from the honey collection position is done by pushing the opening shaft into the first guide hole. This action is implemented so that a cell strip according to this embodiment example is equipped, in addition to a horizontal upper edge located vertically between the guide holes, with a bypass aperture located below this upper edge and having a diameter of at least the same as the outer base diameter of the opening shaft. When moving a cell strip downwards from draining position to the honey collection position, the opening shaft, which then is located inside the first guide hole, touches first the upper edge/upper surface of the cell strip. When moving a cell strip from the honey collection position to the draining position, which in this example is when moving a cell strip upwards, the opening shaft, which is in the second guide hole, touches now the upper edge of the mentioned bypass aperture and because of this the opening shaft pushes now upwards the cell strip in question. The guide holes of course do not necessarily need to be located arranged on top of each other, for instance in one beneficial embodiment of the invention there are still two guide holes in the cell frames, a first guide hole and a second guide hole, but they are, unlike in the previous examples, located horizontally aligned side by side and in one embodiment comprising also the end bars, the guide holes are also located horizontally aligned and side by side in at least one of the end bars. This way implemented correspondingly the cell strips are moved from the honey collection position to the draining position by pushing the opening shaft into the first guide hole and moved from the draining position to the honey collection position by pushing the opening shaft correspondingly to the second guide hole. When arranged horizontally the guide holes can be named, for instance, as the left guide hole and the right guide hole. When the opening shaft is pushed into one of the guide holes, it is arranged to touch the cell strip so that it pushes the cell strip downwards and correspondingly when the opening shaft is pushed into the other guide hole, it is correspondingly arranged to touch the cell strip so that it pushes the cell strip upwards. Of course this mutual positioning of the guide holes can still differ from these examples, for instance aligned inline in a 45 degree angle from horizontal or for instance the first guide hole located in the lower portion of the cell frame and/or the end bar and the second guide hole in the upper portion of the cell frame and/or the end bar or the other way or of course in some other way differing from this and still this invention functions as this invention is described to function in the descriptions of its beneficial embodiment examples.

A honeycomb frame according to the invention is intended to be opened and drained inside a beehive box of a beehive in draining event, but it is also possible to be opened if needed outside the beehive box, for instance when placed on a table and supported by hand if needed. In addition, when talking about the moving parts of the honeycomb, that is, the cell strips, by that it is meant that the moving part of the honeycomb moves relative to the stationary part of the honeycomb, that is, the cell frame only then when the honeycomb frame is opened to the draining position, that is, the emptying position and then when the honeycomb frame is closed to the intact position, that is, the honey collection position. Otherwise also the moving part of the honeycomb, that is, the cell strip is of course, despite its name, stationary in the honeycomb frame while the bees produce honey at any time other than the time of the draining event of the beehive.

In a honeycomb frame the parts of the honeycomb are according to one embodiment connected to each other. In one beneficial embodiment example of the invention this is implemented so that the cell frames are connected to each other with the help of fastening brackets and its counter brackets of which both are shaped to the cell frames. These fastening brackets and counter brackets are according to an accompanying embodiment example of the invention shaped to the lower end and the upper end of the cell frame or in other words to both ends thus meaning that there are two fastening brackets and two of its counter brackets, which in this example have been shaped to have the same shape, but of course they could be shaped to have different shapes and of course they could be located in different locations of the cell frames and still the same action would be achieved. Of course, this quantity and location of the fastening brackets can differ from this example, for instance, the quantity could be four or six of them. In this example two fastening brackets are sufficient for achieving sufficient rigidity of the assembled honeycomb frame. In this beneficial embodiment example of the invention for easy positioning of the fastening brackets and counter brackets and for additional rigidity the cell frames are, in addition to the fastening brackets, equipped with positioning pins for which positioning pins there are holes in the cell frames into which holes the positioning pins are pushed tightly when the cell frames are connected to each other. All these the fastening brackets and their counter brackets and the positioning pins and their related components can be also called fastening members in this invention. These fastening brackets and their counter brackets can be called also using spoken language expressions as clip fastening method. The fastening members include also other ways of fastening the cell frames to each other, such as the earlier-mentioned fastening using a wire and, for instance, fastening using screws and, if needed, also with threaded holes or locking nuts or even, for instance, with the help of a threaded bar or, for instance, with the help of an elastic rubber band or some other elastic rubber band-like member, which tightens the cell frames and the end bars, if equipped with end bars, to each other or with the help of a spring-like tightening member or fastening with the help of a spring-loaded locking member, for instance, a rail, but in this context these are called traditional fastening members and the parts of the clip fastening method are called the fastening members. The mentioned new clip fastening method is a remarkably handier way of assembling the honeycomb frame and also, if needed, a remarkably handier way to disassemble it if, for instance, some component of the honeycomb frame would need to be replaced with a new one. A honeycomb frame according to the invention is disassembled into parts, if needed, by opening the clip fastening joints, that is, by pressing or bending the fastening bracket downwards, for instance, with a screwdriver or a similar tool and at the same time pulling the parts of that particular fastening bracket connection apart from each other. This is handy to do so that the fastening connections are opened one end at a time, that is, for instance, first the upper end of the cell frame and after that the lower end is opened so that each fastening connection formed by a fastening bracket and a counter bracket is opened in a controlled manner and so that none of the parts break while opening the fastening connections. It is to be noted in this that especially the fastening bracket has been shaped to be flexible and it is made of flexible material so that it can be bent downwards, that is, towards the honeycomb so that the mating surface of the fastening bracket does not touch anymore the counter bracket of an adjacent cell frame or an end bar and thus then each fastening connection formed by a fastening bracket and a counter bracket is disassemblable when the adjacent components, which are equipped with fastening members, are pulled apart from each other and at the same time the outer edges of each fastening bracket are pushed downwards, that is, in this example always towards the honeycomb. In one beneficial embodiment of the cell frame when disassembling the honeycomb frame, the downwards pushing of the fastening bracket in the upper end of the cell frame and upwards pushing of the fastening bracket in the lower end of the cell frame is due to the fact that in this example the connections formed by the fastening brackets and the counter brackets are made to open when a fastening bracket is pushed towards the honeycomb of the honeycomb frame. Of course this interlocking of the cell frames and the end bars to each other could be implemented in some other way, for instance, also so that the fastening brackets are pushed to the other direction, that is, away from the honeycomb when, for instance, with the help of a flat-headed screwdriver the fastening bracket could be bent towards away from the honeycomb when a gap or some other shape is shaped between the fastening bracket and the counter bracket into which gap or some other shape the tip of the flat-headed screwdriver can be pushed and which gives a fulcrum point which gives support for bending the fastening bracket with a screwdriver.

A honeycomb frame according to the invention is in one beneficial embodiment example of the invention equipped for additional rigidity also with a special locking part in the top ends and bottom ends of the honeycomb frame. For this locking part grooves have been shaped on both sides of the cell frame to the top end on both vertical outer side surfaces and to the bottom end on both vertical outer side surfaces so that locking part locks the cell frames in vertical direction so that small possible variations in the dimensions of the fastening members do not affect the dimensions of the honeycomb frame in vertical direction or in other words that the honeycomb frame does not deform by hanging due to its own weight slightly lower around the center of the honeycomb frame than the ends of the honeycomb frame. A honeycomb frame is supported in one example the same way as an ordinary honeycomb frame is supported at its ends in a beehive box, but in one other beneficial embodiment example the honeycomb frames in a beehive box are supported also at the center of the honeycomb frame. Of course, some other way of supporting works for the positioning of this honeycomb frame and for supporting it inside a beehive box.

The lower end and the bottom end of the parts of the honeycomb frame means that end in which the honey draining channel, that is, the honey channel, which has been shaped to the cell frames, is located and the upper end and the top end of those parts means the opposite end of those parts in which according to several embodiment examples the first guide hole and the second guide hole of the opening mechanism and also the guiding aperture of the cell strip and guide protrusion are located.

In addition, it is mentioned that in the accompanying beneficial embodiment examples of the invention the first and second guide holes are placed to only one of the end bars, but based on the embodiments of the invention it is of course clear that the same structure can be implemented also by placing the guide holes to the other end bar in the other end of the honeycomb frame or to both end bars in which latter case the opening of the honeycomb frame can be executed from which ever end of the honeycomb frame. When the opening shaft is pushed into the first guide hole while the honeycomb is in the honey collection position, the opening shaft opens the honeycomb of the honeycomb frame to the draining position and when the opening shaft is pushed into the second guide hole, the honeycomb correspondingly closes back to the honey collection position. This closing to the honey collection position with the help of the opening shaft is necessary because due to friction caused by beeswax located inside the honeycomb cells the moving parts of the honeycomb do not move with the help of gravity automatically downwards back to the honey collection position.

It is worth mentioning also in connection with the embodiment examples of this invention that the new honeycomb frame, which is according to the invention, is intended to be opened and thus also to be drained inside a beehive frame box of a beehive, but of course it is possible to be opened also outside the beehive frame box, for instance, when placed on a table and supported by hand if needed.

Also, it is mentioned for clarification that in connection with this invention vertical means the direction of the height of the beehive frame box as how it is understood when used in a beehive and lateral direction means that direction in which ordinary honeycomb frames normally form a queue when placed in a row in a beehive frame box. Correspondingly in connection with this invention the length direction means the length direction of a top bar of an ordinary honeycomb frame or in other words that direction in which the ordinary honeycomb frames form a row when placed in a beehive box. The above-mentioned directions refer to directions when the honeycomb frames according to the embodiments are in a beehive in a position in which they are ready for operation for producing honey resulting from the activities of the honey bees.

It is mentioned that the bees are generally not bothered even if the walls of the honeycomb cells or some portions of the walls of the honeycomb cells are deformed and contain, for instance, small protrusions or notches or some other deformities due to, for instance, the drainage apertures according to this invention, which are shaped to the vertical side walls of the honeycomb cells, and the edges of these drainage apertures. The bee will patch/fix these deformities in the honeycombs itself so that the honeycombs will become correctly shaped for the bees.

This new structure of a honeycomb frame is also remarkably easier to wash with water than the previously known structures of the honeycomb frames in case the washing is needed occasionally, because the drainage apertures of the walls of the honeycomb improve also the flow of water inside the honeycomb of the honeycomb frame resulting in the ventilation enabled by the apertures and the draining of water bringing in benefit in the hygiene of the beehive and also it is clear that utilizing this invention in the currently known honeycomb frames can require of course some changes in the geometry of the components of the honeycomb frames so that the geometry according to the embodiments of the invention can be implemented to a honeycomb frame. It is mentioned that in normal use there is no need to wash the honeycomb frame when the bees are healthy.

In one beneficial embodiment example of the invention the structure of the honeycomb according to the invention includes also end bars in both ends of the honeycomb frame. The honeycomb frame according to the invention is of course possible to be shaped so that it can be assembled and it functions without any end bars in which case a honeycomb frame, the structure of which being according to the embodiments of the invention, includes an outlet pipe which is connected to the honey channel located in the lower portion of the honeycomb frame. The outlet pipe extends to outside the beehive box and thus outside the beehive and in addition the other end of the honey channel is pluggable with a plug if needed and also in that case the supporting of the honeycomb frame, the structure of which being according to an embodiment of the invention, to the correct position inside a beehive box is implementable with the help of shaping other suitable components of the beehive.

In one beneficial embodiment example of a beehive, which is equipped with honeycomb frames the structure of the honeycomb frames being according to the invention, there are in total seven honeycomb frames in a beehive box. The beehive of this embodiment example comprises as components of the beehive at least a bottom part of the beehive, a lowest beehive box, which is the brood box, and a special intermediary bottom part, which is located on top of the lowest beehive box, a beehive box, which is located on top of the intermediary bottom part and including seven honeycomb frames, the structure of whose being according to the invention, an intermediary platform located on top of the beehive box, a lid located on top of this intermediary platform, a funnel recessed/embedded into the intermediary bottom part and a honey tank, which honey tank is located in this example physically outside the beehive. In this example the honey drains along the honey channel of a honeycomb frame, the structure of which being according to the invention, out through a honey aperture, which has been shaped to an end bar of one end of the honeycomb frame, into a honey funnel and the honey funnel directs the honey into a honey tank, which is located outside the beehive, through an inlet aperture of the honey tank. In this embodiment the honey funnel is embedded inside the intermediary bottom part so that its height is as little as possible so that requirement for space in the vertical direction for the intermediary bottom part in the beehive is as little as possible. In addition, in this embodiment the intermediary bottom part is also an access control part for the bees, into which part a special bee access control component, through which the bees can enter and exit the beehive, can be installed. In this embodiment the function of the intermediary platform is to protect the honeycomb frames inside it and in some embodiments the intermediary platform functions also at the same time as an intermediary bottom part for the upper beehive box when another beehive box containing honeycomb frames is placed on top of the intermediary platform in which case also conveniently a honey funnel can be arranged onto the upper surface of the intermediary platform for emptying the honeycomb frames of the upper beehive box.

In addition, as a beneficial embodiment example the beehive box of the earlier mentioned example, inside which box the honeycomb frames, the structure of which being according to the invention, are located, is equipped with viewing windows through which the user can watch the draining of the honey and the bees working inside the beehive. A viewing window can be placed to one end of the beehive box or to both ends or to a side of the beehive box or to both sides. That is, the number of viewing windows in a beehive box can be one to four pieces in this example. Of course, in one side or one end there can be more than one smaller viewing windows, but the most beneficial option for the viewer is one large viewing window. In addition, in one embodiment the beehive box is also equipped with means for closing the viewing window while it is not used for watching the bees. A window cover, which closes tightly each viewing window, can be installed to the viewing window so that it stays in the aperture comprising the viewing window without any additional means for holding it there due to tight clearance between the viewing window aperture and the viewing window cover, but in one embodiment example for easier installation and removal of the viewing window it is also held in place in the mentioned aperture with two viewing window cover retainers, which viewing window cover retainers are placed symmetrically on both sides of the window horizontally inline near the upper tips of the rectangular-shaped aperture formed by the viewing window. Of course, these window cover retainers can be placed also in some other position which differs from this example and in addition of course the shape of the aperture of the window, that is, the viewing window can differ from this example. Each window cover retainer is supported to those sides and/or ends of the beehive box into which the viewing windows are shaped with the help of a locking pin which extends through the window cover retainer and is embedded into a shaped hole and which locking pin allows rotational movement for the window cover retainers. Of course, this window cover retainer can be shaped to function differently than what is shown in this example and the shape of the window cover retainer can differ from this example. In this example the viewing window can be held open without the window cover in question safely for watching the bees working because between the viewing window and the honeycomb frames inside the beehive is a transparent window sheet, which is not normally removed in normal use from the viewing window. In the case of one beneficial embodiment example this transparent window sheet is installed in place from inside the beehive box and with the help of shaping it is arranged so that the transparent window sheet cannot be pulled out through the viewing window by accident while removing the viewing window cover from the aperture/viewing window. In one embodiment the transparent window sheet, which can be of course slightly darkened or clear in transparency, is glued using suitable glue into its installation location, which is located inside the beehive box when installed inside the beehive box, the installation location being a recess in the inside surface of the side and/or the end of the beehive box. Due to this the transparent window sheet is fully recessed into the end or side of the beehive box after installation. In yet another embodiment this transparent window sheet is glued from outside the beehive box to the side or end in question so that that recess for the window sheet in question is made so that after installation it does not obstruct the viewing window cover to be installed in place. Of course, the attaching of the window sheet of these embodiments by gluing can be implemented also in some other way of attachment than gluing, like for instance as in one other embodiment with the help of screws.

The components of the honeycomb frame of the beneficial embodiment examples of the invention can be conveniently made, for instance, of a food contact approved type of plastic, which can be also transparent. A Suitable type of plastic of course gives adequate stiffness for the components of the honeycomb frame and it withstands the forces caused by the opening of the honeycomb frame without breaking so, for instance, some too brittle types of plastic are not suitable for the material to be used. Of course, some other material, which fulfills the conditions set by the honeycomb frame, can be also suitable for the material. The other components of the beehive of the accompanied embodiment examples, such as the beehive boxes can be made conveniently, for instance, of very light and very heat insulating plastic-based material or, for instance, of equivalent wood-based material or of some other material, which is based on organic matter, or of some other material. Of course, based on the embodiments of the invention it is clear for a person skilled in the art that the previously mentioned components can be manufactured also of some other suitable material which differs from these examples in which case still the structure according to the invention functions as it is described to function in the descriptions of its beneficial embodiment examples. According to one embodiment of the invention the components that most likely are exposed to a mechanical abrasive load (for instance opening shafts and their contact surfaces, pushing members and their contact surfaces, bearing surfaces and/or moving parts of a gear) can be coated with abrasive load-resistant coatings where applicable, such as, for instance, DLC (Diamond Like Carbon).

The draining mechanism of a honeycomb frame, the structure of which being according to the invention, can be also automatic so that a motorized pushing member pushes and simultaneously rotates the opening shaft. Of course, an automated draining mechanism according to one embodiment can be implemented also without rotating the opening shaft with only a mechanism that pushes the opening shaft towards inside the honeycomb frame, but this way one of the benefits resulting of the rotational motion of the opening shaft, that is, the reducing of the friction is left unused.

Above-mentioned pusher member can be, for instance, based on a gear rack, in which the gear wheel is rotated by, for instance, an electric motor and when the teeth are in contact with the gear rack, it moves the gear rack into the desired direction in order to achieve the function that is realized with its help.

It is mentioned as a special case that the opening shaft according to the invention can be implemented also to be such that it can be pushed into the honeycomb frame also without rotating, for instance, by gently tapping the other end of the opening shaft with a hammer.

In one beneficial embodiment example of the invention the honeycomb frames, the structure of which being according to the invention, are placed inside a beehive box and are equipped with an automatic opening mechanism, which automatic opening mechanism comprises in this example, for instance, the electric motor and a gear connected to the electric motor and an opening shaft, which is connected to the gear, and a base frame to which the electric motor and the gear is mounted and to which the opening shaft is rotatably mounted so that while the opening shaft rotates it moves same time in a screw-like way forward or backward depending on which direction the opening shaft is rotated. According to one embodiment variant each honeycomb frame can be also equipped with its own electric motor and gear and opening shaft, but in this beneficial embodiment example of the invention one beehive box having a total of seven honeycomb frames, the structure of which being according to the invention, has one electric motor and a gear connected to it, which rotates each opening shaft of each honeycomb frame of the beehive box one at a time or all opening shafts at once so in this example there is one opening shaft in each honeycomb frame. In addition, in one beneficial embodiment example of the invention this automatic opening mechanism of the honeycomb frames is arranged to be initiated using remote control with the help of means for receiving and transmitting signals. Then the electric motor can be started by a remote-control signal received by the means for receiving signals, which achieves an actuator connected to the means for receiving signals to rotate an electric motor, which is connected to the actuator, for starting the draining event by remote control. The mentioned actuator as such can be an actuator according to the known technology, which actuator can as a response to a remote-control signal impulse to turn on and/or turn off the supply of electricity for the electric motor, which electricity can be, for instance, electrical energy stored in a battery. The signal as such can be a remote-control signal according to the known technology. The remote-controlled and automatic opening, that is, draining of the honeycomb frames in this embodiment is started, for instance, with the help of a smart phone application or other applicable computer program in which case the smart phone transmits a draining-initiating signal to the beehive and the opening mechanism of the beehive starts to rotate the electric motor, with which electric motor and with a gear connected to it and with an opening shaft connected to the gear each honeycomb frame is opened. In addition, the beehive in one embodiment also notifies with a signal to the user's smart phone application that a honeycomb frame is full of honey and thus is ready to be drained.

In one other beneficial embodiment example of the invention the opening mechanisms of the honeycomb frames, which opening mechanisms are according to the invention, are equipped with gas charges so that the opening shaft is hollow from the inside and its shape is adapted to its surrounding parts and one opening shaft is placed fully by its entire length inside both guide holes, that is, in one honeycomb frame there is then a total of two opening shafts placed permanently inside the honeycomb frame. In this example the space inside the opening shaft is connected to a gas charge and the opening shaft expands and stiffens to its correct opening shaft-like shape when the gas charge explodes due to gases released in the explosion, which opening shaft-like shape causes that when a gas charge, which is connected to the space inside that opening shaft which is inside the first guide holes, is detonated, the opening shaft bulges and stiffens momentarily to a shape, which forces the cell strips to move upwards or downwards to the draining position. Correspondingly a second gas charge is connected to the space inside that opening shaft which is placed inside the second guide holes. When this second gas charge is detonated, the cell strips move upwards or downwards back to the honey collection position.

According to one embodiment variant of the invention the detonation means a sudden increase in pressure in the opening shaft when a gas charge is equivalent to a pulse-like increase in pressure in an after valve-located flow channel inside the opening shaft caused by a valve opening rapidly. According to one embodiment variant of the invention such material has then been chosen for the material of the opening shaft, which is elastic and expands according to the pressure in those locations of the opening shaft which achieve the movement of the cell strips. According to one embodiment the gas charge is a replaceable pressure vessel, which is refillable during maintenance of the beehive. Of course, it is clear that this can be implemented by changes made to the cell frames and cell strips so that the cell strips move downwards to the draining position and correspondingly from the draining position upwards back to the honey collection position. The benefits of this embodiment example compared to the electrically operated and also to the remote control-activated electrically operated opening mechanism is especially a lower demand for electrical power when opening the honeycomb frames and also thus the smaller size for batteries required by the usage of the equipment. It is mentioned that in this example the opening shafts are equipped also with an emptying hole via which the opening shaft empties by itself from the gases produced by the explosion after the detonation of the gas charge and thus does not stay stiff and gas-filled. In the honeycomb frame the friction between the cell frames and cell strips causes that the cell strips do not drop back to the honey collection position from the draining position by themselves. This friction is caused largely, for instance, of course by the shaping of the parts of the honeycomb frame and by beeswax located on the friction surfaces, which also in other ways physically resists the movement of the cell strips, and also by small amount of honey possibly located between the parts. This opening and closing of the honeycomb frame with the help of a gas charge is also beneficial in that case in which starting the opening mechanism is achieved by remote control in which case of course a beehive containing honeycomb frames, which are according to the invention, is equipped as in the previous remote control example with means for receiving and transmitting signals and for the gas charges there is a remote control-activated detonation mechanism, which of course depends also on which kind of detonation mechanism the gas charge being used is equipped with. In this example there is at least one gas charge for each opening shaft. After the detonation of each gas charge, the detonated gas charge is replaced by a new gas charge. Alternatively, the gas charges can be installed at once for instance to all honeycomb frames contained by one beehive box for instance with the help of a special gas charge belt of structure, which belt or structure contains the gas charges in question in correct mutual position and this structure is set in its place to the beehive box or to its immediate proximity by a simple installation procedure for instance with the help of screws or some other kind of means for attachment.

Regarding the opening mechanism of the honeycomb frame, in the beneficial embodiments of the invention the opening mechanism comprises an opening shaft and the first and the second guide holes in the cell frames and at least in one of the end bars in at least one end of the honeycomb frame and also it comprises the guide protrusions of the cell strips. In addition, in the beneficial embodiment examples of the invention the opening shaft is cross-sectionally round, but of course it could be cross-sectionally some other way shaped such as for instance oval or square or rectangular or for instance pentagonal or hexagonal shape, but in the accompanied beneficial embodiment examples of the invention due to the rotating motion of the opening shaft of the opening mechanism the round shape is most beneficial in this case. So, the opening mechanism functions also without the opening shaft being rotated while it is pushed towards inside the honeycomb frame, but the rotating motion reduces the friction caused by the pushing, that is, in other words the rotating motion eases remarkably the pushing of the opening shaft. In addition, the opening shaft can be assembled from several parts or of course also it can consist of just one part. A one-part opening shaft is beneficial for instance if the opening shaft is for instance molded from plastic by using injection molding or cast or molded using some other material.

In one embodiment of the opening shaft, it comprises a pipe and end parts connected tightly to both ends of the pipe, one of which end parts being the free conical end of the opening shaft and the other end part is an adapter part which is connected to a member that rotates the opening shaft and which adapter part can be replaced by another part depending on what kind of connection and to which shape the end of the opening shaft is needed to be attached. In this embodiment of course also the free conical end part can be replaced if instead a conical end part with a different conical shape of the surface or for instance a different conical end part equipped with a different pitch or some other way shaped thread is wanted.

A beneficial embodiment example of the invention in which the second guide hole is not needed and thus is equipped with only one, that is, with the first guide hole is such in which the cell strip is kept in the honey collection position by means of a spring load. Then when the opening shaft is pushed through a first guide hole and when the opening shaft touches the guide protrusions, the cell strips move to the draining position and stay there until the opening shaft is removed from the first guide hole and when the opening shaft is not anymore pushing the cell strips against the spring load, the cell strips return automatically back to the honey collection position by means of the spring load. Due to this in the case of this embodiment the opening shaft is removed from the first guide hole only then when the honeycomb frame is empty of honey. A remarkable benefit from this is a lower structure of the honeycomb frame than in the other embodiment examples. A structure equipped with only the first guide hole can be also equipped with an opening shaft which is always inside each first guide hole and extends through the whole honeycomb frame. Then the opening shaft is cross-sectionally oval-shaped and in a certain position its shape allows the cell strips to move to the honey collection position and for instance when turned 90 degrees from this position, it pushes the cell strips to the draining position due to the oval shape. The mentioned spring loading can be implemented in this embodiment conveniently by, for instance, shaping a half of a groove for a compression spring to, for instance, the cell frame and other counter half of the groove to the cell strip so that one or more compression springs push constantly the cell strip towards the honey collection position when installed to each honeycomb pair. Of course, a similar arrangement can be implemented using some other type of spring such as, for instance, a tension spring or a torsion spring or some other member in which arrangement for instance in the case of a tension spring correspondingly hooks or hook-like members, which hold the tension spring, have been shaped to the cell frame and cell strip. Of course, if needed this structure and function can be implemented also so that the cell strips of a honeycomb frame, the structure of which being according to the invention, would be pressed towards the draining position by a spring load in which case this kind of honeycomb frame would be set to the draining position by removing the opening shaft from the first guide hole. The springs mentioned in this example can be called also loading members, which loading member comprises also of course other kind of members which cause the previously described load such as, for instance, a torsion spring. Using a torsion spring in this invention of course requires changes to the shapes of some of the components described here so that a torsion spring can be fit into a space made for it in a honeycomb frame, which is equipped with a structure according to the invention.

The free end of the opening shaft has been shaped to be conical in these beneficial embodiment examples of the invention, which conicity is in a key role when opening the honeycomb frame effortlessly. Of course, for a person skilled in the art it is clear based on different embodiments of the invention that the conicity in the free end of the opening shaft includes also, for instance, cross-sectionally other than round shafts narrowing in a conical way when approaching the tip of the free end of the opening shaft such as, for instance, polygonal shapes of the cross section.

In those beneficial embodiments of the invention in which the honeycomb frames, which have a structure according to the invention, are drained using remote control by means of an electric motor, the opening mechanism of each honeycomb frame comprises in addition to the opening shaft and the first and the second guide holes and the guide apertures also an electric motor and a gear connected to it and the means for transmitting and receiving signals, which are needed for the remote controlling, and equipment for starting and stopping the electric motor and additionally a source of energy such as a solar panel and/or a battery, which stores electrical energy.

In those beneficial embodiments of the invention where the honeycomb frames, which have a structure according to the invention, are drained using remote control by means of a gas charge, the opening mechanism of each honeycomb frame comprises in addition to the opening shaft and the first and the second guide holes and the guide apertures also then a gas charge and the means for transmitting and receiving signals, which are needed for remote controlling, and a mechanism for detonating the gas charge and additionally the opening shaft is hollow in this embodiment, which it does not need to be necessarily in other embodiments. In addition, in this embodiment the opening shaft is flexible and elastic before the detonation of the gas charge. In other embodiments the opening shaft has of course a rigid structure.

In those beneficial embodiments of the invention where the honeycomb frames, which have a structure according to the invention, are drained by remote control pneumatically, the opening mechanism of each honeycomb frame in addition to the opening shaft and the first and the second guide holes and the guide apertures also then comprises a device, which produces the compressed air, and the related pneumatic hoses and connection parts and means for transmitting and receiving signals, which are needed for the remote controlling, and a mechanism for starting the device, which produces the compressed air or alternatively a mechanism for opening a pneumatic valve and additionally, the opening shaft is in this embodiment also hollow, which it does not need to be necessarily in other embodiments. Additionally, also in this embodiment the opening shaft has a flexible and elastic structure before filling it with compressed air at least at the locations of the cell strips and the first and the second guide holes.

It is further mentioned that the embodiments according to the invention provide a fast and light opening of the honeycomb and thus savings in the usage of force/energy while opening the honeycomb conventionally/manually. Thus, also energy can be saved in the opening in the embodiments of the automatic opening. Thus, also stuck structures can be opened with less use of force.

The first and the second guide holes shown in these embodiment examples of the invention are presented as round holes or almost round holes, but to an opening mechanism of a honeycomb frame, which has a structure according to the invention, a guide protrusion and its edges can be shaped so that the guide holes can have in fact otherwise any shape within the boundary conditions allowed by the dimensions of the honeycomb frame except in height direction where the height of the first and the second guide holes is such that a push of an opening shaft into the first guide hole and when it is touching the first edge and thus pushing a cell strip it moves each cell strip to the draining position. Correspondingly, for moving the cell strips back to the honey collection position the height of the second guide hole is such that the opening shaft correspondingly when touching the second edges moves the cell strips back to the honey collection position from the draining position. More precisely the height dimension of the guide holes is equal to the diameter dimension of the opening shaft so that in a honeycomb frame, which is in draining position and has the structure in question, the cell strips are in that position in which they are intended to be. Of course, here small clearances are naturally taken into account like for instance the height dimension of the guide holes is in practice slightly larger by a small amount than the diameter dimension of the opening shaft, though which mentioned small amount, which can be called also clearance, cannot be seen with the naked eye. In addition, of course the guide holes and the opening shaft have such a shape that the opening shaft fits to be pushed as previously described to each guide hole. In these examples in practice the most convenient shape for the guide holes is of course a round shape.

In some beneficial embodiments of the invention depending on how easily the cell strips open to the draining position, it is beneficial to place more than one first guide hole to the structure and also more than one second guide hole to the structure. Then due to the material of the cell strips, the guide protrusion in the cell strips may deform so that for instance one first guide hole in the center of the structure is not enough to open the honeycomb frame to the draining position, because due to the previously described stuck cell strips and the elastic material and structure of the cell strip the guide protrusion deforms so that in the case of one first guide hole and possibly also in the case of two first guide holes eventually the opening shaft is in fact extended through the honeycomb frame inside the first guide hole, but the honeycomb frame could still be at least partially in the honey collection position due to deformation. So, as a solution for this possible situation the structure according to the invention can be equipped with more than one first and second guide hole, which first guide holes placed horizontally inline side by side as close as possible to the support structures, which support the guide protrusion, force the cell strips due to greater stiffness to move to the draining position when the opening shaft is in one of the first guide holes. For this reason, most beneficial is to shape the guide protrusion of the cell strip and the support structures of the guide protrusion as rigid as possible so that for instance just one first guide hole and one second guide hole is sufficient for moving the structure in question from the honey collection position to the draining position and from the draining position to the honey collection position.

In one beneficial embodiment of the cell strip in which the first guide hole and the second guide hole are placed vertically on top of each other, these guide holes are placed so near to each other that they form a continuous aperture, the shape of which resembles the number eight, more precisely shape resembles the outer edges of the number eight. The same forming of a partially continuous aperture is also possible, for instance, due to the lack of space in reality also for a first and a second guide hole placed in horizontal direction and also in the case that in the structure there is more than one first guide hole and more than one second guide hole when also for instance the first guide holes or second guide holes can form continuous and number eight-resembling apertures with each other or correspondingly the first guide holes and the second guide holes can form continuous apertures if needed so that one this kind of aperture comprises at least one first guide hole and at least one second guide hole. Forming the apertures/areas mentioned here is limited especially to how this kind of continuous aperture/area is implemented so that the edges of the apertures lock the opening shaft in the height direction and if needed in the case of a structure with multiple guide hole types also in the horizontal direction to the correct location taking into account that it is beneficial to rotate the opening shaft by hand or, for instance, by means of an electrically operated device such as a cordless drill machine. One embodiment, which is the simplest and in some cases of a structure of a honeycomb formed by the cell strip and the cell frame most beneficial, is that the first guide hole is in fact open across its whole area and in the horizontal direction only limited by the outer edges of the honeycomb frames and in the height-direction limited to have the height equal to the base diameter dimension of the opening shaft. Then the opening shaft can be rotated and moved same time in horizontal direction while the opening shaft is fully inside the honeycomb frame or at least partially extended through the honeycomb frame in question. In this example case also the second guide hole can be shaped to have the same shape as the first guide hole of course or on the other hand it can be round or at least smaller than the previously described example of the first guide hole due to less force being needed for moving the honeycomb to the honey collection position.

The beehive boxes and other components, which are according to the embodiments of the invention, such as the intermediary bottom part and the intermediary platform and the lid can be coated for instance by painting or spraying with a bio-based material, such as wood-based or wood-imitating organic material. Especially the coating of the surfaces of the beehive, which surfaces are located inside the beehive, with a wood-based material is beneficial for the bees. The surfaces of the beehive, which are located outside the beehive, can be also of course coated with this material, but it is also beneficial to paint them with a usually water-based paint that is appropriate for the local beekeeping conditions.

All the different embodiments of the invention are combinable with each other where applicable.

One embodiment of the structure of the honeycomb frame according to the invention also exists in which instead of the electric motor the opening shaft is rotated by means of a pressurized gas, for instance compressed air. In addition, it is mentioned that the opening shaft can be rotated of course with any device that produces rotating motion.

BRIEF DESCRIPTION OF THE DRAWINGS

Next the invention is described more in detail with the help of beneficial embodiment examples with reference to accompanying drawings in which:

FIG. 13A: The drawing shows a fourth beneficial example of the guide holes of a cell frame relative to the guide protrusion of a cell strip the cell strips being in lower position and viewed directly from the front. In the structure shown in this example, there are two first guide holes and two second guide holes.

FIG. 13B: The drawing shows the example of drawing FIG. 13A in upper position and viewed directly from the front.

FIG. 14A: The drawing shows a fifth beneficial example of the location and the shape of the guide holes of a cell frame relative to the guide protrusion of a cell strip the cell strips being in lower position and viewed directly from the front.

FIG. 14B: The drawing shows the example of drawing FIG. 14A in upper position and viewed directly from the front.

FIG. 15: The drawing shows viewed directly from the front two cell frames assembled, that is, attached to each other and one cell strip located inside them which is interlocked into a groove shaped into the cell frame and can move in vertical direction according to a movement path which is set for it. In addition, in the drawing there are two cut section views of the upper and lower portions of the example assembly, which show clearly the groove reserved for the cell strip and a cell strip located inside the groove of one of the two cell frames.

All embodiments of the invention shown in drawings FIG. 1-FIG. 29 are combinable with one or more embodiments of the invention. In addition, the mentioned and next more explained beneficial embodiments of the invention are all combinable with one or more embodiments of the invention.

DETAILED DESCRIPTION OF THE INVENTION

Figure 5:
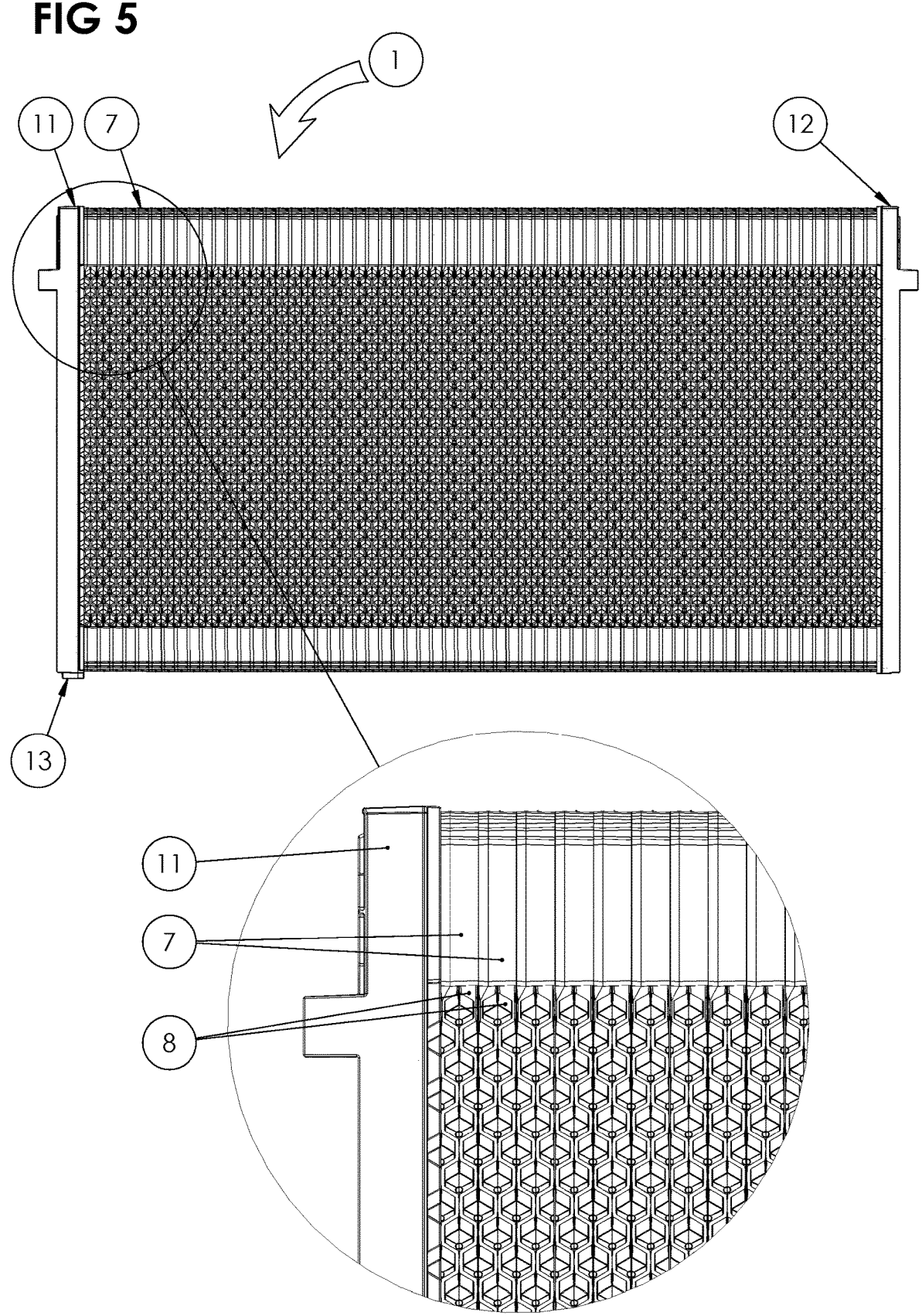
FIG. 5: The drawing shows a honeycomb frame, which utilizes this invention, viewed directly from the side and a detail view of the honeycomb frame.
Figure 6:
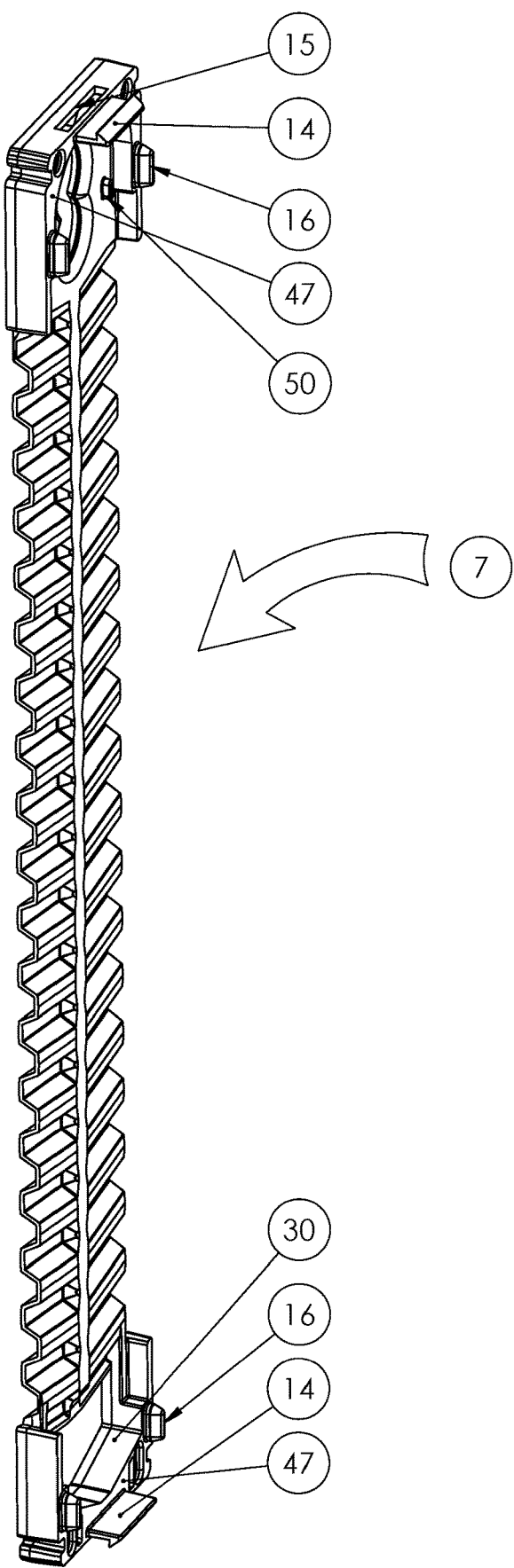
FIG. 6: The drawing shows a stationary part of the honeycomb, that is, the cell frame viewed obliquely from the side, which cell frame is equipped with fastening members according to one embodiment of the invention.

The structure of the honeycomb frame 1, which structure is according to the invention, shown in the accompanying drawings FIG. 1 to FIG. 29 comprises at least an opening mechanism, the stationary parts of the honeycomb 7, that is, the cell frames 7 and the moving parts of the honeycomb 8, that is, the cell strips 8. In one beneficial embodiment example of the invention shown in drawing FIG. 5 the structure 1 according to the invention comprises also end parts 11, 12 in both ends of the honeycomb frame, but of course the structure of the honeycomb frame can be implemented also without the end parts 11, 12 or without one of the end parts 11, 12 located in either end of the honeycomb frame. More in detail the opening mechanism of the structure according to the invention comprises an opening shaft 36, a first guide hole 31 and a second guide hole 32 both shaped to the cell frames 7 and at least to one of the end parts 11, 12 and guide protrusions 39 shaped to the cell strips 8. The guide protrusions comprise also a first edge 40 of the guide protrusion 39 and a second edge 41 of the guide protrusion 39.

In the beneficial accompanying embodiment examples of the invention each cell frame 7 and a cell strip 8 placed partially inside the cell frame 7 into a space or a groove 45, which is reserved for it, form a honeycomb pair, of which the cell frame 7 stays stationary at all times and form also same time the base frame of the honeycomb frame when the honeycomb pairs are attached to each other one after the other by means of fastening members in a way which is explained more in detail later. In the beneficial embodiment examples of the invention shown in the accompanying drawings there are 62 of these honeycomb pairs attached to each other one after the other. The cell strip 8 is in the accompanying beneficial embodiment example of the invention placed depending on the mutual shaping of the cell strip 8 and the cell frame 7 partially or fully inside the cell frame 7 into a groove 45, which has been shaped to the cell frame 7, of which groove 45 one beneficial embodiment example is shown in drawings FIG. 15 and FIG. 16 or on the other hand in the case of one other beneficial embodiment example of the invention the cell strip 8 is even placed completely outside the cell frame 7 so that the cell strips 8 are supported relative to the cell frame 7 to move according to a certain restricted movement path for instance by means of a special guide groove shaped to the cell frame 7 and correspondingly a locking guide protrusion shaped to the cell strip 8, which locking guide protrusion when placed into the guide groove of the cell frame 7 interlocks each cell strip 8 into a cell frame 7 and allows a restricted movement path for the cell strip 8.

In addition, in one beneficial embodiment example of the invention the cell strip 8 is placed into a groove 45, which has been shaped for the cell strip 8 to the cell frame 7, and additionally to a mating surface 53 of a cell frame 7, which is against the cell strip 8, a protrusion 50 has been shaped.

A counter groove 51 has been shaped to the cell strip 8 for the protrusion 50. The protrusion 50 fits to the counter groove so that the cell strip fits to move to the upper position and to the lower position without that the protrusion 50 would touch the cell strip at any point during the movement or would obstruct its movement. This is especially beneficial when assembling a honeycomb frame, which is according to the invention, in which stage it is not possible to place the cell strip 8 wrong way round to the groove 45 of the cell frame 7 due to the protrusion 50 and the counter groove 51 in question, but instead only so that each protrusion 50 of a cell frame 7 protrudes into a counter groove 51 of a cell strip 8 of each honeycomb pair because when placing the cell strip 8 into the groove 45 wrong way, the cell strip 8 does not position its mating surface 52 against the mating surface 53 of the cell frame 7 and thus the user notices this the latest then when the user attempts to install the back surface 46 of the next cell frame 7 against the front surface of that cell frame 7, which has the wrong way round-installed cell strip 8 inside in its groove 45 in which case the cell frame 7 is not installed tightly due to this wrong way-installed cell strip 8. Of course, this protrusion 50 and the counter groove 51 can be implemented also so that the protrusion 50 is shaped to the cell strip 8 and the counter groove 51 is shaped to the cell frame 7 in which case the structure 1 according to the invention of course functions also as it has been described to function in the descriptions of the embodiments of the invention. There can be of course one or more of these protrusions 50 and counter grooves 51 in a cell strip 8 and a cell frame 7 according to the structure 1 according to the invention. In the embodiment example of a cell strip 8 shown in drawing FIG. 18 there are a total of two pieces of these counter grooves 51 in the upper portion of the cell strip 8 on a mating surface 52 of a cell strip 8 which is mated against mating surface 53 of the cell frame 7 and in the cell frame 7 of the same embodiment example there are correspondingly two protrusions 50 in the corresponding locations on the mating surface 53. Of course, this structure 1 according to the invention functions as it has been described to function in the descriptions of the different embodiments of the invention also when the shape and quantity of the protrusions 50 and counter grooves 51 differs from this example.

In the accompanying beneficial embodiment examples of the invention shown in the drawings FIG. 1 to FIG. 29 the cell frames 7 are attached to each other by means of fastening brackets 14 and their counter brackets 15, which both have been shaped to the cell frames 7, so that the mating surface 44 of each fastening bracket 14 is mated against the mating surface 49 of the corresponding counter bracket 15 and prevents the movement of these cell frames 7 away from each other. The cell frames 7 are installed a front surface 47 of each cell frame 7 against a back surface 46 of the consecutive adjacent cell frame 7. In the accompanying embodiment example of the invention one fastening bracket 14 and one its counter bracket 15 have been shaped to the bottom end and to the top end of the cell frames 7, that is, thus there are two fastening brackets 14 and two counter brackets 15 in one cell frame 7, which in this example have the same shape in the top ends and the bottom ends, but of course they could have been differently shaped and of course placed to different locations in the cell frames 7 still achieving the same function. Of course, this quantity and location of the fastening brackets 14 and the counter brackets 15 can differ from the accompanying example, for instance, the quantity could be four or six pieces. In this example two fastening brackets 14 and counter brackets 15 in one cell frame 7 is sufficient to ensure a sufficient rigidity for the assembled honeycomb frame. For easy alignment of the fastening brackets 14 and the counter brackets 15 and for additional rigidity in this beneficial embodiment example of the invention the cell frames 7 are equipped, in addition to the fastening brackets 14 and the counter brackets 15, with alignment pins 16 for which alignment pins 16 there are recesses 17 in the cell frames 7 into which recesses 17 the alignment pins 16 are pushed tightly when the cell frames 7 are attached to each other. All these fastening brackets 14 and their counter brackets 15 and alignment pins 16 and their accompanying shapes such as the recesses 17 can be called together as fastening members. It is noteworthy that in this embodiment, of which embodiment an example is shown in drawings FIG. 16 and FIG. 17, the shaping of the fastening brackets 14 and the counter brackets 15 is such that each fastening bracket 14 must bend, that is, deform elastically in order for a fastening bracket 14 to settle into its place its mating surface 44 against the mating surface 49 of the counter bracket 15 and is thus then interlocked in place.

This honeycomb frame equipped with a structure 1 according to the invention comprises the cell frames 7 of a honeycomb frame, which is opened inside a beehive box 23, and cell strips 8 and the end bars 11 and 12 of a honeycomb frame, which is opened inside a beehive box 23, and an opening mechanism, which opening mechanism is in the accompanying beneficial embodiment examples of the invention shown in drawings FIG. 1-FIG. 29 a power drill-attachable and cross-sectionally round shaft, which can be called an opening shaft 36 and the free end 38 of which has a sharp conical shape. The other end 37 of the opening shaft 36 is attached to, for instance, a cordless power drill machine and in the accompanying examples the other end 37 is equipped with a toothed shape for improving the slip grip of the connection of the opening shaft 36 and the cordless power drill machine. The opening shaft 36 can be of course also arranged to function as in the accompanying embodiment examples without the toothed shape or with the help of a different shape. At least one of the end bars 11 or 12 is in this embodiment equipped with two guide holes 31 and 32 of the opening shaft 36 located vertically inline and in addition, the same kind of guide holes 31 and 32 are also in the cell frames 7. The cell strips 8 of the honeycomb frame are equipped in this embodiment with a hexagonally shaped guide aperture 33 through which the opening shaft 36 is pushed when the honeycomb frame is opened.

In the accompanying beneficial embodiment examples of the invention the opening mechanism of a honeycomb frame the structure 1 of the honeycomb frame being according to the invention functions as follows: When opening the honeycomb frame from the honey collection position to the draining position, the opening shaft 36, which is in this case a cross-sectionally round shaft and its free end 38, which is pushed first inside the honeycomb frame, has a sharp conical shape, is pushed from outside the honeycomb frame and the beehive box 23 into the first guide hole 31 of one of the side bars 11 or 12 while the opening shaft 36 is rotated same time around its longitudinal axis with, for instance, a cordless power drill machine. While the opening shaft 36 protrudes deeper inside the honeycomb frame, the conical free end 38 of the opening shaft 36 protrudes through the first guide hole 31 of each cell frame 7 one at a time and also through the hexagonal-shaped guide aperture 33 of each cell strip 8, in which case in this embodiment example the top two sides of the hexagonal-shaped guide aperture 33, that is, the first edges 40 touch the surface of the opening shaft 36 and eventually the opening shaft 36 moves the cell strip 8 in question upwards by pushing these top two sides of the hexagonal-shaped guide aperture 33, that is, the two first edges 40 upwards. The hexagonal-shaped guide aperture 33 of the cell strip 8 and in this case round and interconnected and overlapping guide holes of the cell frame 7, the first guide hole 31 and the second guide hole 32, are shaped so that when the opening shaft 36 is in the first guide hole 31 or in the second guide hole 32 as thick as its base diameter, the opening shaft 36 has moved each adjacent cell strip 8 upwards to the draining position. Thus, while rotating the opening shaft 36 and simultaneously pushing it inside the honeycomb frame, each cell strip 8 moves to the draining position one at a time. The rotation of the opening shaft 36 when opening reduces that required force for pushing, which is needed when the user pushes the opening shaft 36, for instance, with the help of a cordless power drill forward inside the honeycomb frame. Before producing honey, the bees finalize the surfaces inside a honeycomb, which is formed in the honeycomb frame in the intact position, that is, in the honey collection position, with the help of propolis and beeswax so the required pushing force for opening the honeycomb frame varies naturally depending on how tightly the cell strips 8 are attached to the cell frames 7 due to the honeycomb-finalizing actions by bees. Correspondingly, a honeycomb frame equipped with a structure 1 according to the invention is closed back to the intact position, that is, to the honey collection position by pushing the opening shaft 36 into the second guide hole 32. Then while the opening shaft 36 is pushed more deeper, the surface of the opening shaft 36 pushes the two lowest sides of the hexagonal-shaped guide aperture 33, that is, two second edges 41 downwards in which case correspondingly each cell strip 8 moves one at a time downwards back to the honey collection position.

In the accompanying beneficial embodiments of the invention the opening mechanism comprises the opening shaft 36, the guide apertures 33 of the cell strips 8 and the first guide holes 31 and the second guide holes 32 in the cell frames 7 and the first guide holes 31 and the second guide holes 32 in at least one end bar 11 or 12 in either end of the honeycomb frame or in both end bars 11 and 12 in the case that the embodiment of the invention in question is equipped with at least one or with both end bars 11, 12. In addition, in the beneficial embodiment examples of the invention the opening shaft 36 is cross-sectionally round, but of course its cross section can have some other shape such as oval or square or rectangle or for instance triangle or, say, pentagonal or hexagonal shape, but due to the rotational movement of the opening shaft in the accompanying embodiment examples of the invention, the round shape is most beneficial in this case. So, the opening mechanism functions also without rotating the opening shaft 36 while it is pushed into a honeycomb frame the structure 1 of the honeycomb frame being according to the invention, but the rotational movement reduces the friction caused by the pushing, that is, in other words the rotational movement eases remarkably the pushing of the opening shaft 36. In addition, the opening shaft 36 can be of course assembled from several parts or of course also it can consist of just one part. A one-piece opening shaft 36 is beneficial if the opening shaft 36 is, for instance, made of some suitable plastic type using injection molding or cast from some other material. In one beneficial embodiment of the opening shaft 36 the opening shaft 36 is assembled from a cross-sectionally round pipe and separate parts, which are mounted to the ends of the pipe partially inside the pipe or mounted by some other means of attachment by pushing. It is mentioned also that the guide aperture 33 comprises also the first edges 40 and the second edges 41 both of which there being at least one in a guide aperture 33 and two of both in the guide aperture 33 of this embodiment.

It is mentioned also that the opening shaft 36 can be of course arranged, if needed, to be rotated also manually by hand with, for example, a hand lever, which is used, for example, with two hands. A connection structure that enables the usage of a hand lever can be detachably or permanently mounted to the opening shaft 36 in which case a toothed shape in the end 37 of the opening shaft 36 can be used which toothed shape is compatible with the hand lever.

It is mentioned that according to one beneficial embodiment of the invention this kind of connection structure to the free end 37 of the opening shaft 36, which connection structure enables the usage of a hand lever, is implemented, for instance, same way as a socket wrench for opening and fastening bolts is connected to a head of a bolt.

Figure 22:
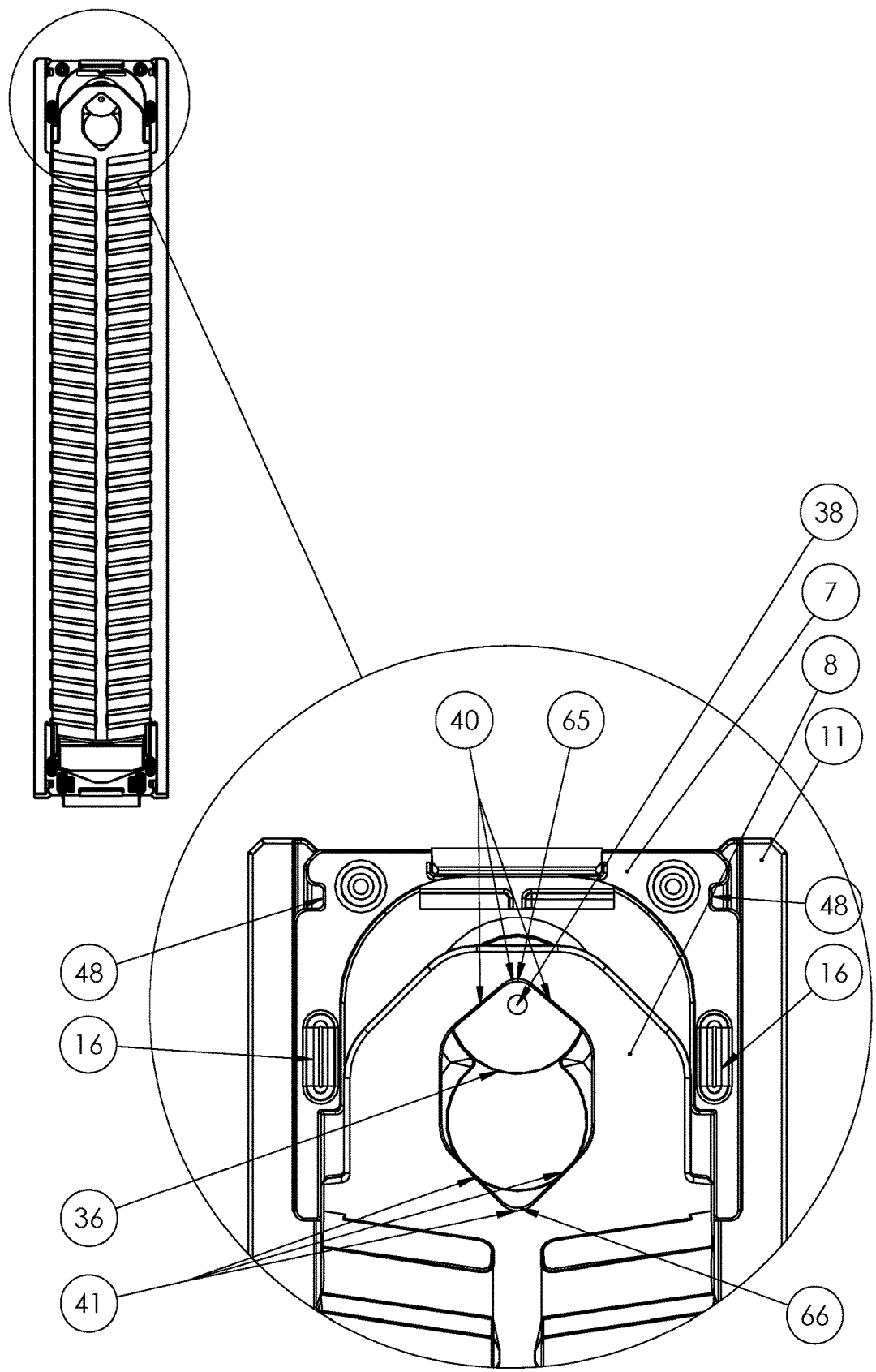
FIG. 22: The drawing shows illustratively a honeycomb frame, the structure of which is according to the invention, viewed from one end without a second end part.
Figure 23:
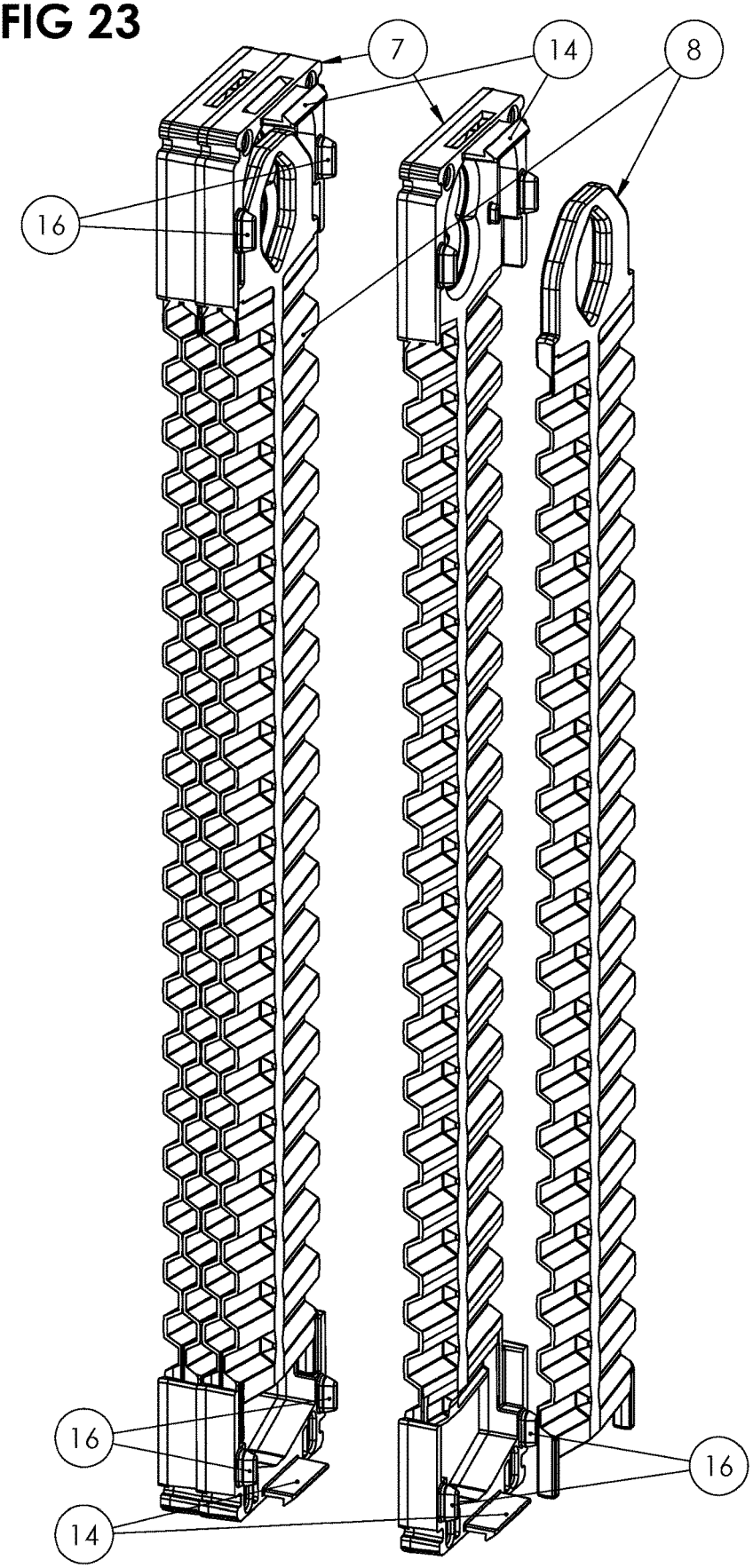
FIG. 23: The drawing shows viewed obliquely from the side illustratively how the cell frames and the cell strips are installed to each other one after the other according to a beneficial embodiment of the invention.
Figure 24:
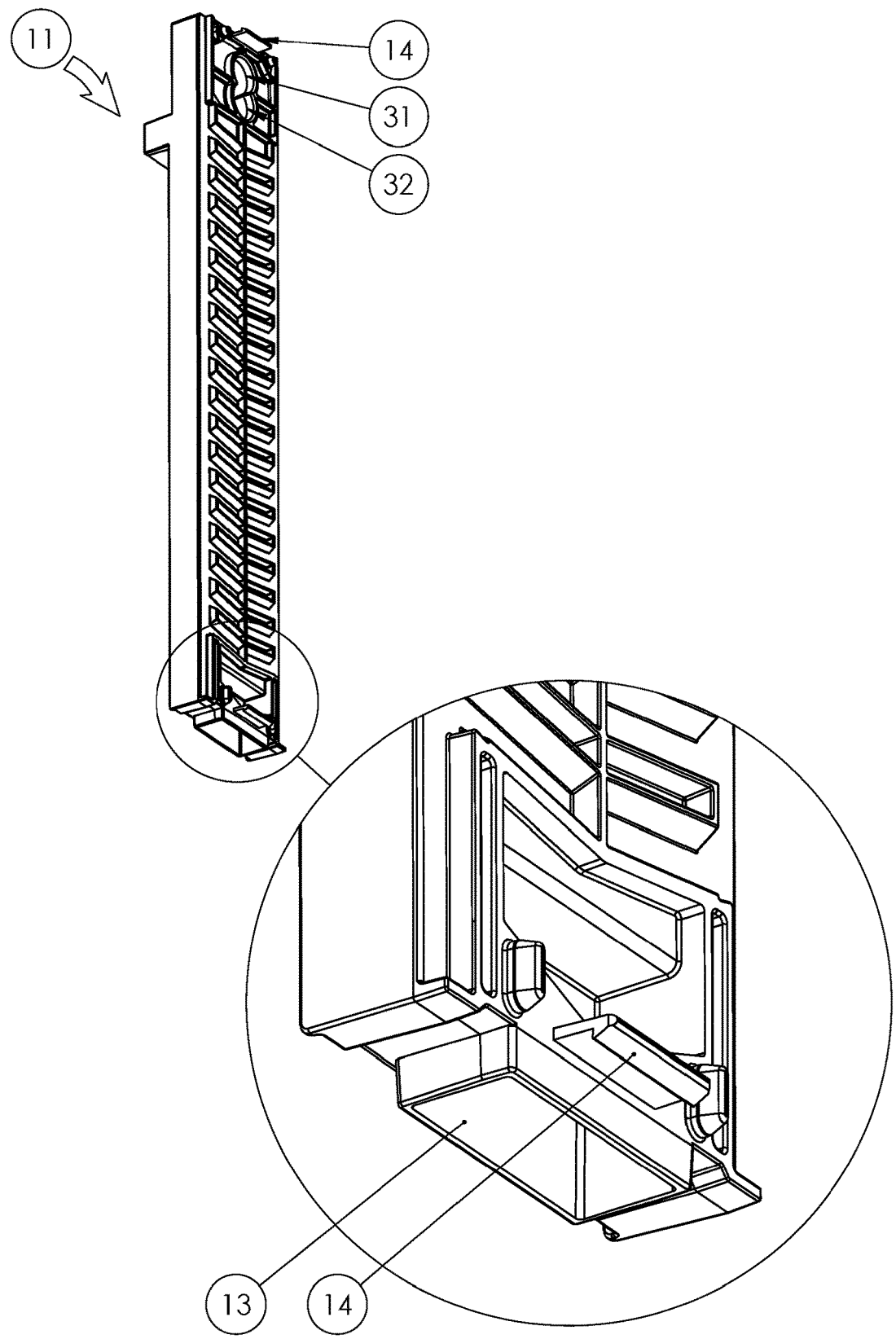
FIG. 24: The drawing shows viewed obliquely from the side one of the end parts, which the structure according to the invention comprises according to one embodiment, which end part is equipped also with a honey drainage aperture.
Figure 25:
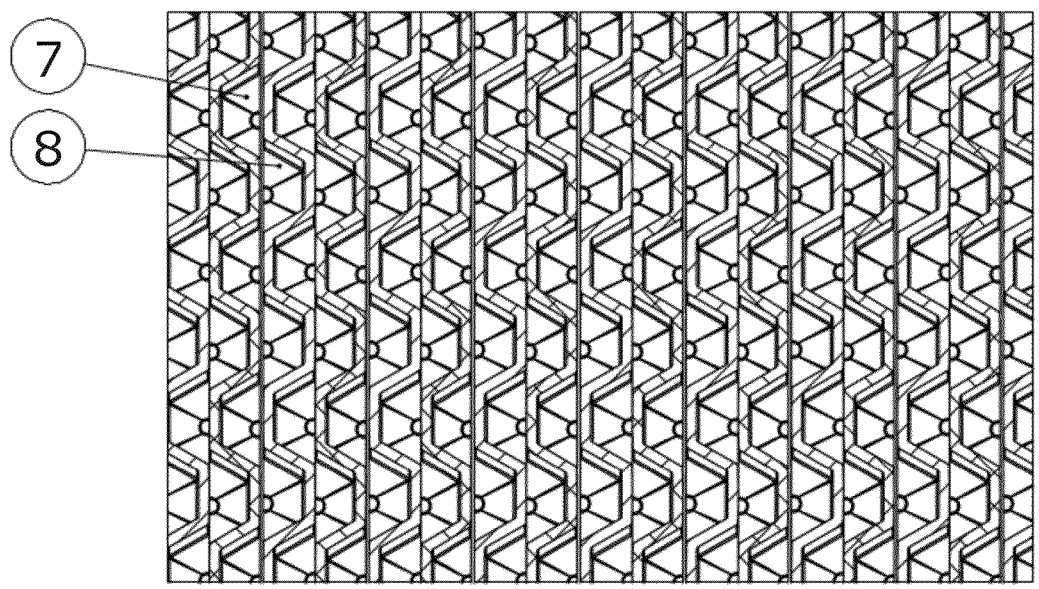
FIG. 25: The drawing shows a side view of an embodiment example of a honeycomb of a honeycomb frame in draining position the structure of the honeycomb frame being according to the invention.
Figure 26:
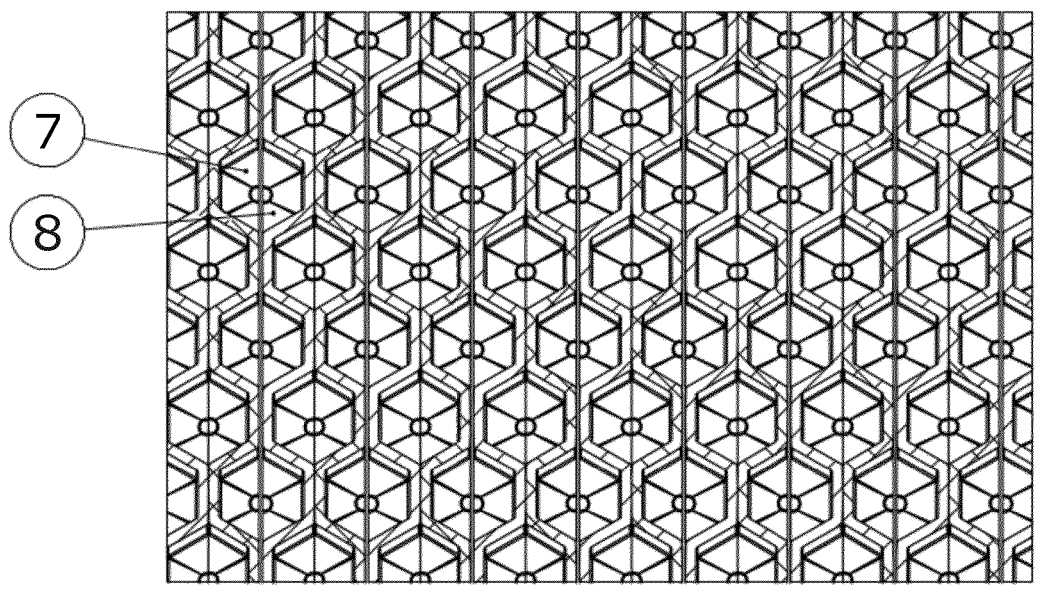
FIG. 26: The drawing shows a side view of an embodiment example of a honeycomb of a honeycomb frame in honey collection position the structure of the honeycomb frame being according to the invention.

A cell strip 8 is shown illustratively in the drawing FIG. 22, which is installed to a cell frame 7 into a groove 45 reserved for it and also an opening shaft 36 placed partially inside a honeycomb frame is shown illustratively in the drawing FIG. 22.

In one embodiment of the opening shaft 36 the opening shaft 36 consists of replaceable end parts and a pipe, the diameter of which is smaller than the diameters of the guide holes and other dimensions of the shapes of a structure 1 according to the invention so that only the replaceable free conical end part is equipped with such diameter in the area where the diameter of its cross section is equal to its base diameter that the cell strips 8 move to their draining and honey collection positions as they have been described to move in connection with the different embodiments. It is also mentioned that the pipe, which is a component of the opening shaft 36 and is mentioned in this embodiment example and of course mentioned in several other embodiments, can also be a threaded bar or a rigid and hollow or solid shaft in the ends of which there being, for instance, threaded holes for mounting the replaceable end parts using screws. In addition, of course in this and in several other embodiments the pipe or threaded bar in question can be, for instance, cast and, for instance, polygonal, say, a star-like profile the cross section of which being almost circular so that while rotating in the guide holes and in other structures, it does not cause friction that causes resistance for the rotation or, for instance, getting stuck occasionally.

It is further mentioned regarding the material of the components of the honeycomb frames shown in the different embodiments of the invention that a suitable type of plastic or other suitable material gives of course a sufficient rigidity for the components of the honeycomb frame and it withstands the forces caused by opening the honeycomb frame without any components breaking so, for instance, some of the too fragile types of plastic or other types of materials do not suit for the material to be used due to the risk of breakage.

In the accompanying beneficial embodiment examples of the invention, which are shown in drawings FIG. 1-FIG. 29, drainage apertures 3 have been shaped to some of the vertical sidewalls of the halves of the honeycomb in each honeycomb cell. The most beneficial shape of these drainage apertures 3 is a tear shape in which the tip 5 of the tear is pointed towards downwards in an angle and towards inside the honeycomb frame towards a middle base frame 4 of the honeycomb frame, that is, pointed towards the centerline so that the honey, while draining downwards, would not drain partially outside the honeycomb frame. The middle base frame 4 in these embodiment examples of the invention forms also the bottom of the honeycomb on both sides of the honeycomb in the halves of the honeycomb, that is, in the halves of the honeycomb formed by the cell frame 7 and the cell strip 8. Of course, this could be implemented also using some other shaping of the middle base frame 4 to function according to the invention. The drainage apertures 3 can be implemented of course also as shaped to have some other shape, for instance more rectangular or completely rectangular or circular or some other shape. Then it is beneficial to still include the tip portion of the tear-shaped drainage aperture 3 in the shape of the drainage aperture 3 to aid/promote the drainage, also to aid/promote the drainage of honey types and/or fractions of honey compositions, which are firmer, that is, have a higher viscosity. In practice the tear shape in this embodiment example is formed by that in a case of such vertical sidewall 9, into which a drainage aperture 3 is placed, the drainage aperture 3 comprises the whole vertical sidewall 9 except that area of the vertical sidewall 9 which is located near the outer edge 18 of the honeycomb in which an area of intact vertical sidewall 9 is located, the width of which area is in this example approximately eight times the thickness of the sidewall 9, but of course this width can be very different depending on the material used for the cell frames 7 and the cell strips 8. This way implemented the base shape/basic form of the drainage aperture 3 is rectangular in which the rectangle in this example the tips of the rectangle are equipped with a rounded shape except the lower of the two tips located most near the center base frame 4 has a sharp shape. This way implemented the drainage aperture 3 is in practice tear-shaped while the tip 5 of the tear points slantwise towards the middle base frame 4 and downwards. The drainage of the honey is aided here also by that the angular position of the honeycomb differs from horizontal in which angular position the outer edge 18 of the sidewall 9 of the honeycomb is located higher than the inner edge of the sidewall 9, which inner edge is located most near the middle base frame 4. This angle of the angular position is in this embodiment of course small, for instance 5 to 10 degrees, but can of course differ from this in which case the invention also still functions as it is described to function.

The exact shape of the edges of the drainage aperture 3 is not very relevant except so that an area which resembles a tip of a tear is shaped to a lower edge 6 of the drainage aperture 3, which can be called a tip 5 of a tear, which tip 5 of a tear is pointed slantwise downwards and slantwise inwards towards inside the honeycomb frame, that is, towards the middle base frame 4. The drainage aperture 3 on the other hand functions also without the tip 5 of a tear shaped to it. The tip 5 of a tear still aids the drainage of the honey through the aperture and is also due to its beneficially shown in the accompanying embodiment examples. In addition, of course the edges of the drainage aperture 3 must not be too sharp so that, while the bees are working, the edges do not harm the bees, for instance their antennas or tentacles, when the cell strips 8 are moving and when the cell strips 8 are stationary.

In the accompanying embodiment examples of the invention the tip 5 of a tear is pointed from the drainage aperture 3 in a 45-degree angle relative to vertical direction, but of course the embodiments of the invention function also when the tip 5 of a tear is set to other than a 45-degree angle when gravity can be used in the draining. In addition, the lower edge 6 of the drainage aperture 3 is by shaping pointed towards the middle base frame 4 and slantwise downwards relative to the horizontal direction so that the honey drains better downwards inside the honeycomb of the honeycomb frame and thus does not drain outside the honeycomb.

In the accompanying beneficial embodiment examples of the invention the drainage aperture 3 does not extend to the outer edge 18 of the vertical sidewall 9 of the honey cell so that the rigidity of the sidewall 9 and thus correspondingly the rigidity of the cell strip 8 is sufficient, but one embodiment of the invention can be implemented so that the drainage aperture 3 extends to the outer edge 18 of the sidewall 9 and thus forms an open area, which comprises the whole vertical sidewall 9, which area thus is missing the whole vertical sidewall 9. Also, in this embodiment example of course the drainage aperture 3 can be shaped to the cell strip 8 or to the cell frame 7 or, for instance, to both so that the drainage apertures 3 in the intact position of the honeycomb do not form apertures extending through a sidewall of a honey cell through which apertures the bees would have a passageway to an adjacent honey cell. Here an aperture, which extends through the sidewall 9 of a honey cell means that the aperture extending through the sidewalls 9 in the intact position must not be so large that the bees would not clog it up. So, in other words in this connection there can be gaps in the sidewalls 9 of the adjacent honey cells of the honeycomb, which extend from one honey cell to another and which small gap the bees will clog up by building before producing honey.

In addition, the structures 1 of the honeycomb of the accompanying beneficial embodiment examples of the invention comprise also end bars 11 and 12 in both ends of the honeycomb frame, but of course the structure 1 of the honeycomb frame can be implemented also without separate end bars 11, 12. In the accompanying beneficial embodiment examples of the invention these end bars 11, 12 are different by structure, which structural difference results mainly from that only one of the end bars in one end is equipped with a honey exit hole 13, but of course correspondingly the structure 1 according to the invention can be implemented also for instance with same end bar in both ends after slight changes in the shape or completely without end bars. In the accompanying embodiment example, the end bars 11 and 12 are attached by means of fastening members to the cell frames 7 same way as the cell frames 7 are attached to each other, but of course the attachment of the end bars 11 and 12 could be implemented also in some other different way. For instance, in one other beneficial embodiment example of the invention the cell frames 7 and end bars 11 and 12 are attached to each other by means of traditional fastening members such as tightened together with a wire or for instance by screws and nuts or with a threaded bar in which cases the structure 1 according to the invention still functions excellent and thus is not dependent on the type of fastening members being used. The mentioned new clip fastening method is remarkably more convenient for assembling and also for disassembling if needed for instance if some component of the honeycomb frame the structure 1 of the honeycomb frame being according to the invention would need to be replaced by a new one. A honeycomb frame according to the invention is disassembled into parts if needed by opening the clip connections, that is, by pressing, that is, by bending for instance with the help of a screw driver or other similar tool the fastening bracket 14 downwards and simultaneously pulling the parts, which are connected to each other by this connection in question formed by the fastening bracket 14 and the corresponding counter bracket 15 in question, away from each other. This is convenient to do so that the fastened connections are opened one end at a time, that is, for instance by first opening the connection in the top end of the cell frames 7 connected to each other and after that the connection in the bottom end is opened so that each fastening connection formed by a fastening bracket 14 and a counter bracket 15 is opened in a controlled manner and without any of the parts breaking while opening the connections. To be noted here is that especially the fastening bracket 14 is in this embodiment shaped to be flexible and is made of flexible material so that it can be bent downwards, that is, towards the honeycomb so that the mating surface 44 of the fastening bracket 14 does not touch the mating surface 49 of the counter bracket 15 of an adjacent cell frame 7 or end bar 11, 12 and each fastening connection in question formed by a fastening bracket 14 and a counter bracket 15 can thus be disassembled when the adjacent components are pulled away from each other when simultaneously pressing the outer edge 43 of the fastening bracket 14 downwards. In this case the downwards-direction means for instance in the top end of a beneficial embodiment of the cell frame 7 shown in drawing FIG. 7 to press the outer edge 43 of the fastening bracket 14 downwards towards the honeycomb and in the bottom end correspondingly to press it upwards towards the honeycomb due to the fact that in this example the connections formed by a fastening bracket 14 and a counter bracket 15 are made to be opened then when the fastening bracket 14 is pressed towards the honeycomb. Of course this interlocking of the cell frames 7 and the end bars 11, 12 could be implemented also so that the fastening brackets 14 are bent to the other direction, that is, away from the honeycomb in which case for instance with using a flat-headed screwdriver the fastening bracket 14 could be bent away from the honeycomb when a gap or some other shape is shaped between the fastening bracket 14 and a counter bracket 15 into which the tip of the flat-headed screwdriver can be pushed and which gives a support point for bending the fastening bracket 14 with a screwdriver.

The attachment of the end bars 11, 12 of the accompanying beneficial embodiment examples of the invention to the cell frames 7 is implemented same way with the help of the fastening members, that is, in this embodiment example by means of the fastening brackets 14 and the counter brackets 15 and the alignment pins 16 and its recesses 17 as the attachment of the cell frames 7 to each other is implemented. Due to the fact that the cell frames 7 are attached to each other one after the other always in the same orientation as the previous cell frame 7, that is, the fastening brackets 14 always point to the same direction in the honeycomb frame, in the accompanying embodiment examples the first end bar 11 is equipped also with the fastening brackets 14 and the other end bar 12 is equipped with the counter brackets 15. So, the fastening brackets 14 of a cell frame 7 are pushed and locked in place to the counter brackets 15 of the second end bar 12 and correspondingly the fastening brackets 14 of the first end bar 11 are pushed and locked in place to the counter brackets 15 of an adjacent cell frame 7. Correspondingly the first cell frame 7, which is the first in the queue, is locked in place to the first end bar 11 so that the fastening brackets 14 of the first end bar 11 are locked in place to the counter brackets 15 of the cell frame 7.

It is worth mentioning that normally the honeycomb frame should not be disassembled due to maintenance or washing or other similar procedure, but instead in normal beekeeping use only the bees service the honeycomb in the honeycomb frame and the bees also keep it clean.

Figure 27:
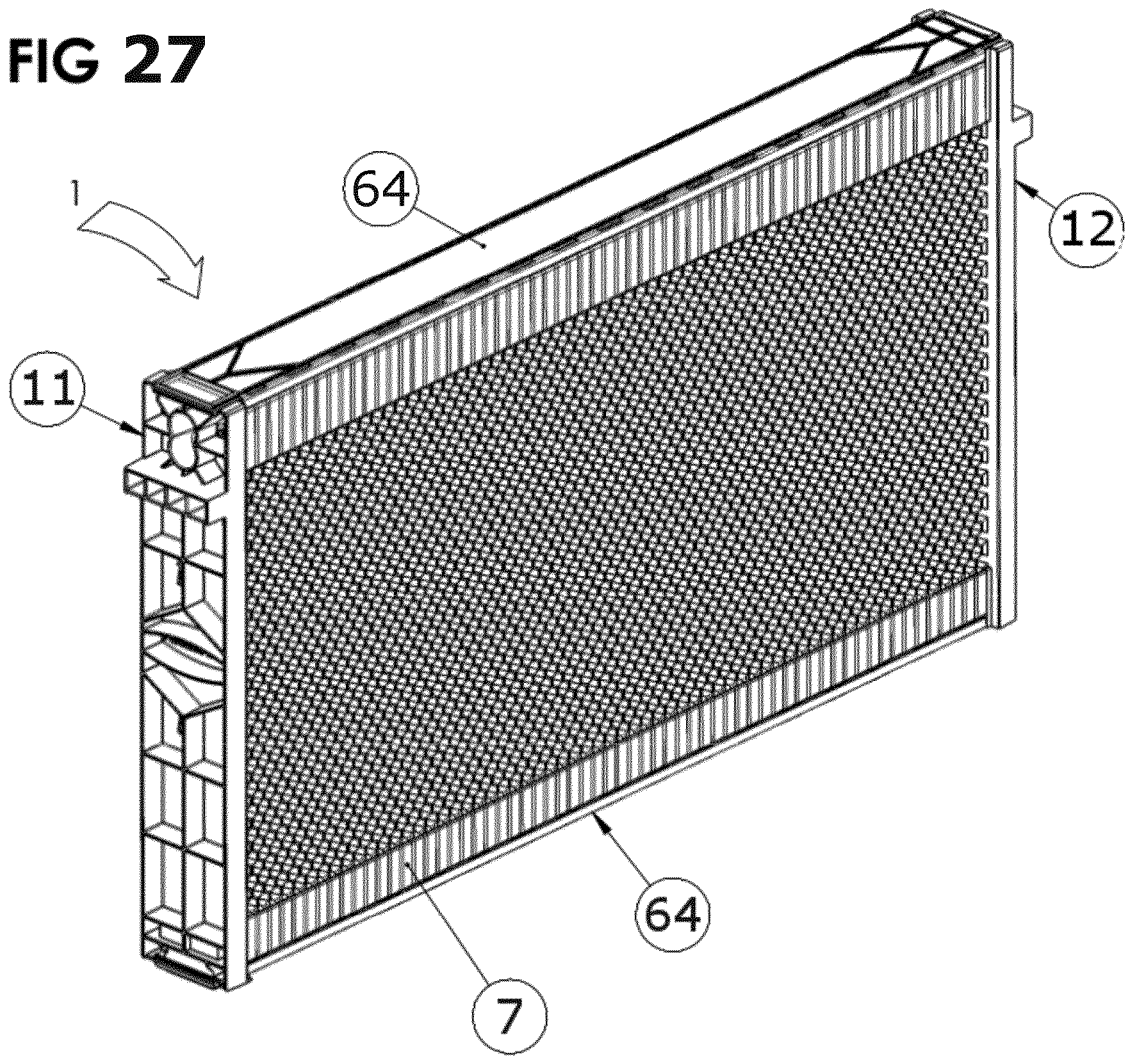
FIG. 27: The drawing shows an embodiment example of a honeycomb frame, the structure of which is according to the invention, viewed obliquely from the side, which honeycomb frame is equipped also with special locking parts in the bottom and top ends of the honeycomb frame.
Figure 28:
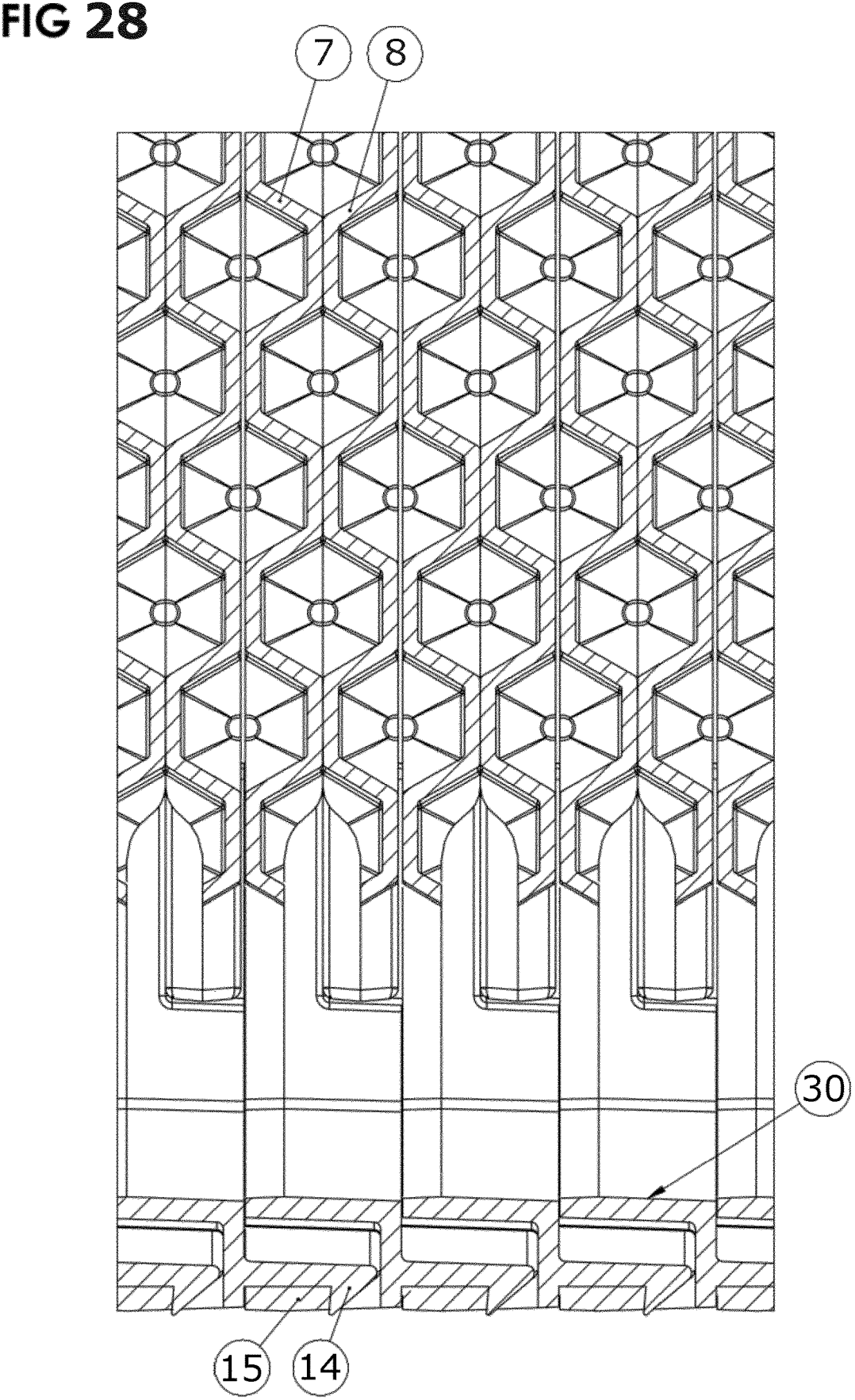
FIG. 28: The drawing shows a side view of a cut section of an embodiment example of the lower portion of a honeycomb frame the structure of which being according to the invention and being in honey collection position. A honey channel located in the bottom end of the honeycomb frame is also shown illustratively in this drawing.
Figure 29:
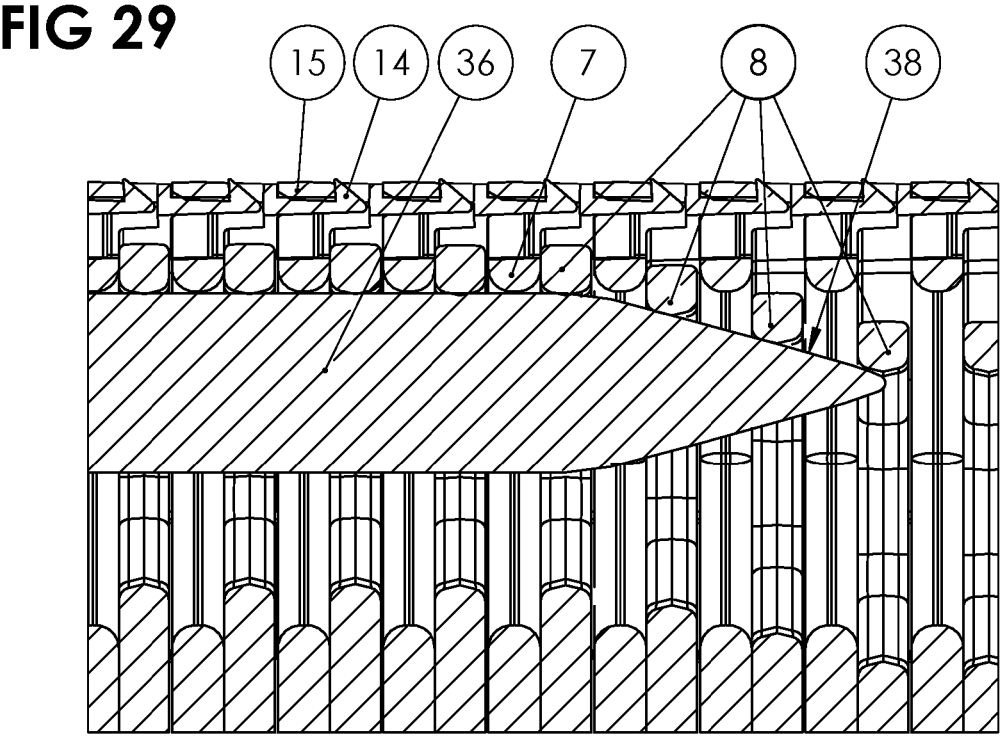
FIG. 29: The drawing shows a side view of a cut section of an embodiment example of the upper portion of a honeycomb frame the structure of the honeycomb frame being according to the invention while the opening shaft is pushed into the honeycomb frame for moving the honeycomb to the draining position. In the example of the drawing the version of the opening shaft is such that it moves simultaneously two or three cell strips when moved to the draining position or to the honey collection position.

The honeycomb frame equipped with the structure 1 according to the invention is in one of its beneficial embodiment examples shown in drawing FIG. 27 equipped also with special locking parts 64 in the top and bottom ends of the honeycomb frame for additional rigidity. Grooves 48, which are shown in drawings FIG. 15 and FIG. 16, have been shaped for the locking parts 64 to the top end and to the bottom end on both vertical sides of the cell frame 7 so that the cell frames 7 are locked in vertical direction with the locking part 64 so that possible small clearances in the dimensions of the fastening members do not affect the dimensions of the honeycomb frame in vertical direction, that is, in other words the honeycomb frame does not hang in the middle of the honeycomb frame slightly lower than the ends of the honeycomb frame due to its own weight. The honeycomb frame is supported in one example as an ordinary honeycomb frame from its ends in a beehive box, but in one other beneficial embodiment example the honeycomb frames in a beehive box are supported also from the center of the honeycomb frame. Of course, some other way of supporting also suits for the placing and supporting of this honeycomb frame inside a beehive box.

In one third beneficial embodiment example of the invention the structure 1 according to the invention is implemented completely without end bars so that the honeycomb frame is then supported in its place to the correct position of the honeycomb by the shaping of the other parts of the beehive box 23 such as, for instance, by the shaping of the intermediary bottom part 27 into which, according to one embodiment, supporting brackets have been shaped to underneath the honeycomb frames, which support the honeycomb frames. According to one other embodiment corresponding supporting brackets have been shaped to the upper portion of the beehive box 23 for a honeycomb frame so that also in this case the structure 1 of the honeycomb frame is implemented completely without the end bars 11, 12.

The drainage apertures 3 increase remarkably the draining space for the honey inside the honeycomb and also enable the flow/draining of honey from the gaps 10 between adjacent cell frames 7 and cell strips 8 to the next corresponding adjacent gap 10.

One beneficial embodiment of the new structure 1 of the honeycomb frame comprises drainage apertures 3, which can be also shaped in special cases to just some of the vertical sidewalls 9 of the honeycomb. In one beneficial embodiment example the drainage apertures 3 are shaped to the cell strips 8 and the size of the drainage holes 3 changes so that the size of the drainage apertures 3 is the largest in the vertical sidewall 9 of the lowest honey cell and the size decreases in the walls of the upper honey cells so that the size of the drainage aperture 3 decreases when going upwards and the size of the drainage hole 3 is the smallest in the honey cells located midway of the height of the honeycomb frame and above this midway point there are no drainage apertures 3 in the vertical sidewalls 9 of the honey cells. This need for larger drainage apertures 3 lower in the honeycomb is due to the fact that lower in the draining space a larger amount of honey flows in the gaps 10 of the honeycomb the amount being the largest in the gap 10 at the location of the lowest honey cell. Of course, the drainage apertures 3 according to the invention can be shaped also some other way to the honeycomb which forms the honeycomb frame. For instance, so that every other drainage aperture 3 of the vertical sidewall 9 of the honey cell is shaped to the cell strip 8 and every other to the cell frame 7.

In the accompanying beneficial embodiment examples of this invention the drainage apertures 3 are shaped to the vertical sidewalls 9 of the honey cell, but of course it is clear that these drainage apertures 3 can be shaped also to other sidewalls after suitable changes. In addition, as a special case the honeycomb of the honeycomb frame can be also in different angle than in the accompanying beneficial embodiment examples such as in a 30-degree or 45-degree angle compared to the accompanying examples in which case also the opening mechanism of the honeycomb is turned to same angular position and thus also the movement direction of the cell strip 8 is turned to same angular position. So, in other words this invention functions also if it is in different position relative to the gravity field compared to the accompanying beneficial embodiment examples of the invention. In the case the function of the honeycomb frame according to the invention is turned 90 degrees or almost 90 degrees, the drainage apertures 3 have been changed in one beneficial embodiment so that they allow honey to flow through/via both, the cell frames 7 and cell strips 8, after suitable changes being made. This can be implemented for instance so that the drainage apertures 3 are shaped exceptionally to the cell frames 7 and to the cell strips 8 so that they form still an intact honeycomb in the closed position, that is, in the honey collection position. Of course, the honeycomb of the honeycomb frame equipped with a structure according to the invention can be split also in some different location than that location wherein it is split in the accompanying beneficial embodiment examples of the invention and in addition, the honeycomb of course can be turned to different angle than that which is shown in the accompanying beneficial embodiment examples of the invention while the invention still functions as it is described to function. The most beneficial way to split the honeycomb for effortlessly opening the honeycomb frame and for the best durability of the parts of the honeycomb frame is as shown in the accompanying embodiment examples of the invention, that is, vertically and symmetrically split from the upper and lower corners/tips of the symmetrical hexagon. This way none of the components of the honeycomb frame have any sharp and mechanically weak parts of the honeycomb, which would be in risk of breaking when opening the honeycomb frame to the draining position or when closing back to the honey collection position. It is mentioned that such a honeycomb, which is split so that in its halves or at least in one of the halves sharp edges of the honeycomb exist, is in a risk of breakage still even if the sharp edges of the honeycomb would not be in contact with the other half and even if there would be a gap between them the size of the gap being, for instance, even several millimeters. This is due to the fact that breaking the honeycomb, which is built by bees, when opening a honeycomb frame is enough to break thin and sharp extensions/limbs made of, for instance, plastic or some other material.

It is further mentioned that when the honeycomb is split in the same way as in the accompanying beneficial embodiment examples of the invention, while opening the honeycomb the movement of the cell strips 8 does not harm the bees because the structure does not contain any sharp edges and/or extensions/limbs.

So, the honeycomb formed by the cell frames 7 and the cell strips 8 is in the accompanying embodiment examples of the invention split so that in both parts, the cell frames 7 and the cell strips 8, there are all the sides of each half of the honey cell, which honey cells are formed in the honey collection position, that is, a total of three sides in each half of a honey cell. Then the honeycomb forming areas of both parts, the cell frame 7 and the cell strip 8, form a continuous and smooth area, which is also durable. Of course, the tear-shaped drainage apertures 3 are also located in this smooth area in some beneficial embodiments of the invention. Of course, this implementation of the splitting of the honey cell could be implemented in some other way which differs from the accompanying embodiment examples if needed and where applicable while the structure 1 according to the invention functions still as it has been described to function in the description.

Regarding the splitting of the honeycomb in the accompanying beneficial embodiment examples of the invention it can be said also that the honeycomb is in these beneficial embodiment examples divided into two parts because, as mentioned, no portions of the honeycomb is cut so that some sharp portion or edge would be formed to both or to at least one of the halves of the honeycomb. In the accompanying beneficial embodiment examples between the opposite halves of the honeycomb, that is, the cell frames 7 and the cell strips 8 there are no gaps, but of course there could be a gap between them while still the invention would function as it has been described to function. The size of this gap can be from tenths of a millimeter to even several millimeters.

To be noted is that even though the structure 1 of the honeycomb frame would be turned to other position than in the accompanying beneficial embodiment examples of the invention, the vertical sidewalls 9 of the honey cell can be still called vertical, because vertical in this context means exceptionally the direction in which the sidewalls 9 are originally relative to the cell frame 7 and cell strip 8 regardless of what angular position the structure 1 of the honeycomb frame is turned.

Regarding hygiene it is also worth mentioning that the new structure 1 of the honeycomb frame is also remarkably easier to be washed with water in case there is a need for this occasionally because the apertures of the honeycomb walls remarkably improve also the flow of water and also ventilation inside the honeycomb of the honeycomb frame.

It is mentioned also that in the accompanying beneficial embodiment examples of the invention there are a total of 62 pairs formed by the cell frames 7 and the cell strips 8 in one structure 1 of the honeycomb frame according to the invention, but of course the invention can be implemented also with some other quantity of these pairs depending of course on, for instance, that how large is the beehive box/frame box 23 and the size of the honeycomb and also the size of the honeycomb frame. In the accompanying embodiment examples of the invention the beehive box 23 is suitable for Langstroth-size honeycomb frames.

Figure 8:
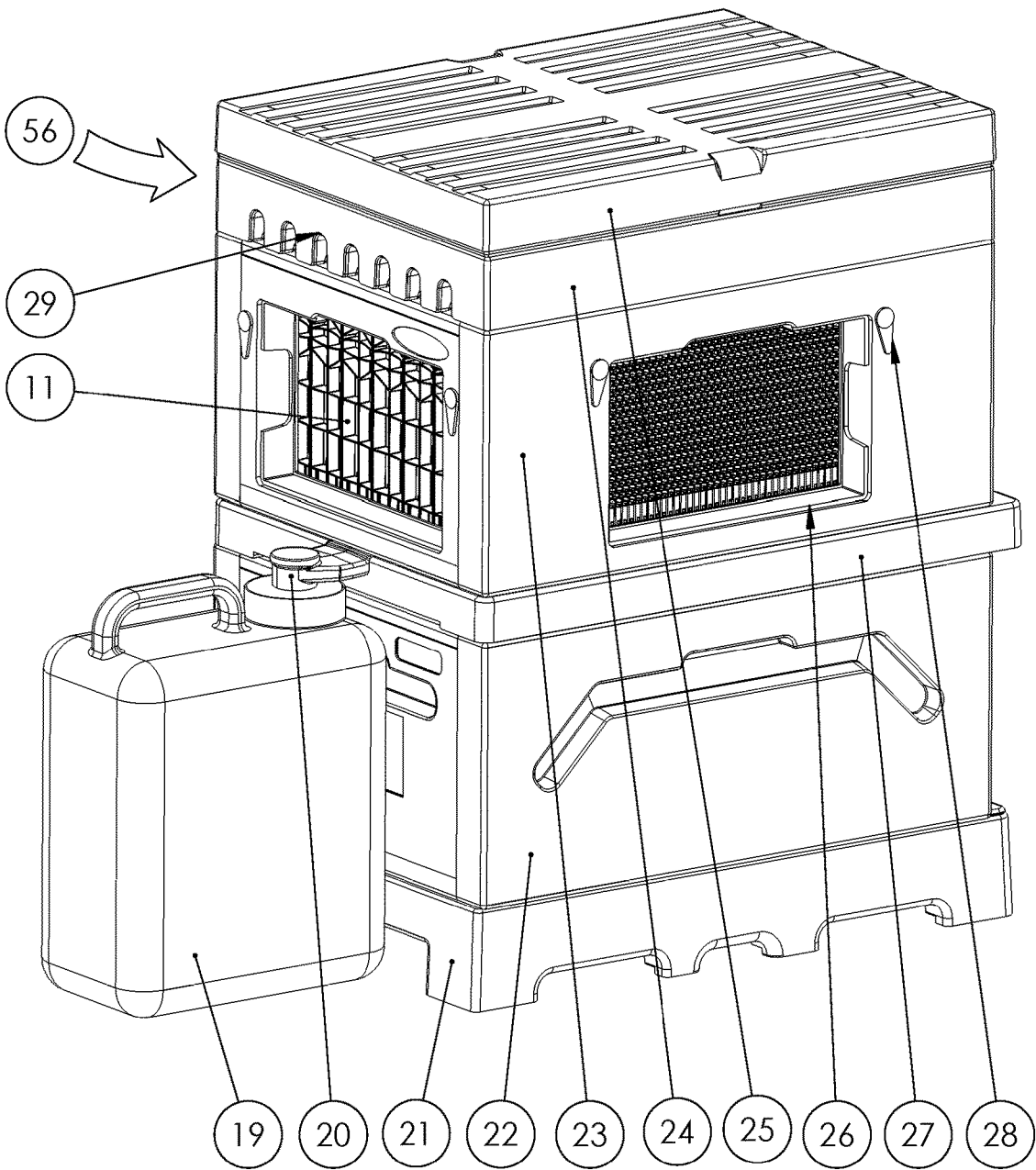
FIG. 8: The drawing shows a beneficial embodiment example of a beehive equipped with honeycomb frames, which utilize the invention, viewed obliquely from the side.
Figure 9:
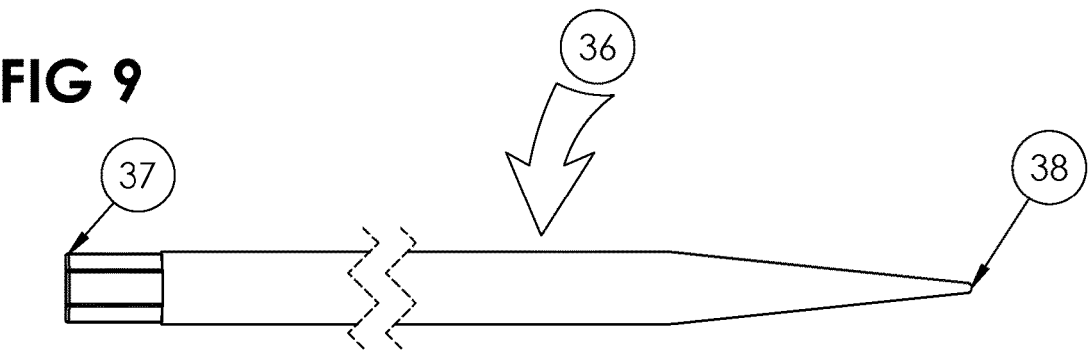
FIG. 9: The drawing shows an opening shaft viewed directly from the side.
Figure 10A:
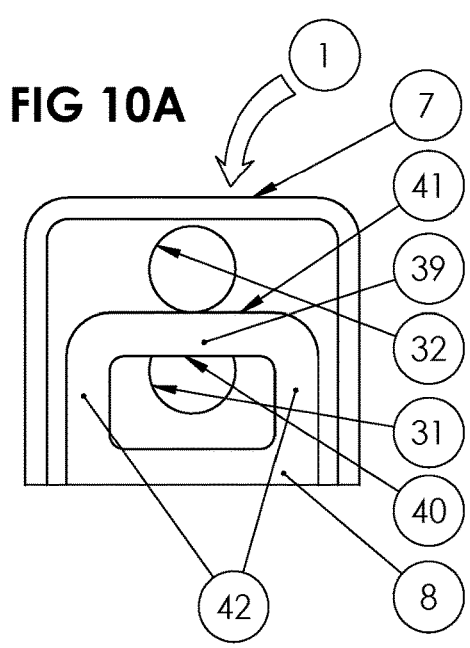
FIG. 10A: The drawing shows one beneficial embodiment example of the location of the guide holes of a cell frame relative to the guide protrusion of a cell strip the cell strips being in lower position and viewed directly from the front.
Figure 10B:
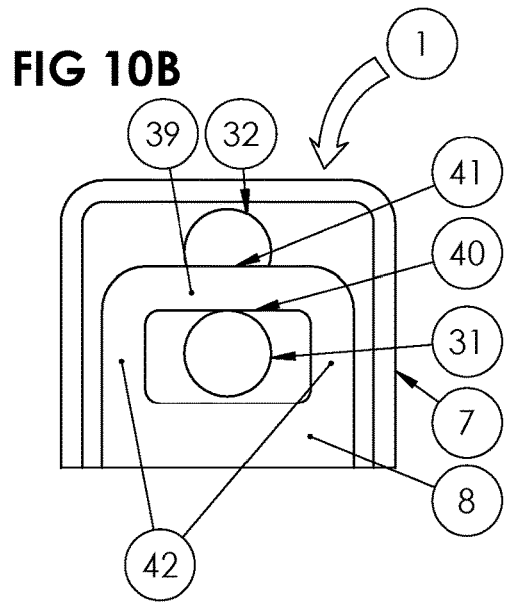
FIG. 10B: The drawing shows the example of drawing FIG. 10A in upper position and viewed directly from the front.
Figure 11A:
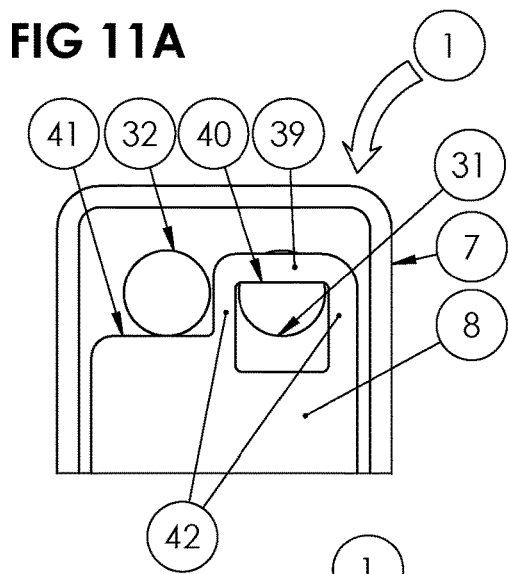
FIG. 11A: The drawing shows one other beneficial example of the location of the guide holes of a cell frame relative to the guide protrusion of a cell strip the cell strips being in lower position and viewed directly from the front.
Figure 11B:
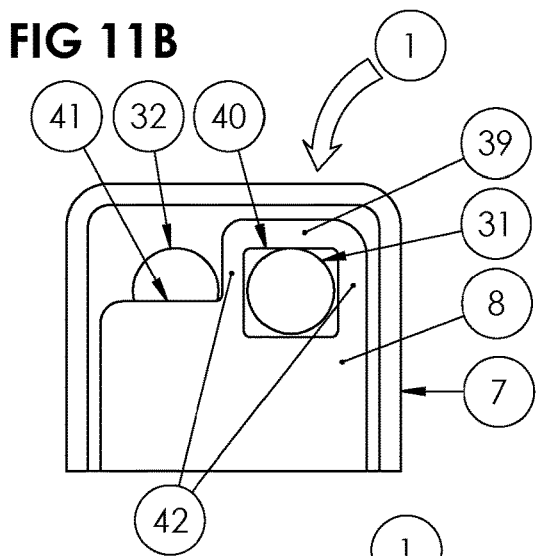
FIG. 11B: The drawing shows the example of drawing FIG. 11A in upper position and viewed directly from the front.
Figure 12A:
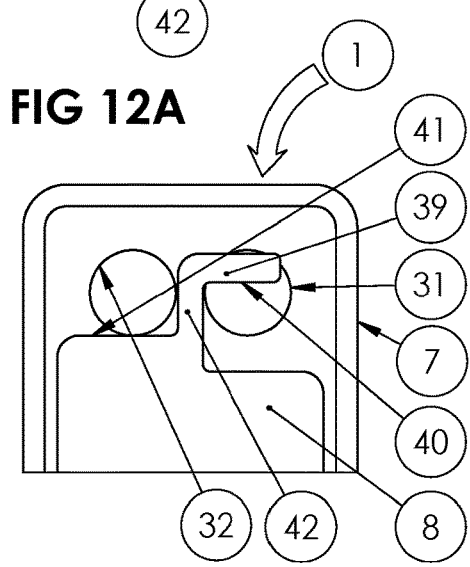
FIG. 12A: The drawing shows a third beneficial example of the location of the guide holes of a cell frame relative to the guide protrusion of a cell strip the cell strips being in lower position and viewed directly from the front.
Figure 12B:
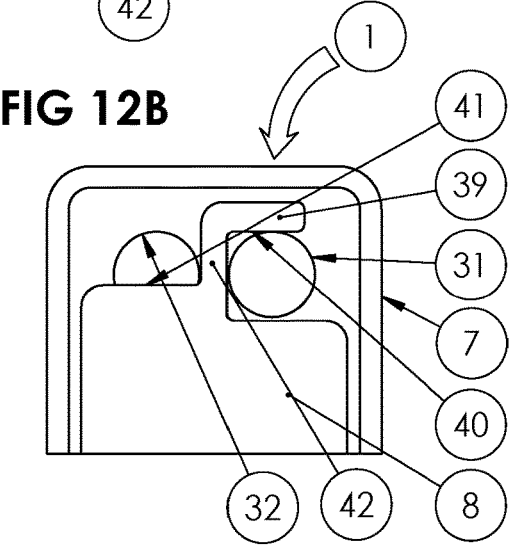
FIG. 12B: The drawing shows the example of drawing FIG. 12A in upper position and viewed directly from the front.
Figure 16:
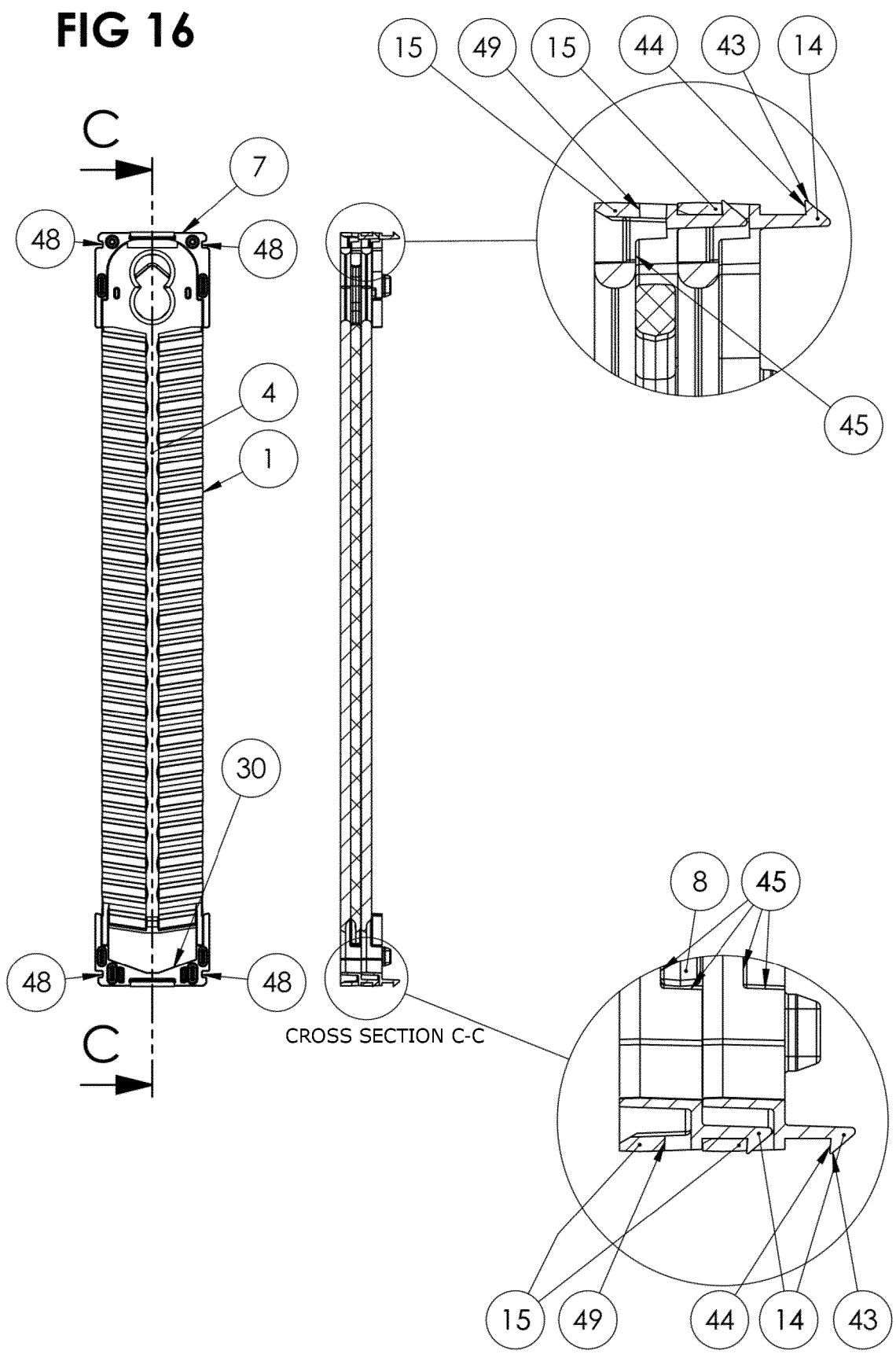
FIG. 16: The drawing shows viewed directly from the front two cell frames assembled together and one cell strip located inside them and a cut section view of this example assembly cut vertically along the centerline of the assembly. Especially some detailed structure of the clip fastening in the upper and lower ends of this example assembly is shown in magnifications of the cut section view.
Figure 17:
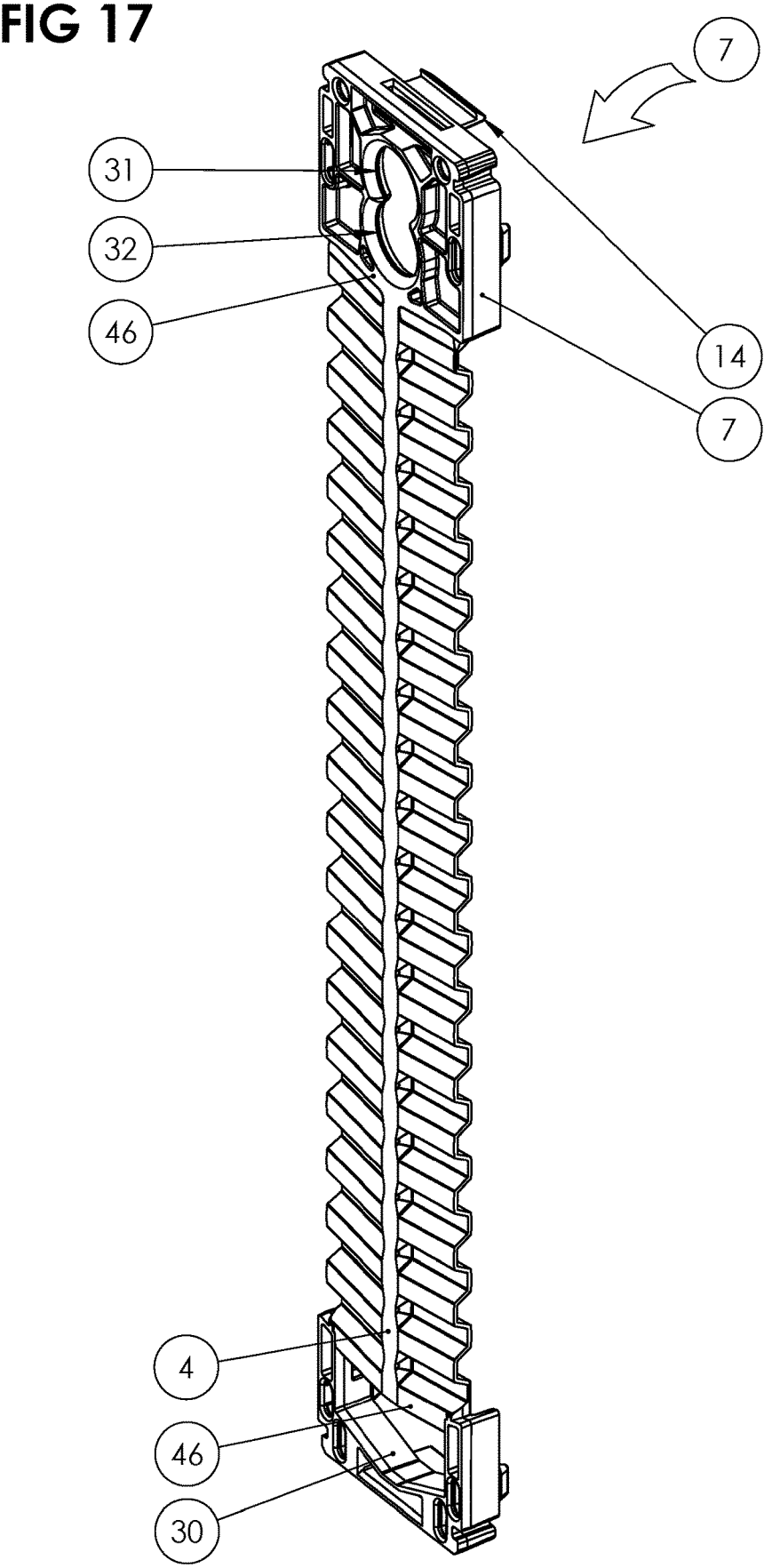
FIG. 17: The drawing shows one embodiment example of the cell frame viewed obliquely from the side in which example also the back surface of the cell frame is shown.
Figure 18:
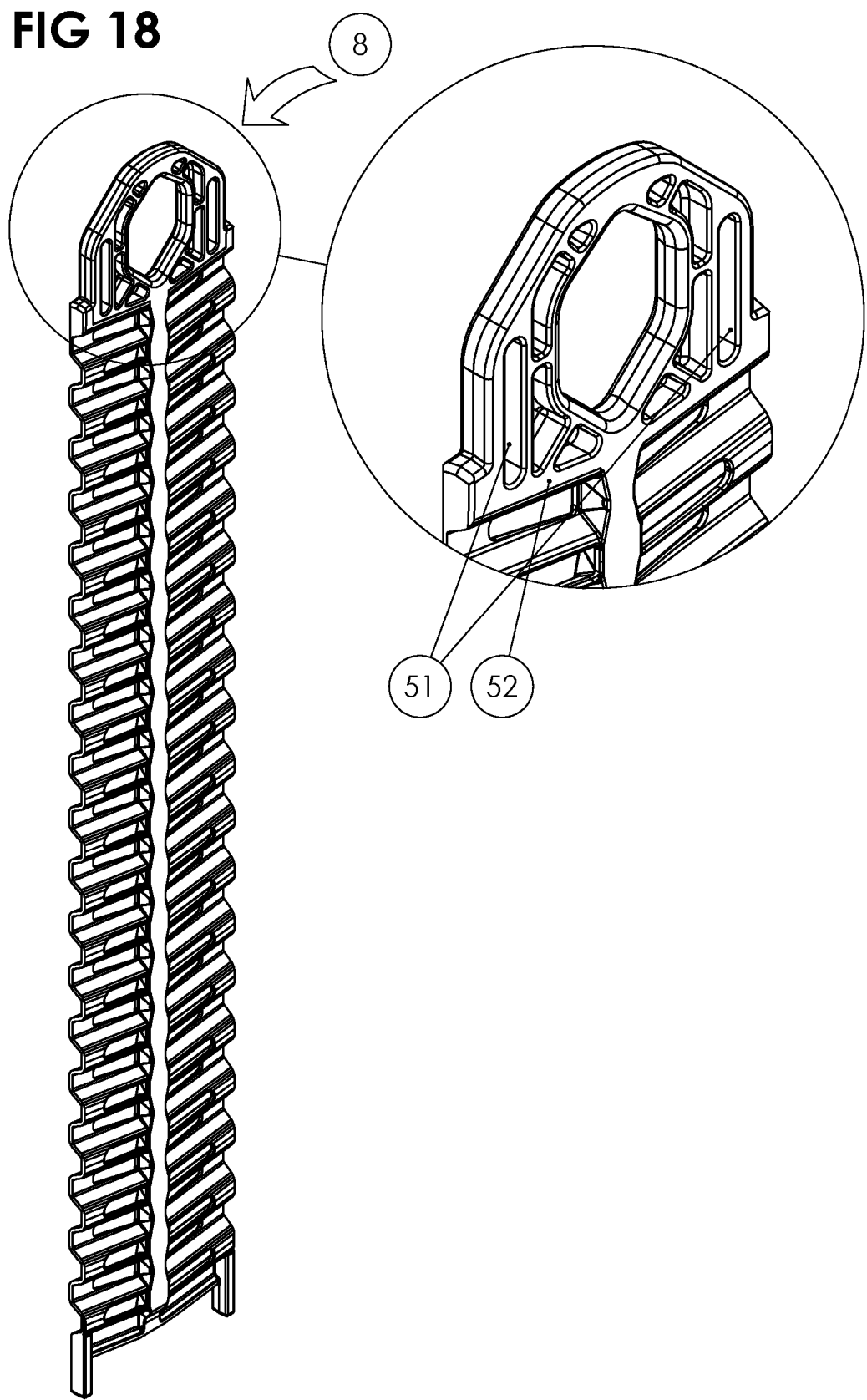
FIG. 18: The drawing shows one embodiment example of a cell strip viewed obliquely from the side in which also its back surface and the grooves for guide pins located in the back are shown.

One beneficial embodiment example of a beehive 56, which is shown in drawing FIG. 8 and which is equipped with honeycomb frames the structure 1 of the honeycomb frames being according to the invention, is equipped with a total of seven honeycomb frames in one beehive box 23 the structure 1 of the honeycomb frames being according to the invention. In addition, this embodiment example comprises as components of the beehive 56 at least a beehive bottom part 21, the lowest beehive box 22, which is the brood box, a special intermediary bottom part 27 located on top of the lowest beehive box 22, a beehive box 23 located on top of this intermediary bottom part 27, which beehive box 23 contains therefore seven honeycomb frames the structure 1 of the honeycomb frames being according to the invention, an intermediary platform 24 located on top of the beehive box 23, a lid 25 located on top of this intermediary platform 24, a honey funnel 20 recessed/embedded into the intermediary bottom part 27 and a honey tank 19, which honey tank 19 is located in this example physically outside the beehive. In this example the honey drains in the draining space along a honey channel 30 of a honeycomb frame, the structure 1 of which honeycomb frame is according to the invention, into the honey funnel 20 through a honey exit hole 13, which is shaped to the first end bar 11 of one end of the honeycomb frame, and the honey funnel 20 leads the honey into the honey tank 19 through the inlet aperture of the honey tank 19, which honey tank 19 is located outside the beehive. So, the cell frames 7 attached to each other one after the other form the honey channel 30 inside the honeycomb frame and thus a portion of the honey channel 30, which portion has the length equal to the thickness of the cell frame 7, is located in the lower portion of each cell frame 7. The intermediary platform 24 is in this example equipped with bypass holes 29 for the usage of the opening mechanism of the honeycomb frames, the structure 1 of which honeycomb frames is according to the invention, through which bypass holes 29 the opening of the honeycomb frames is performed with the help of the opening shaft 36. So, in the accompanying example there are a total of seven of these bypass holes 29, that is, one bypass hole 29 for each honeycomb frame. In the accompanying example due to clarity, there is only one beehive box 23, which contains honeycomb frames the structure 1 of these honeycomb frames being according to the invention, but of course, if needed, more than one beehive box 23 can be placed on top of each other into one beehive in which case of course an intermediary bottom part 27 must be located on top of the intermediary platform 24, which is located on top of the lower beehive box 23, on top of which intermediary bottom part 27 the upper beehive box 23 is placed or alternatively the structures of the intermediary bottom part 27 can be shaped on to the upper surface of the intermediary platform 24 so that the intermediary platform 24 functions also as an intermediary bottom part for the beehive box 23 located on top of this intermediary platform 24. When the honeycomb frame is in normal use in the honey collection position, the bypass holes 29 can be plugged with a separate plug for minimizing the heat loss, which plug can be such that it plugs more than one bypass hole at once or on the other hand also for example such a plug that it plugs all the bypass holes 29 located in one end, that is, in this example a part that plugs simultaneously seven bypass holes 29. In this embodiment the honey funnel 20 is recessed inside the intermediary bottom part 27 so that its height is as little as possible so that the need for space in vertical direction for the intermediary bottom part 27 would be as little as possible. In addition, in this embodiment the intermediary bottom part 27 is simultaneously also an access control part for the bees, into which a special bee access control component can be installed, through which bee access control component the bees can enter and exit the beehive. In this embodiment the function of the intermediary platform 24 is to protect the honeycomb frames inside it and in some embodiments the intermediary platform 24 is also simultaneously an intermediary bottom part for an upper beehive box 23 located on top of the intermediary platform 24 in case above it a second beehive box 23 containing honeycomb frames has been placed. Then another honey funnel 20 can be conveniently arranged to be recessed/embedded and thus to be stationary on to the upper surface of the intermediary platform 24 for draining of the honeycomb frames of the upper beehive box 23 the structure 1 of the honeycomb frames being according to the invention.

In the accompanying beneficial embodiment examples of the invention the purpose of the intermediary platform 24 is also to give more space for the honeycomb frames located inside the beehive box 23 the structure 1 of the honeycomb frames being according to the invention and which honeycomb frames therefore extend above the dimensions of the beehive box 23 due to the space requirement of the opening mechanism in this embodiment. Of course, it is clear, as mentioned before, that the beehive of the accompanying examples is possible to be implemented also, for example, without the intermediary platform 24 and also without the intermediary bottom part 27 or with some other way shaped intermediary platform and/or intermediary bottom part and in addition, it is noted that in some possible embodiment examples of the invention there may not be any need for any kind of intermediary platform and/or intermediary bottom part. The same applies also to the honey funnel 20, which may not be needed at all in some possible beneficial embodiments of the invention or it can be differently shaped and also located differently, for instance it could be located also completely outside the beehive or correspondingly in case for instance if the honey tank would be located inside the beehive, the honey funnel would be shaped and arranged to be placed completely inside the beehive. Also, the bypass holes 29 can be implemented for instance as one continuous aperture defined by the area reserved by the bypass holes 29 and not as shown in the accompanying examples, that is, as seven separate holes/apertures the number of the holes/apertures being seven due the fact that in the embodiment example in question there are seven honeycomb frames the structure 1 of the honeycomb frames being according to the invention in one beehive box. Of course, the number of the honeycomb frames in a beehive box 23 can differ from this while still the invention functions as it has been described to function.

It is mentioned that the exiting of the honey from the honey channel 30 of the honeycomb frame out and further to the honey container, which honey container can be for instance the honey tank 19 shown in drawing FIG. 8 or for instance a honey jar, is arranged to drain via the honey funnel 20, which is recessed into the intermediary bottom part 27, or for instance to drain outside the beehive box 23 via a pipe, which pipe extends from inside the beehive box 23 to outside the beehive box 23 through a hole located in the side of the beehive box 23. In the accompanying embodiment examples seven honeycomb frames the structure 1 of the honeycomb frames being according to the invention are fitted into one beehive box 23, which beehive boxes 23 there can be several in one beehive, for instance from one to six beehive boxes 23, but of course also some other quantity of the honeycomb frames, which quantity depends on the thickness of the honeycomb frames the structure 1 of which being according to the invention, is suitable for placing into one beehive box 23. In addition, the dimensions of the beehive box 23 of course effect that how many honeycomb frames equipped with a structure 1 according to the invention fits into one beehive box 23.

Figure 20:
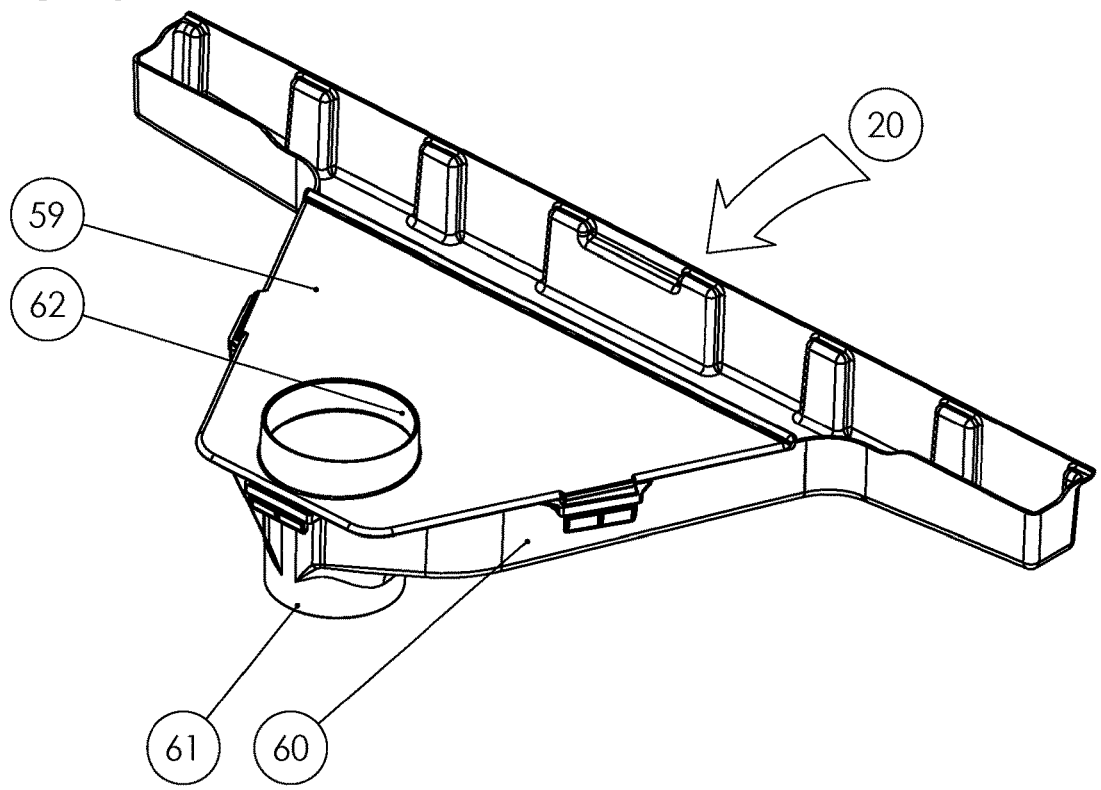
FIG. 20: The drawing shows viewed obliquely from the side a honey funnel of a beehive containing honeycomb frames the structure of the honeycomb frames being according to the invention.

One beneficial embodiment of the honey funnel 20 is shown in drawing FIG. 20 in which embodiment the honey funnel 20 has been assembled from two parts, the bottom part 60 and the lid part 59. Of course, the honey funnel is possible to be implemented also in some other way and it still functions as it has been described to function, that is, it functions as a honey draining passageway out from the beehive box 23 into the honey tank 19 located outside the beehive. The honey tank 19 is also in one beneficial embodiment of the invention shaped to inside the beehive. Also, a honey exit aperture 61 of the honey funnel 20 is shown in drawing FIG. 20 and also shown is an upper honey aperture 62 for attaching a honey drainage pipe from the upper honey funnel 20 to a lower honey funnel 20 for draining the honey from the upper beehive boxes 23. In case there are no more beehive boxes 23 in the beehive located above the beehive box 23 in question, the upper honey aperture 62 is plugged with a separate plug. Also, if below the honey funnel 20 in question there is no honey tank 19 or honey drainage pipe, the lower honey exit aperture 61 is also plugged with a separate plug if needed. In the case of several beehive boxes 23 containing honeycomb frames equipped with a structure 1 according to the invention are stacked on top of each other, the honey is guided to drain along a honey drainage pipe from the honey exit aperture 61 of an upper honey funnel 20 to the upper honey aperture 62 of the lower honey funnel 20 and further downwards from this honey funnel 20 and eventually from the honey exit aperture 61 of the lowest honey funnel 20 into the honey tank 19.

Figure 21:
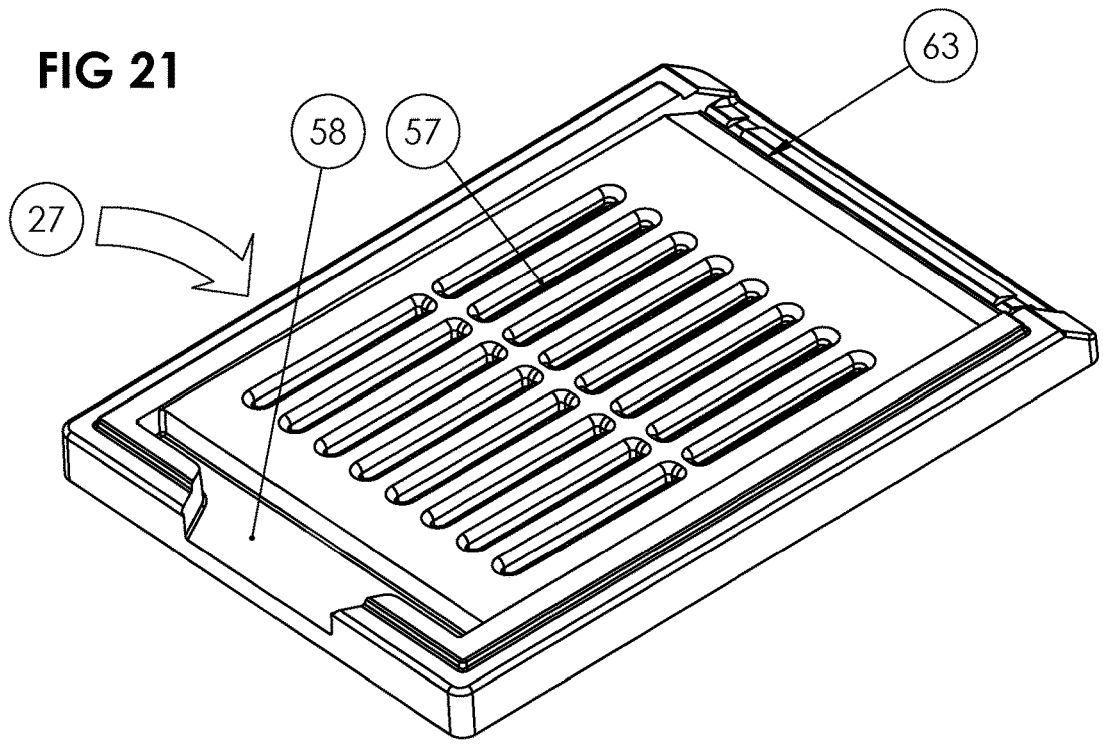
FIG. 21: The drawing shows viewed obliquely from the side an intermediary bottom part of a beehive containing honeycomb frames the structure of the honeycomb frames being according to the invention.

One beneficial embodiment of the intermediary bottom part 27 is shown in drawing FIG. 21, which is also equipped with a recessed groove/space 58 reserved for the honey funnel 20, into which the honey funnel 20 is placed, and bee passageways 57 for bees to move from underneath the intermediary bottom part 27 to on top of it and vice-versa, which bee passageways 57 are in this case gap-like. In addition, in the embodiment of drawing FIG. 21, a second recess 63 for the bee access control component is shown.

In addition, a beehive box 23 of an accompanying embodiment example shown in drawing FIG. 8, inside which the honeycomb frames equipped with a structure 1 according to the invention are located, is equipped with viewing windows 26 as an example, through which it is pleasant for the user to watch the draining of the honey and the bees working inside the beehive. The viewing window 26 can be placed to one end of the beehive box 23 or to both ends or to one side of the beehive box 23 or to both sides. That is, there can be from one to four viewing windows 26 in a beehive box 23 in this embodiment example. Of course, if needed, in one side or in one end there can be more than one smaller viewing window 26 or of course the beehive box 23 can be equipped with only sides and ends without any viewing windows 26. In a beehive box 23 of an accompanying example of drawing FIG. 8, there are also means for closing the window when it is not used for watching the bees. A window cover, which closes tightly each viewing window 26, can be installed into a viewing window 26 so that it stays in the aperture which comprises the viewing window 26 due to tight clearance between the aperture and the viewing window 26 without any additional means for holding it, but in an accompanying embodiment example of the invention due to easier mounting and removal of the window cover, it is also supported in its place to the aperture in question with two window cover retainers 28, which window cover retainers 28 are placed symmetrically on both sides of the window horizontally inline in the proximity of the upper tips of the rectangular-like aperture which comprises the viewing window 26. Of course, they can be placed also to some other position which differs from this example. Each window cover retainer 28 is supported to the side or to the end of the beehive box 23 with the help of a locking pin mounted into holes shaped to the sides and the ends in question, which locking pin extends through the window cover retainer 28 and which locking pins allow rotational movement for the window cover retainers 28. In this same example of the drawing FIG. 8 the viewing window 26 can be kept open without the window cover in question for watching the bees working safely because between it and the honeycomb frames inside the beehive box 23 is a transparent window sheet, which is normally not removed from the viewing window 26. In the case of one beneficial embodiment example this transparent window sheet is installed in place from inside the beehive box 23 and it is with the help of shaping arranged so that the transparent window sheet cannot be pulled out by accident through the viewing window 26 when removing the window cover from the aperture/viewing window 26. In one embodiment this transparent window sheet, which can be also slightly shaded or clear by its transparency, is glued with suitable glue to its installation location inside the beehive box 23 the installation location being a special recess due to which the transparent window sheet is fully recessed after installation to the side or to the end of a beehive box 23 by, for instance, being flush with the inner surface of the side or the end of the beehive box 23. Furthermore, in one other embodiment this transparent window sheet is glued to the side or end in question from outside so that the recess in question for the transparent window sheet is implemented in this case so that after being installed in place it does not obstruct the installation of the window cover in place.

In one beneficial embodiment example of the invention the honeycomb frames, which are equipped with the structure 1 according to the invention, are equipped while located inside a beehive box 23 with an opening mechanism described earlier, which opening mechanism is arranged to drain automatically without a separate electrically operated device, for instance a cordless power drill machine, held in hand by the user in the proximity of the beehive, which automatic opening mechanism comprises in this embodiment example an electric motor and a gear connected to it and an opening shaft 36 connected to this gear and a base frame into which base frame the electric motor and the gear are attached and the opening shaft 36 is journaled so that while the opening shaft 36 rotates, it moves simultaneously in a screw-like manner forward or backward depending on which way the opening shaft 36 is rotated. Each honeycomb frame can be also equipped with its own electric motor and gear and opening shaft 36, but in this beneficial embodiment of the invention in one beehive box 23, which is equipped with a total of seven honeycomb frames the structure 1 of the honeycomb frames being according to the invention, there is one electric motor and a gear connected to it, which rotates one or more at a time or all opening shafts 36 of the honeycomb frames of the same beehive box 23 simultaneously so in this example there therefore is one opening shaft 36 in each honeycomb frame. In addition, in one beneficial embodiment example of the invention this automatic opening mechanism of the honeycomb frames is arranged by means for transmitting and receiving signals to be drained using remote control. Then the electric motor can be started with the help of a remote-control signal received by the signal receiving means, which results in an actuator connected to the means for receiving signals to rotate the electric motor connected to the actuator for starting the remote-controlled draining event. The mentioned actuator as such can be an actuator of known technology, which can as a response to remote-control impulse to start and/or to turn off the electricity supply for the electric motor, which electricity supply can be for instance electrical energy stored in a battery. The signal as such can be a suitable remote-control signal according to known technology. The remote-controlled and automatic opening of the honeycomb frames, that is, the draining in this embodiment is started, for instance, by means of a smart-phone application or other computer software in which case for instance a smart phone or some other device operated by the user sends a signal, which starts the draining, to the beehive and an actuator in the opening mechanism of the beehive directs to start/stop the rotation of the electric motor with which electric motor and the gear connected to it and the opening shaft 36 connected to the gear each honeycomb frame opens. In addition, the beehive in one embodiment also notifies the application of the smart phone of the user with signal that a honeycomb frame is full of honey and thus is ready for draining.

So, in the accompanying beneficial embodiment examples there are seven honeycomb frames, which are equipped with the structure 1 according to the invention, in one beehive box 23, but of course the beehive could be equipped with a beehive box 23, which is equipped with, for instance, five or four or, say, ten honeycomb frames and it would function of course same way as the beehive in the accompanying beneficial embodiment examples.

In addition, in the before-mentioned beneficial embodiment example of the invention, which comprises the remote-controlled draining of the honeycomb frames, the remote-controlled management of the beehives can be implemented with the same smart phone application for several different beehives simultaneously so the beehives, which utilize the invention, are identified so that they can be drained one honeycomb frame of each beehive at a time if needed.

In one other beneficial embodiment example of the invention the opening mechanisms of the honeycomb frames the structure 1 of which being according to the invention are equipped with gas charges so that in this example the opening shaft 36 is hollow from the inside and deflated by the shape of cross section and adapted to the shapes of the surrounding parts and inside both guide holes 31 and 32 an opening shaft 36 is placed extended through the whole honeycomb frame, that is, then there are two opening shafts 36 in one honeycomb frame and the opening shafts 36 are placed permanently in this example inside the honeycomb frame so it is not needed to remove them from the honeycomb frame at any stage during normal use according to the embodiment. In this example the inside space of the opening shaft 36 is connected to a gas charge and the opening shaft 36 expands and stiffens to its correct opening shaft-like shape when the gas charge explodes due to the gases released in the explosion, which opening shaft-like shape causes that when that gas charge is detonated which is connected to the opening shaft 36 inside the first guide holes 31, the opening shaft bulges and stiffens momentarily to a shape, which forces the cell strips 8 to move upwards to the draining position. Correspondingly another gas charge is connected to the inside space of the opening shaft 36 placed inside the second guide holes 32. When this second gas charge is detonated, the cell strips 8 correspondingly move downwards back to the honey collection position. Of course, it is clear that this can be implemented by changes made to the cell strips 8 and the cell frames 7 of the honeycomb frame so that the cell strips 8 move downwards to the draining position and correspondingly upwards from the draining position back to the honey collection position. The benefits of this embodiment example compared to the electrically operated and also to the remote-controlled electrically operated opening mechanism is especially a remarkably smaller need for electrical power for the required equipment when opening the honeycomb frames and thus remarkably smaller required size of the batteries required by the usage of the equipment. It is mentioned that in this example the opening shaft 36 is equipped also with an emptying hole through which the opening shaft 36 deflates by itself from the gases produced by the explosion after the detonation of the gas charge. This opening and closing of the honeycomb frames with the help of a gas charge is also beneficial in the case that starting the opening mechanism is implemented by remote control in which case of course a beehive containing honeycomb frames according to the invention is equipped as the previous example of remote control with means for receiving and transmitting signals and a remote-controlled detonation mechanism for detonating the gas charges which depends of course also on that with what kind of detonation mechanism the gas charge being used is equipped with. In this example there is at least one gas charge for each opening shaft 36 and after the detonation of each gas charge the detonated gas charge is replaced by a new gas charge. Alternatively, the gas charges can be installed at once, for instance, into all honeycomb frames of one beehive box 23 for instance by means of a special gas charge belt or structure, which belt or structure contains the gas charges in question in correct mutual orientation and position and this structure is installed in place to the beehive 23 or to its immediate proximity using a simple installation procedure, for instance, with the help of screws or some other kind of fasteners.

In one other beneficial embodiment example of the invention instead of gas charges the opening shaft 36 stiffens to the shape of the opening shaft when opening honeycomb frames with the help of compressed air in which case the compressed air supply is connected to the hollow interior space of each opening shaft 36. Of course, this same function can be implemented also with the help of some other gas if needed. According to one embodiment variant of the invention detonation means sudden increase in pressure inside the opening shaft 36 in which case the gas charge equals a sudden increase in pressure caused by a valve opening rapidly in that portion of a flow channel of the opening shaft 36, which is located after the valve. According to one embodiment variant for the material of the opening shaft 36, an elastic material, which expands according to pressure, can be chosen for those portions of the opening shaft 36, which achieve the movement of the cell strips 8. According to one embodiment the gas charge is a replaceable pressure vessel, which can be connected directly to the opening shaft 36 or to a piping which lead to the opening shaft 36, which pressure vessel can be re-filled during the maintenance of the beehive.

In those beneficial embodiments of the invention where the honeycomb frames, which are equipped with the structure 1 according to the invention, are drained by remote control using by means of an electric motor, the opening mechanism comprises in addition to the opening shaft 36 and the first guide holes 31 and the second guide holes 32 and the guide apertures 32, also the electric motor and the gear connected to it and the means for transmitting and receiving signals and the equipment for starting and stopping the electric motor and in addition the energy supply such as a solar panel and/or a battery, which stores electrical energy.

In those beneficial embodiments of the invention where the honeycomb frames, which are equipped with a structure 1 according to the invention, are drained by remote control by means of a gas charge, the opening mechanism of each honeycomb frame comprises in this case in addition to the opening shafts 36, the first guide holes 31, the second guide holes 32 and the guide apertures 33, also a gas charge and the means for transmitting and receiving signals required for remote control and a mechanism for detonating a gas charge and in addition the opening shaft 36 is in this embodiment hollow, which it does not need to be necessarily in other embodiments. In addition, in these embodiments the opening shaft 36 is flexible and elastic before the detonation of the gas charge. In other embodiments the opening shaft 36 has of course a rigid structure.

In those beneficial embodiments of the invention in which the honeycomb frames, which are equipped with a structure 1 according to the invention, are opened to the draining position by remote control by means of pneumatics, the opening mechanism of each honeycomb frame comprises in this case in addition to the opening shafts 36, the first guide holes 31, the second guide holes 32 and the guide apertures 33, also a device, which produces compressed air, and the related pneumatic hoses and the required hose connections and the means for transmitting and receiving signals required for the remote control and a mechanism for starting the device, which produces compressed air, or alternatively a mechanism for opening and closing a pneumatic valve and in addition, also in this embodiment the opening shaft 36 is hollow, which it does not need to be necessarily in other embodiments. In addition, also in this embodiment the opening shaft 36 has a flexible and elastic structure before filling it with compressed air.

A beneficial embodiment example in which the second guide hole 32 is not needed and is thus equipped with only one, that is, with only the first guide hole 31, is such in which the cell strips 8 are kept in the honey collection position by means of spring loading. This way when pushing the opening shaft 36 through the first guide hole 31 and when the opening shaft 36 touches the guide protrusions 39, the cell strips 8 move to the draining position and stay there until the opening shaft 36 is removed from the first guide hole 31 and when the opening shaft 36 does not push anymore the cell strips 8 against the spring loading, the cell strips 8 return automatically to the honey collection position by means of the spring loading. Due to this in the case of this embodiment the opening shaft 36 is removed from the first guide hole 31 only then when the honeycomb frame is empty of honey. A remarkable benefit resulting from this is that the structure 1 of the honeycomb frame is lower than in the other embodiment examples. A structure 1 equipped with one first guide hole 31 can be also equipped with an opening shaft 36, which is always inside the first guide holes 31 and extends through the whole honeycomb frame. This way the opening shaft 36 is cross-sectionally oval-shaped and in certain position its shape allows the cell strips 8 to move to the honey collection position and for instance by turning it 90 degrees from this position, it pushes the cell strips to the draining position due to the oval shape. The mentioned spring loading can be implemented in this embodiment conveniently for instance by shaping a half of a groove for a compression spring for instance to the cell frame 7 and the other counter half to the cell strip 8 so that a compression spring or several compression springs when installed into the honeycomb pairs push constantly the cell strip 8 towards the honey collection position. Of course, a similar arrangement can be implemented using some other type of spring such as a tension spring in which case correspondingly hooks or hook-like members, which hold the tension spring, are shaped to the cell frame 7 and cell strip 8. Of course, this structure 1 according to the invention and the function can be implemented, if necessary, so that the cell strips 8 of a honeycomb frame, which is equipped with a structure 1 according to the invention, would be pressed towards the draining position by means of spring loading in which case this kind of honeycomb frame would be set to draining position by removing the opening shaft 36 from the first guide hole 31. The springs mentioned in this example can be called also loading members, which loading member includes also of course other kind of members, which cause loading as described before, such as a torsion spring, the usage of which in this invention of course requires changes to some portions of the components described here so that a torsion spring can be fit into a space made for it inside a honeycomb frame, the structure 1 of which honeycomb frame is according to the invention.

The free end 38 of the opening shaft 36 is shaped as conical in these beneficial embodiment examples of the invention, which conicity is in a significant role when opening a honeycomb frame effortlessly. The exact shape of the cross section of the conical area is not of the essence in this invention, the most important is that the diameter of the cross section of the end 38, which is limited by the shape of the cross section, increases conically starting from the sharp end and allows, for instance, the opening of one cell strip 8 at a time to the draining position, but of course the invention functions fine also in the case that for instance the conical area of the end 38 is so long that while opening the honeycomb frame more than one cell strip 8 moves simultaneously, that is, more than one cell strip 8 opens at the same time, for instance two or, say, three or even more cell strips 8 at the same time. An example of the opening shaft 36 is shown in drawing FIG. 29, which moves simultaneously two or three cell strips 8 (meaning that it moves at all times when pushed at least two cell strips 8, momentarily from time to time three cell strips 8).

It is mentioned for clarification that each cell strip 8 is supported to the cell frame 7 so that it cannot move in lateral direction, but can move according to a limited movement path in vertical direction. In the longitudinal direction the movement of the cell strips 8 is prevented so that the cell frames 7 installed one after the other are arranged always to prevent the movement of the cell strip 8 of the previous honeycomb pair in the longitudinal direction.

Figure 19:
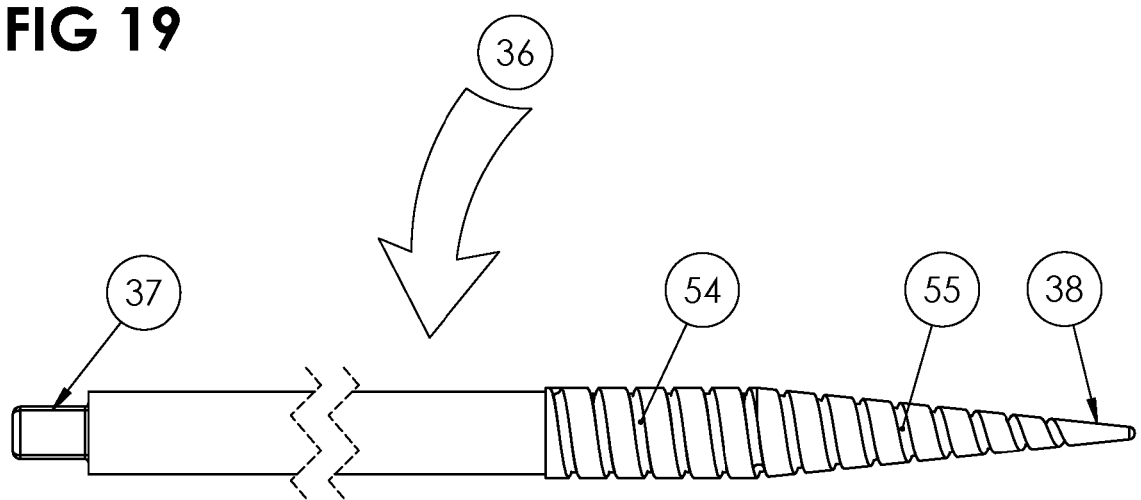
FIG. 19: The drawing shows an opening shaft according to one embodiment viewed directly from the side, which opening shaft is equipped in this embodiment with a thread in the area of its normal diameter and in its conical free end.

In one beneficial embodiment example of the invention an internal thread has been shaped at least to some portions of the first guide holes 31 and the second guide holes 32 of the cell frames 7 and a corresponding external thread has been shaped to the cylindrical area of the opening shaft 36, which is equipped with its normal diameter and which area starts from the free conical end 38 and to the conical surface of the conical free end 38. The thread 54 in question located in the cylindrical area of the normal diameter of the opening shaft 36 and shown in drawing FIG. 19, is in its area of the normal diameter, which area extends inside the honeycomb frame when opening and closing the honeycomb frame the structure 1 of the honeycomb frame being according to the invention, shaped to extend through one or more cell frames 7 and to the conical free end 38 in addition to the conicity, to the conical surface a thread 55 of the conical area is shaped. The pitch and shape of the thread 54 of the constant diameter and the thread 55 of the conical area and also the shape of the conical free end 38 is in this beneficial embodiment example such that the opening shaft 36 moves one or more cell strips 8 to the draining position or to the honey collection position after moving inside the honeycomb frame forward by a distance equal to the pitch of the thread. Then when opening the honeycomb frame to the draining position by rotating the opening shaft 36 for instance with a cordless power drill machine and by pushing the opening shaft 36 simultaneously towards inside the honeycomb frame and when the thread 54 of the constant diameter of the opening shaft 36 sets on the thread of the first guide hole 31 of each cell frame 7, each cell frame 7 in question pulls then the opening shaft 36 towards inside the honeycomb frame due to the threaded hole-threaded shaft-connection by a distance of one pitch of the thread during each full revolution of the opening shaft 36 so this threaded structure reduces the thrust required from the user for pushing the opening shaft 36 towards inside the honeycomb frame. In one other beneficial embodiment example of the invention the opening shaft 36 is equipped with otherwise similar thread 54 on the surface of the cylindrical area, but the surface of the conical free end 38 of the opening shaft 36 is threadless and smooth unlike in the previous example. The thread 55 of the conical area on the conical surface in the free end 38 aids the setting of the opening shaft 36 to the threaded first guide hole 31 and to the threaded second guide hole 32 while rotating the opening shaft 36, but of course these threads can be implemented also so that there is no thread 55 on the conical surface or it is for instance shallower by its depth than the thread 54 located in the area of the constant diameter. Also, in this case for the first guide holes 31 and also for the second guide holes 32 it applies that they do not need to form necessarily a fully intact hole but instead just a partial hole so that the mentioned guide holes form for instance an area shown in some embodiments, which resembles the number eight by shape and which comprise several mentioned guide holes and also their different possible combinations.

In one other beneficial embodiment the first edges 40 of the guide protrusion 39 of the cell strips 8 form at least partially the same thread as an internal thread with which same but external thread shaped to the surface of a shaft the outer surface of the opening shaft 36 is equipped with. In this embodiment the threaded area of the cell strip 8 and the first guide hole 31 form together in the draining position an at least partial aperture, which is at least partially threaded, which formed aperture is equipped with a continuous thread onto which thread the opening shaft 36 sets and correspondingly in honey collection position this at least partially threaded aperture of the cell strip 8 and the second guide hole 32 form together an aperture which is equipped with a continuous thread onto which the opening shaft 36 can set. Of course also in one embodiment the threaded aperture is shaped only to the guide protrusions 39 of the cell strips 8 in which case of course the first edge 40 is still the area of the guide protrusion 39 which touches the surface of the conical free end 38 of the opening shaft 36 while the cell strip 8 moves to the draining position and correspondingly the second edge 41 is still that area of the guide protrusion 39 which touches the surface of the conical free end 38 of the opening shaft 36 while the cell strip 8 moves to the honey collection position from the draining position. In this beneficial embodiment the thread is therefore not shaped to the first guide holes 31 or to the second guide holes 32 of the cell frames 7 but instead only to the guide protrusion 39 of the cell strip 8, which forms thus then at least a partial round aperture on the inner surface of which aperture there being a thread. Then the opening shaft 36 sets while being rotated simultaneously onto the thread of the aperture of one or more cell strips 8 and thus also due to this formed threaded mechanism while the opening shaft 36 is rotated, a force that pulls the opening shaft 36 towards inside the honeycomb frame is once again created, which reduces the pushing force required from the user. In this case also the same required pushing force is still needed, but now more work is done by the member, which rotates the opening shaft 36, for instance a cordless power drill machine. In these embodiments of the opening shaft 36 equipped with the thread 54 of the cylindrical area and the thread 55 of the conical area, in some cases it is beneficial to shape the thread of the opening shaft 36 to extend simultaneously onto the threaded apertures of one or more cell strips 8 or cell frames 7 or both or of one or more first guide hole 31 or a second guide hole 32 of the cell frame 7 or at least of one of these guide holes, but the torque needed for rotating the opening shaft 36 increases in this case due to the increase in the length of the thread 54 of the cylindrical area also because of friction in every individual threaded hole resists the rotation of the opening shaft 36 so for instance a thread 54 of the cylindrical area comprising the whole length of a honeycomb frame in the opening shaft 36 is beneficial only in few embodiments. One embodiment of the invention also exists in which the thread 54 of the cylindrical area and in one case also the thread 55 of the conical area is shaped to the opening shaft 36, but the apertures and holes and structures, which the opening shaft 36 pierces and which it touches while piercing them, are not equipped with a thread. This thread 54 of the cylindrical area and the thread 55 of the conical area are beneficial also in this case because also in this embodiment the thread 54 of the cylindrical area aids the protruding of the opening shaft 36 deeper into the honeycomb frame while rotating the opening shaft 36, but on the other hand also it allows slippage when needed, which is beneficial in some cases, especially this allowing of slipping in some cases and in some beekeeping conditions prevents the breakage of the structures and surfaces which are in contact with the opening shaft 36.

Also, in one beneficial embodiment the first guide hole 31 forms a two-part and threaded and at least partial hole together with the guide protrusion 39 the thread of which being formed into the formed formation only in the draining position and correspondingly the second guide hole 32 forms together with the shapes of the guide protrusion 39 a threaded and at least partial hole when the cell strip 8 in question is in the honey collection position.

In one embodiment in addition the opening shaft 36 is equipped with at least partial discontinuous thread due to which the pushing force caused by a threaded connection formed between a threaded hole aperture and a threaded shaft can be timed in numerous different beneficial embodiment variants so that this additional pushing force pushes the opening shaft 36 forward only then when there is a need for it, for instance then when each cell strip 8 is starting the movement towards the draining position from the honey collection position and correspondingly then when starting the movement towards the honey collection position from the draining position.

The conical surface of the opening shaft 36 in the conical free end 38 is also in some beneficial embodiment examples shaped so that the conicity changes in different locations of the conical surface, for instance in one beneficial embodiment so that the conical shape is gradual, that is, the diameter of the cross section of the conical free end 38 increases slowly near the end of the cone, that is, near the tip of the cone so that the starting of the movement of a possibly stuck cell strip 8 with a longer pushing movement can be done using less pushing force and with longer pushing movement and after this when the cell strip 8 is in movement, it moves to the other position, that is, to the draining position or to the honey collection position faster due to the conicity of the conical area of the free conical end 38 changing to steeper in locations more far away from the tip of the cone so that during a pushing movement, which is same length or shorter than before, the cell strip 8 moves a longer distance. Of course, this changing of the conicity can be also smooth so that the shape of the surface of the conical area is curved in which case the transition from slow movement of the cell strip 8 to fast movement of the cell strip 8 is also smooth.

In one beneficial embodiment example of the invention the opening shaft 36 is made of a pipe and replaceable end parts of which a conical end part is spring-like and made of spring material so that it can change its shape/deform elastically like a spring. In addition, this manufacturing of spring material is implemented also in one beneficial embodiment so that conical end part is a coil spring shaped like a conical end part including the shaping for attaching it to the pipe, which conical end part is manufactured also in one other embodiment with an automatic or manual spring bending device. In this beneficial is the rigidity of the structure, which is defined of course by that how stiff the spring is made to be and also the flexibility and also that the spring can be implemented so that its coils are equal by shape for instance to the thread 54 of the cylindrical area, which is in some embodiments in the area of the normal diameter of the opening shaft 36 and also in some embodiments equal to the thread 55 of the conical area in the conical surface of the conical free end 38 in which case in some cases remarkable benefit is achieved in the manufacturing costs of the part comparing to other kinds of similar parts, for instance a similar part manufactured by machining. Of course, also for instance the whole opening shaft 36 can be correspondingly manufactured using spring material to be a coil spring so that it has still the shape of the opening shaft 36.

It is mentioned that the thread 54 of the cylindrical area and the thread 55 of the conical area are right-handed in these embodiments, but of course the structure 1 according to the invention could be implemented also so that the thread 54 of the cylindrical area and the thread 55 of the conical area would be left-handed of course with the required accompanying shaping.

In one beneficial embodiment of the invention the structure according to the invention also comprises end bars in both ends of the honeycomb frame, into one of which end bars a first guide hole 31 and a second guide hole 32 have been shaped. Also, threads have been shaped into these mentioned guide holes. In this embodiment threads are not necessarily needed in the cell frames 7 or other structures pierced by the opening shaft 36 when the thread of the opening shaft 36 is shaped to be so long that it still reaches onto the threads of these mentioned guide holes also while piercing the whole honeycomb frame. Of course this can be implemented also for instance so that both end bars are equipped with both guide holes, the first guide hole 31 and the second guide hole 32, or for instance so that the first guide hole 31 is in one end in its end bar and the second guide hole 32 is in the second end in its end bar.

Also, one embodiment exists in which the opening shaft 36 is shaped to be oval-shaped by its cross section so that the free conical end 38 is still conical and the attachment method of the other end of the opening shaft 36 to the member, which produces the rotating motion, is still as it has been described to be in descriptions of the different embodiments. It is mentioned in this context that the most important shape, which must be round-like by its shape at least so that it rotates in the guide holes and in other structures pierced by the opening shaft 36 smoothly without additional friction or getting stuck, is the area of the normal diameter starting from the conical free end 38, after which the cross section of the opening shaft can be remarkably smaller than the just mentioned area of normal diameter starting from the conical free end 38 and also it can be differently shaped.

It is further mentioned that the structure 1 according to the invention of course functions as it has been described to function in the case of any possible combination of the different embodiments of the invention.

It is mentioned as a special case that the opening shaft 36 according to the invention can be implemented also to be such that it can be pushed inside the honeycomb frame without rotating it also, for instance, by gently tapping the other end 37 of the opening shaft 36 with a hammer.

The first guide hole 31 and the second guide hole 32 shown in the accompanying embodiment examples are shown as round holes or almost round, but into the opening mechanism of the honeycomb frame, which is equipped with a structure 1 according to the invention, a guide protrusion 39 and its edges 40 and 41 can also be shaped conveniently so that the guide holes 31 and 32 are in fact otherwise shaped in any way inside the limits allowed by the dimensions of the honeycomb frame except in vertical direction the height of the first guide hole 31 and the second guide hole is such that the push of the opening shaft 36 into the first guide hole 31 moves when touching the first edges 40 and thus pushing the cell strips 8 the cell strips 8 to the draining position and correspondingly for moving the cell strips 8 back to the honey collection position the height dimension of the second guide hole 32 is such that the push of the opening shaft 36 into the second guide hole 32 when the opening shaft 36 is touching the second edges 41 moves the cell strips 8 back to the honey collection position from the draining position. More precisely, the height dimension of the guide holes 31 and 32 is same as the diameter dimension of the opening shaft 36 so that in a honeycomb frame, which is equipped with a structure 1 according to the invention, in the draining position the cell strips 8 are in that position where they are intended to be. Of course, in this naturally small clearances between parts is taken into account such as the height dimension of the guide holes 31 and 32 is in practice larger by a small amount than the diameter dimension of the opening shaft 36, although which mentioned small amount, which can be called as clearance, cannot be seen with the naked eye. The structure 1 according to the invention can be implemented also in one embodiment so that the height dimensions of the guide holes 31 and 32 differ remarkably from the diameter dimension of the opening shaft 36 in which case the functioning according to the invention is still achieved due to the mutual shaping of the first edges 40 and the second edges 41 of the guide protrusion 39, which touch the opening shaft 36 when the opening shaft 36 is used so that then the guiding tasks of the first and second guide holes 31 and 32 are performed by at least one aperture, which positions the opening shaft 36 in height direction and which is formed by at least one portion of the first guide hole 31 and/or at least one portion of the second guide hole 32 and at least one first edge 40 and/or one second edge 41 of the guide protrusion 39 of the cell strip 8 in upper and/or lower extreme position, that is, in honey collection position or in draining position, but it is then more difficult to use because when the opening shaft 36 is pushed to the first guide hole 31 or to the second guide hole 32, the opening shaft 36 is needed to be aimed to be pushed to the right location more accurately than in the cases of the accompanying beneficial embodiment examples of the invention. For this reason, clearly the round first guide holes 31 and the round second guide holes 32 are most beneficial for the user. In addition, it is worth mentioning that the first guide holes 31 and second guide holes 32 of the shown embodiments are placed often horizontally inline or vertically inline, but of course these can be placed also to some other different mutual position, according to which position of course the guide protrusion 39 has been shaped at given time so that the structure 1 according to the invention functions as it has been described to function in the descriptions of the different embodiments of the invention.

In the accompanying beneficial embodiment examples of the invention the first guide hole 31 and the second guide hole 32 are implemented to the upper portion of the honeycomb frame vertically inline on top of each other. Of course, this location of the guide holes 31 and 32 and their mutual location can be implemented also for instance to the lower portion of the honeycomb frame or for instance to the side in which case of course a corresponding change is needed to be made to the beehive box so that the opening shaft 36 can be still pushed into the guide holes 31 and 32 from outside the beehive box. This can be implemented for instance by placing holes on the locations of the guide holes 31, 32 to the side of the beehive box, which holes can be plugged with a plug if needed. In addition, the guide holes 31, 32 can be placed, if needed, to some other mutual position than vertically inline on top of each other. Also, the quantity of the guide holes 31 and 32 can of course differ from two, for instance one or for instance three holes depending on the shape of the guide aperture 33 of the cell strip 8 of the honeycomb frame. In some embodiments of the invention the first guide hole 31 could be called due to its location, for instance, an upper guide hole or a lower guide hole depending on its location relative to the second guide hole 32 and correspondingly the second guide hole 32 could be also called then an upper guide hole or a lower guide hole.

The exact shape of the first edge 40 and the second edge 51 of the guide protrusion 39 of the cell strips 8 is not of the essence regarding the functioning of the invention otherwise than so that there must be according to one beneficial embodiment of the invention at least one first edge 40 and at least one second edge 41 in a guide protrusion 39 and when the opening shaft 36 touches the first edge 40 of a cell strip 8 and its diameter on the location of that cell strip 8 in question is the size of its normal base diameter, the cell strip 8 in question is already moved to the draining position and correspondingly when the opening shaft 36 touches the second edge 41 and is the size of its base diameter, the cell strip 8 in question is moved already to the honey collection position. Of course, as mentioned earlier, in some embodiments of the invention such as in the spring loaded embodiment there is only a need for at least one first edge 40, but not necessarily any need for even one second edge 41 due to the cell strips 8 returning automatically by means of the spring loading back to the honey collection position.

Furthermore, in one beneficial embodiment example the guide protrusion 39 is supported with one or more support member 42 which connects the guide protrusion 39 and thus connects also at least one first edge 40 and at least one second edge 41 to the cell strip 8 when the first edges 40 and the second edges 41 have been arranged to touch the opening shaft 36 as is described in the descriptions of the different embodiments of the invention. The different embodiments of the invention are of course combinable with each other where applicable. It is mentioned also that the mentioned guide aperture 33 of the embodiment of the cell strip 8, which is equipped with the guide aperture 33, is one embodiment of the guide protrusion 39.

Figure 1:
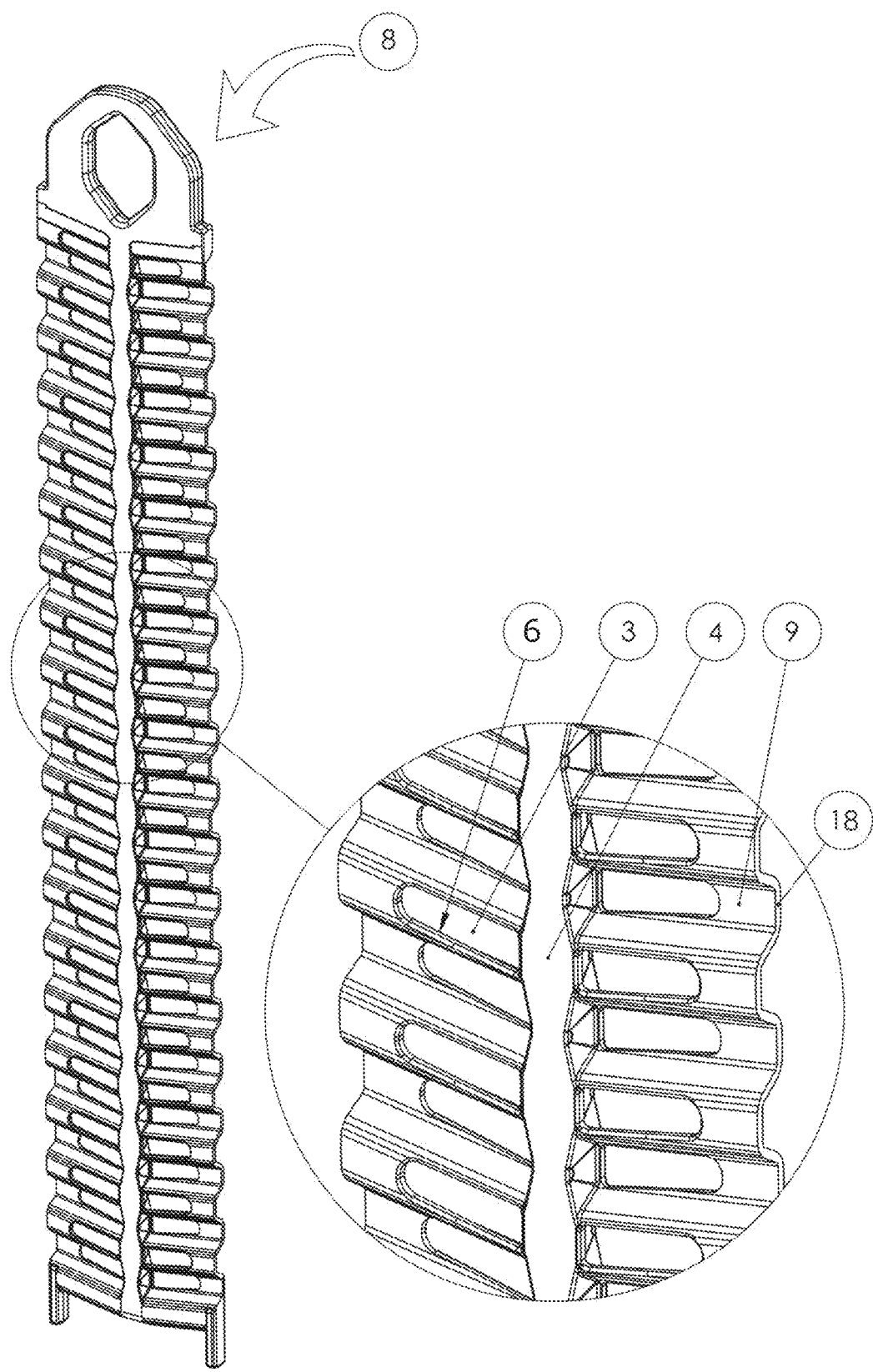
FIG. 1: The drawing shows the structure of the moving part of the honeycomb frame, that is, the cell strip of the honeycomb frame, the structure of which is according to the invention, viewed obliquely from the side and from up and a detail view of the drainage apertures shaped to the wall of the honeycomb of the cell strip.
Figure 2:
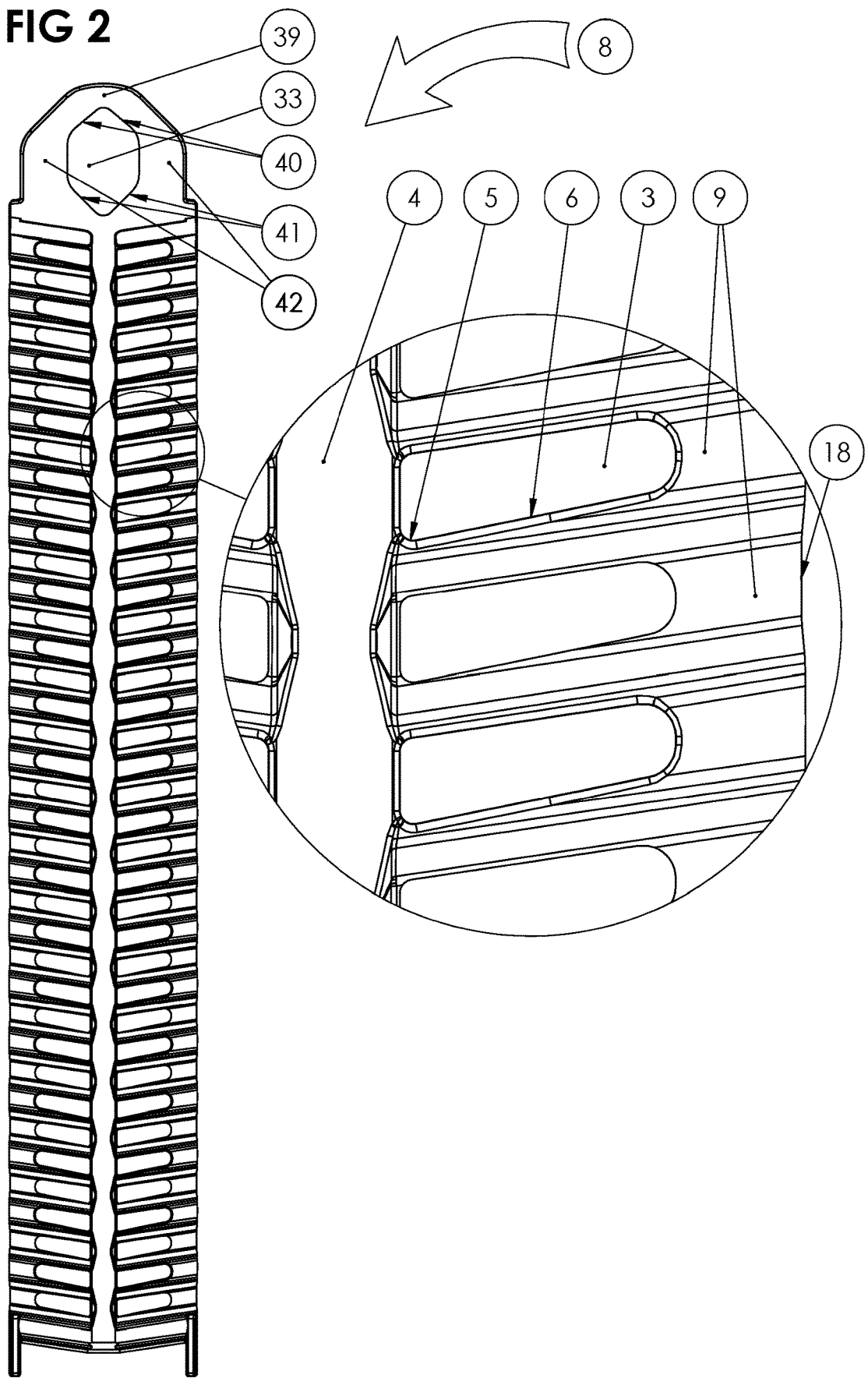
FIG. 2: The drawing shows the structure of the moving part of the honeycomb frame, that is, the cell strip of the honeycomb frame, the structure of which is according to the invention, viewed directly from the front and a detail view of the drainage apertures shaped to the wall of the honeycomb of the cell strip.
Figure 3:
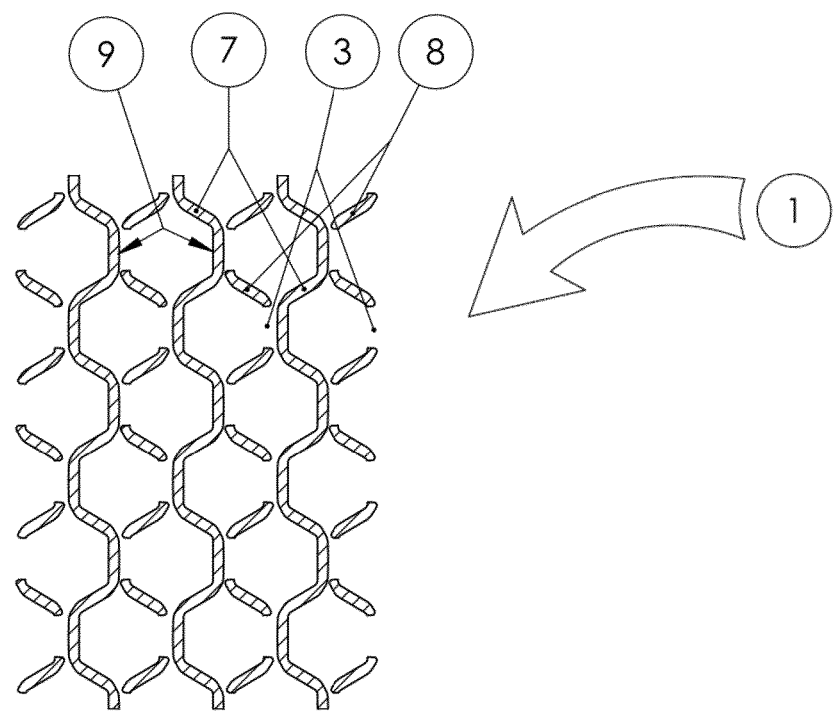
FIG. 3: The drawing shows a section view of a structure of the honeycomb frame according to the invention cut into a section at the location of the drainage apertures and viewed from the front while the honeycomb is in the closed position, that is, in the honey collection position.
Figure 4:
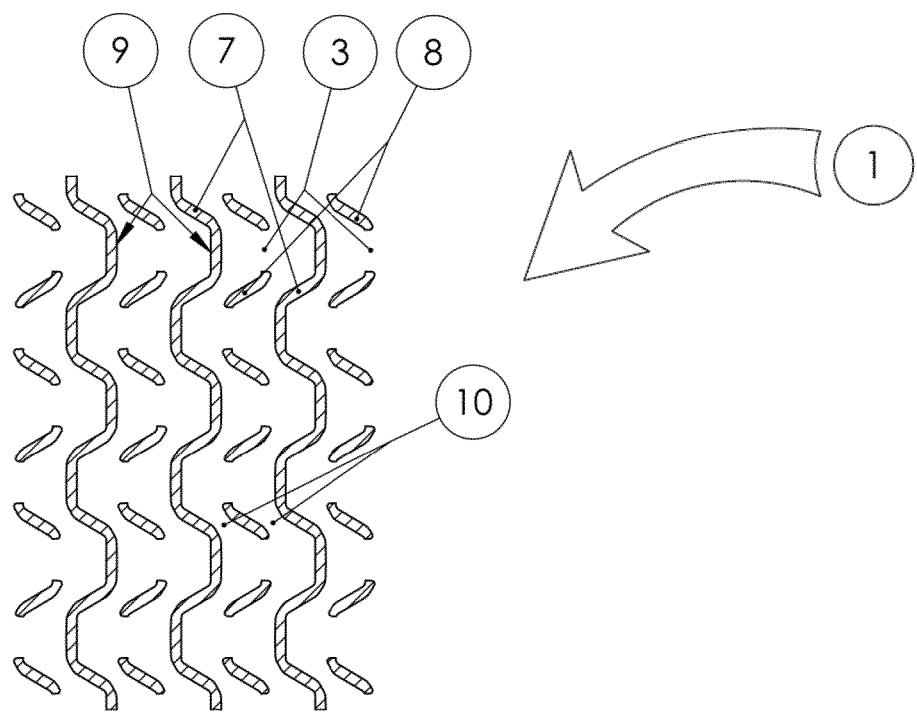
FIG. 4: The drawing shows a section view of a structure of the honeycomb frame according to the invention cut into a section at the location of the drainage apertures and viewed from the front while the honeycomb is in the open position, that is, in the draining position.

In the accompanying beneficial embodiment examples of the invention the guide aperture 33 has a hexagonal shape, which hexagon comprises vertical sides with equal lengths located symmetrically on both sides of the hexagon relative to the vertical centerline of the hexagon and as usual the first edges 40 and the second edges 41, both of which there are for instance in an example shown in drawing FIG. 2 two pieces due to the hexagon being symmetrical regarding its vertical center line. Of course, the guide aperture 33 is possible to be shaped with the necessary accompanying shaping for instance to be oval-shaped or some other way shaped still preserving the same function as the beneficial embodiment example shown in the accompanying embodiment examples.

In an illustrating example shown in drawing FIG. 22 there are three first edges 40 of the guide aperture 33 due to the fact that the bottom and top tips of the hexagonal guide aperture 33 are rounded so that conical free end 38 of the opening shaft 36 touches first the roundening 65 between the two top-located first edges 40 of the hexagon in question when opening the honeycomb frame to the draining position and after that only when the opening shaft 36 is pushed deeper it touches the two top-located first edges 40. Correspondingly when moving the honeycomb frame back to the honey collection position the free end 38 touches first the roundening 66 between the two second edges 41 and only after that it touches the two second edges 41.

In the accompanying embodiment examples the guide aperture 33 of the cell strip 8 is a symmetrical hexagon which symmetrical in vertical direction, the two of its sides, the left vertical side and the right vertical side are vertical relative to the honeycomb frame and they have equal lengths. Two sides located in the top portion of this hexagon are the left top side and the right top side and the two sides in the lower portion of the hexagon are the left bottom side and the right bottom side. The bottom sides and the top sides of this hexagonal shape of the guide aperture 33 have equal lengths in the accompanying beneficial embodiment examples and in addition the vertical sides have equal lengths with each other, but of course a structure equipped with the same function can be implemented also so that the lengths of the sides of the hexagon differ from this example in any possible combination of different sides having different lengths. In the accompanying embodiment examples the top tip and the bottom tip of the hexagonal shape of the guide aperture 33 and also the other tips of the hexagonal shape are shaped as rounded for durability, but of course they could be shaped also to have other shapes, for instance sharp, still maintaining the same functioning of the invention.

The guide aperture can be of course implemented also as rectangular so that the rectangle is missing the vertical sides of the hexagon shown in the accompanying examples. This shape of course requires especially in the lateral direction larger outer dimensions for the upper portion of the cell strip 8 to ensure the sufficient rigidity for the upper portion, which may increase the outer dimensions of the upper portion of the cell frame 7 due to the required accompanying shaping of the other components. Of course, similarly with shaping, for instance by roundening the tips of the rectangle in question the need for additional lateral space can be decreased remarkably in which case the shape of the rectangle would resemble an oval hole or aperture the top ends and bottom ends of which having a round shape. Of course, also the guide aperture 33 can be implemented also having some other shape as long as it has at least one first edge 40 and at least one second edge 41, which can be in some embodiments also the same edge. In addition, of course the guide aperture 33 does not need to be one continuous aperture but instead it can comprise several separate aperture-like entities still functioning of course as it has been described to function in the description of this invention.

The guide protrusion 39 and the support members 42, which are located usually due to rigidity on both sides of the guide protrusion 39, form in several accompanying beneficial embodiments of the invention a rectangular or rectangle-resembling aperture, the vertical sides of which form the support members 42 and an upper horizontal side is formed by the guide protrusion 39 and the lower horizontal side is in several examples part of the base structure of the cell strip 8. In addition, in several examples the upper edge of this upper horizontal side is the second edge 41 or the first edge 40 and the lower edge of the horizontal upper side is the first edge 40 or the second edge 41. In one beneficial embodiment of the invention however this mentioned aperture is a round hole in which case the guide aperture 39 and the support members 42 are shaped as the edge of this hole and the lower edge of this aperture is part of the base structure of the cell strip 8. It is further mentioned about the edges of the guide protrusion 39 that it is beneficial that these edges are rounded so the guide protrusion and/or the surfaces of the opening shaft 36 that touch the guide protrusion 39 wear in use as little as possible.

Examples of beneficial shapes of the guide protrusion 39 and the mutual locations of the guide holes 31 and 32 are shown in drawings FIG. 10A to FIG. 14B in which especially as an embodiment variant that lowers the honeycomb frame, which is equipped with a structure 1 according to the invention, is mentioned that the guide holes 31 and 32 are placed horizontally inline side by side, of which two examples are shown in lower position and upper position in drawings FIG. 10A to FIG. 11B. In practice the name of the first guide hole 31 comes from that when the opening shaft is pushed into it, the cell strips 8 move from the honey collection position to the draining position and the name from the second guide hole 32 comes from that when the opening shaft 36 is pushed into it, the cell strips 8 move from draining position to the honey collection position. For a person skilled in the art it is of course clear based on the embodiments of this invention that a honeycomb frame, which is equipped with a structure according to the invention, functions as it is described to function in the description of the invention even though the honey collection position would be the so-called upper extreme position of the cell strip 8, that is, the upper position and the draining position would be lower extreme position of the cell strip 8, that is, the lower position. In the accompanying embodiment examples of the invention the honey collection position is in all examples the lower position mostly due to the fact that this way implemented the cell strips 8 stay also in the beginning when they are clean due to gravity conveniently in the honey collection position without a need to hold them in place in the honey collection position for instance with the help of an opening shaft 36 pushed into the honeycomb frame. Of course, as it is mentioned in the description, also other embodiments of the invention exist in which the upper position is the most beneficial to be the honey collection position. It is further mentioned that a honeycomb frame according to the beneficial embodiment examples of the structure 1 according to the invention shown in the accompanying drawings can easily regarding its structure to be turned even upside down and it functions still as it has been described to function as long as the honey channel 30 is shaped in this case also below the formed honeycomb, which location below is of course due to gravity which causes the honey to drain in the honeycomb downwards towards the earth.

In some beneficial embodiments of the invention depending on that how easily the cell strips 8 are opened/move to the draining position, it is beneficial to place more than one first guide hole 31 to the structure and also more than one second guide hole 32 to the structure. Then due to the material and stiffness of the cell strips 8 the guide protrusion 39 in the cell strips 8 may deform so that for instance one first guide hole 31 placed symmetrically in the center of the structure is not enough to open the honeycomb frame to the draining position, because due to the earlier described cell strips 8 being stuck and due to the elastic material and flexible structure of the cell strip 8 the guide protrusion 39 and/or the support members 42 of the guide protrusion 39 deform so that in the case of one first guide hole 31 and possibly also in the case of one second guide hole 32 eventually the opening shaft 36 in fact is extended inside the first guide hole 31 through the whole honeycomb frame, but the honeycomb frame would be still due to deformation at least partially in the honey collection position. As a solution for this possible problem situation the structure 1 according to the invention can be equipped with more than one first guide hole 31 and second guide hole 32, which first guide holes 31 when placed horizontally inline side by side and as near to the support members 42, which support the guide protrusion 39, as possible, they force due to greater rigidity when the opening shaft 36 is inside the first guide hole 31 the cell strip 8 to move to the draining position. Also, in this case it is beneficial in the structure 1 according to the invention to place the second guide holes 32 as near as possible to the support members 42 of the guide protrusions 39 for the same reason although getting stuck is of course remarkably more severe to the honey collection position naturally. For this reason, most beneficial also in this structure 1 according to the invention is to shape the guide protrusion 39 of the cell strip 8 and its support members 42 to be as rigid as possible so that for instance only one first guide hole 31 and one second guide hole 32 are sufficient for moving the structure in question from the honey collection position to the draining position and from the draining position to the honey collection position. In addition, in some embodiments one of the guide holes, for instance the first guide hole 31 is placed to the upper portion of the cell frame 7 and the second guide hole 32 is placed to the lower portion of the cell frame 7 or, say, the other way around, in which case the structure 1 according to the invention functions of course still as it has been described to function in the descriptions of the different embodiment variants of the invention.

Figure 7:
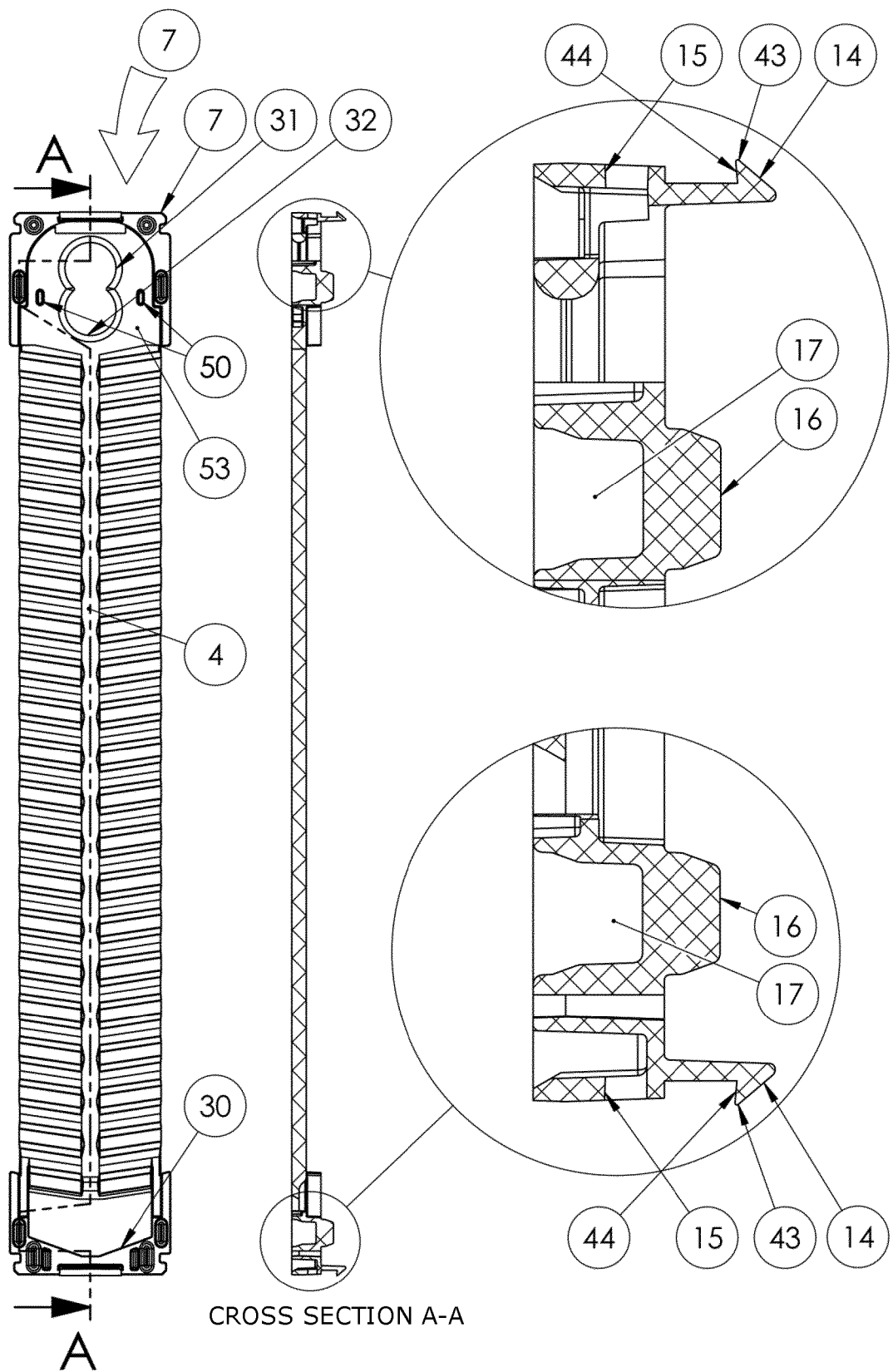
FIG. 7: The drawing shows a cell frame equipped with fastening members according to one embodiment of the invention viewed directly from the front and a cut section view of the cell frame and magnifications of the lower portions and upper portions of the cell frame, that is, the bottom ends and the top ends of the cell frame.

In the accompanying embodiment of the cell frame 7 shown in drawing FIG. 7 in which the first guide hole 31 and the second guide hole 32 are placed on top of each other vertically inline, these guide holes 31 and 32 are placed to so near each other that they form a continuous aperture the shape of which resembles the number eight, more precisely the outer edges of the number eight. The same forming of a partially continuous area is also possible in practice due to lack of space for the first guide hole 31 and the second guide hole 32 when they are placed horizontally inline and also in the case there are more than one first guide hole 31 and more than one second guide hole 32 in the structure in which case also for instance the first guide holes 31 and the second guide holes 32 can form, if needed, continuous apertures, which typically resemble the number eight, with each other or similarly the first guide holes 31 and the second guide holes 32 can form continuous apertures so that one this kind of aperture comprises at least one first guide hole 31 and at least one second guide hole 32. A limit in the forming of the areas mentioned here is of course that how this kind of continuous aperture is implemented so that the edges of the aperture still lock in height-direction and, when needed, in the case of multiple first guide holes 31 and second guide holes 32 also in horizontal direction the opening shaft 36 to the correct position taking into account that it is beneficial to rotate the opening shaft 36 by hand or for instance using an electrically operated device. One most simple and in some cases of the honeycomb formed by the cell frame 7 and the cell strip 7 the most beneficial embodiment is that the first guide hole 31 is in fact open throughout its whole area and in horizontal direction only limited by the outer dimensions of the cell frame 7 of the honeycomb frame and in height-direction limited to have its height same as the base diameter dimension of the opening shaft 36. Then the opening shaft 36 can be rotated and moved same time in the horizontal direction while the opening shaft 36 already extends through the whole honeycomb frame. In this example case of course also the second guide hole 32 can be shaped to have the same shape as the first guide hole 32, but it can be of course shaped to have different shape than this if needed.

It is further mentioned that a fast and easy opening of the honeycomb is achieved with the mentioned embodiments according to the invention and thus savings are achieved in usage of force/energy in the case of the usual/manual opening of the honeycomb in which case also energy can be saved in the embodiments of the automatic opening when opening the honeycomb. Then also the stuck structures can be opened by using less force.

The beehive boxes 23 according to the accompanying embodiments of the invention and other components such as the intermediary bottom part 27 and the intermediary platform 24 and the lid 25 can be coated for instance by painting or by spraying with bio-based material such as wood-based or some other wood-imitating organic material. Especially the coating of the inner surfaces of the components of the beehive, which surfaces are located inside the beehive, with a wood-based material is beneficial for the bees. The surfaces of the components of the beehive, which are located outside the beehive, can also of course be coated with this material, but it is also beneficial to paint them with water-based paint, which paint is suitable for the local beekeeping conditions.

All the presented different embodiments of the invention are combinable with each other where applicable.

One embodiment of the structure of the honeycomb frame according to the invention also exists in which instead of an electric motor, the rigid opening shaft 36 is rotated by means of pressurized gas, such as compressed air. In addition, the opening shaft 36 can be rotated of course using any device, which produces rotating motion.

The invention claimed is:

1. A structure of a honeycomb frame, which structure comprises:
    at least an opening mechanism;
    one or more cell frame and one or more cell strip placed one after the other,
    each cell strip placed into a space or a groove shaped for said cell strip in the one or more cell frame, and
    the one or more cell frame attached to each other by means of fastening members, and forming together a plurality of honeycombs of the honeycomb frame in a honey collection position and which the honeycomb is arranged to be switched with the help of the one or more cell strips from a honey collection position to a draining position and from the draining position to the honey collection position; and
    an opening mechanism comprising an opening shaft with a longitudinal axis and a conical free end with a conical surface, said opening shaft being enabled by being pushed or simultaneously pushed and continuously rotated around said longitudinal axis, at least one first guide hole shaped to the cell frame, at least one second guide hole shaped to the cell frame, guide protrusions shaped to the cell strip, and support members of the guide protrusion arranged to function so that the cell strips can be moved from the honey collection position to the draining position by pushing the opening shaft through the at least one first guide hole while axially pushing or simultaneously pushing and continuously rotating about the longitudinal axis of the opening shaft with the opening shaft touching the guide protrusions of the cell strips so that each at least one first edge of each guide protrusion is arranged to touch the conical surface of the free end of the opening shaft due to the axial push or simultaneous push and continuous rotation of the opening shaft to thereby move each cell strip of the honeycomb frame to the draining position, one by one, and correspondingly in the structure the cell strips are arranged to be moved to the honey collection position from the draining position while by pushing or simultaneously pushing and continuously axially rotating the opening shaft through the second guide holes and by the conical surface of the free end of the opening shaft touching the due to the axial push or simultaneous push and continuous rotation of the opening shaft, at least one second edge of each guide protrusion, when the touch of the conical surface of the free end of the opening shaft to the at least one second edge of each guide protrusion and while pushing or simultaneously pushing and continuously axially rotating the opening shaft simultaneously into the cell strip is arranged to move the cell strips to the honey collection position, wherein an amount of movement of each cell strip corresponds to an amount of the axial push or simultaneous push and continuous rotation of the opening shaft with the conical free end.

2. The structure of a honeycomb of claim 1, wherein, said opening shaft is enabled by being simultaneously pushed and rotated around said longitudinal axis, the at least one first guide hole, the at least one second guide hole, the guide protrusions, and the support members arranged to function so that the cell strips are movable from the honey collection position to the draining position by pushing the opening shaft through the at least one first guide hole while axially pushing and rotating about the longitudinal axis of the opening shaft with the opening shaft touching the guide protrusions of the cell strips so that each at least one first edge of each guide protrusion touches the conical surface of the free end of the opening shaft due to the axial push and rotation of the opening shaft to thereby move each cell strip of the honeycomb frame to the draining position, one by one, and correspondingly in the structure the cell strips are arranged to be moved to the honey collection position from the draining position by pushing and while axially rotating the opening shaft through the second guide holes and by the conical surface of the free end of the opening shaft touching the due to the axial push and rotation of the opening shaft, the at least one second edge of each guide protrusion, when the touch of the conical surface of the free end of the opening shaft to the at least one second edge of each guide protrusion and pushing and while axially rotating the opening shaft simultaneously into the cell strip is arranged to move the cell strips to the honey collection position, wherein an amount of movement of each cell strip corresponds to an amount of the axial push and rotation of the opening shaft with the conical free end.

3. The structure of a honeycomb frame of claim 1, wherein, at least to an area of its normal diameter starting from the free end, a thread of a cylindrical area has been shaped, which thread of the cylindrical area at least partially has been shaped to a hole or aperture formed by the guide protrusion of the cell strip and/or at least to one of the guide holes of the cell frame, the first guide hole or the second guide hole, and the thread of the cylindrical area has been shaped to have a length of an inner threaded surface of one or more at least partially formed threaded hole.

4. The structure of a honeycomb frame of claim 3, wherein, the conical surface of the free end of the opening shaft is equipped at least partially with a thread of the conical area.

5. The structure of a honeycomb frame of claim 3, wherein, one end of the opening shaft is arranged to be connected to a cordless power drill machine or similar electrically or pneumatically operated device or some other device operated using some type of fuel, which device produces pushing or simultaneous pushing and continuous rotating motion.

6. The structure of a honeycomb frame of claim 4, wherein, one end of the opening shaft is arranged to be connected to a cordless power drill machine or similar electrically or pneumatically operated device or some other device operated using some type of fuel, which device produces pushing or simultaneous pushing and continuous rotating motion.

7. The structure of a honeycomb frame of claim 3, wherein, the one or more cell strip is spring loaded and attached to each cell frame by a loading member so that without the opening shaft pushed through the first guide holes or the second guide holes of the structure and through the whole honeycomb frame, the cell strips are pressed by spring loading to the honey collection position or to the draining position.

8. The structure of a honeycomb frame of claim 4, wherein, the one or more cell strip is spring loaded and attached to each cell frame by a loading member so that without the opening shaft pushed through the first guide holes or the second guide holes of the structure and through the whole honeycomb frame, the cell strips are pressed by spring loading to the honey collection position or to the draining position.

9. The structure of a honeycomb frame of claim 1, wherein, one end of the opening shaft is arranged to be connected to a cordless power drill machine or similar electrically or pneumatically operated device or some other device operated using some type of fuel, which device produces push or simultaneous push and continuous rotating motion with forward pushing impact.

10. The structure of a honeycomb frame of claim 9, wherein, the one or more cell strip is spring loaded and attached to each cell frame by a loading member so that without the opening shaft pushed through the first guide holes or the second guide holes of the structure and through the whole honeycomb frame, the cell strips are pressed by spring loading to the honey collection position or to the draining position.

11. The structure of a honeycomb frame of claim 1, wherein, the one or more cell strip is spring loaded and attached to each cell frame by a loading member so that without the opening shaft pushed through the first guide holes or the second guide holes of the structure and through the whole honeycomb frame, the cell strips are pressed by spring loading to the honey collection position or to the draining position.

12. The structure of a honeycomb frame of claim 1, wherein, a height dimension of at least one aperture that positions the opening shaft while used and the aperture being defined by the first guide hole and the second guide hole or the first edge and the first guide hole or the first edge and a portion of the first guide hole or the second edge and at least a portion of the second guide hole or any combination of these is equal to the base diameter dimension of the opening shaft or larger than that and the shape of the aperture is such that the opening shaft can be pushed through the first guide holes and the second guide holes.

13. The structure of a honeycomb frame of claim 1, wherein, the cell strip is equipped with a guide aperture and at least one of the edges of the guide aperture is the first edge of the guide protrusion and at least one of the edges of the guide aperture is the second edge of the guide protrusion.

14. The structure of a honeycomb frame of claim 1, wherein, a drainage aperture is shaped to selected locations to the vertical sidewall of at least one honey cell of the halves of the honeycomb formed by the cell frame and the cell strip, which drainage aperture comprises at least partially the vertical sidewall of a honey cell so that the adjacent gaps between adjacent cell frames and cell strips form a passageway between each other when the cell strips of a honeycomb frame are in the draining position.

15. The structure of a honeycomb frame of claim 14, wherein the drainage apertures are shaped so that the tip of the drainage apertures is pointed obliquely towards inside the honeycomb towards the middle base frame and downwards.

16. A honeycomb frame system, which is equipped with at least one beehive box, wherein, in the honeycomb frame system at least one honeycomb frame according to claim 1 is arranged inside at least one said beehive box.

17. A structure of a honeycomb frame, which structure comprises:
at least an opening mechanism;
one or more cell frame and one or more cell strip placed one after the other,
each cell strip placed into a space or a groove shaped for said cell strip in the one or more cell frame, and
the one or more cell frame attached to each other by means of fastening members, and forming together a plurality of honeycombs of the honeycomb frame in a honey collection position and which the honeycomb is arranged to be switched with the help of the one or more cell strips from a honey collection position to a draining position and from the draining position to the honey collection position; and
an opening mechanism comprising an opening shaft with a longitudinal axis,
at least one first guide hole shaped to the cell frame, at least one second guide hole shaped to the cell frame, guide protrusions shaped to the cell strip, and support members of the guide protrusion arranged to function so that the cell strips can be moved from the honey collection position to the draining position by pushing the opening shaft through the at least one first guide hole while axially rotating about the longitudinal axis of the opening shaft with the opening shaft touching the guide protrusions of the cell strips so that each at least one first edge of each guide protrusion is arranged to touch the opening shaft due to the axial rotation of the opening shaft to thereby move each cell strip of the honeycomb frame to the draining position, one by one, and correspondingly in the structure the cell strips are arranged to be moved to the honey collection position from the draining position by pushing while axially rotating the opening shaft through the second guide holes and by the opening shaft touching the due to the axial rotation of the opening shaft, at least one second edge of each guide protrusion, when the touch of the opening shaft to the at least one second edge of each guide protrusion and pushing while axially rotating the opening shaft simultaneously into the cell strip is arranged to move the cell strips to the honey collection position, wherein an amount of movement of each cell strip corresponds to an amount of the axial rotation of the opening shaft,
wherein, a free end of the opening shaft is conical with a conical surface and at least to an area of its normal diameter starting from the free end, a thread of a cylindrical area has been shaped, which thread of the cylindrical area at least partially has been shaped to a hole or aperture formed by the guide protrusion of the cell strip and/or at least to one of the guide holes of the cell frame, the first guide hole or the second guide hole, and the thread of the cylindrical area has been shaped to have a length of an inner threaded surface of one or more at least partially formed threaded hole.

18. The structure of a honeycomb frame of claim 17, wherein, the conical surface of the free end of the opening shaft is equipped at least partially with a thread of the conical area.

19. A structure of a honeycomb frame, which structure comprises:
at least an opening mechanism;
one or more cell frame and one or more cell strip placed one after the other,
each cell strip placed into a space or a groove shaped for said cell strip in the one or more cell frame, and
the one or more cell frame attached to each other by means of fastening members, and forming together a plurality of honeycombs of the honeycomb frame in a honey collection position and which the honeycomb is arranged to be switched with the help of the one or more cell strips from a honey collection position to a draining position and from the draining position to the honey collection position; and
an opening mechanism comprising an opening shaft with a longitudinal axis,
at least one first guide hole shaped to the cell frame, at least one second guide hole shaped to the cell frame, guide protrusions shaped to the cell strip, and support members of the guide protrusion arranged to function so that the cell strips can be moved from the honey collection position to the draining position by pushing the opening shaft through the at least one first guide hole while axially rotating about the longitudinal axis of the opening shaft with the opening shaft touching the guide protrusions of the cell strips so that each at least one first edge of each guide protrusion is arranged to touch the opening shaft due to the axial rotation of the opening shaft to thereby move each cell strip of the honeycomb frame to the draining position, one by one, and correspondingly in the structure the cell strips are arranged to be moved to the honey collection position from the draining position by pushing while axially rotating the opening shaft through the second guide holes and by the opening shaft touching the due to the axial rotation of the opening shaft, at least one second edge of each guide protrusion, when the touch of the opening shaft to the at least one second edge of each guide protrusion and pushing while axially rotating the opening shaft simultaneously into the cell strip is arranged to move the cell strips to the honey collection position, wherein an amount of movement of each cell strip corresponds to an amount of the axial rotation of the opening shaft, wherein, the one or more cell strip is spring loaded and attached to each cell frame by a loading member so that without the opening shaft pushed through the first guide holes or the second guide holes of the structure and through the whole honeycomb frame, the cell strips are pressed by spring loading to the honey collection position or to the draining position.

20. A structure (1) of a honeycomb frame, comprising:
an opening mechanism;
one or more cell frames (7);
one or more cell strips (8),
said one or more cell frames (7) and one or more cell strips (8) placed one after the other, each cell strip (8) placed into a space or a groove (45) shaped for that cell strip (8) in a cell frame (7); and
fastening members, the one or more cell frames (7) being attached to each other by the fastening members and forming together the honeycomb of a honeycomb frame in the honey collection position and which the honeycomb is arranged to be switched with the help of one or more cell strips (8) from a honey collection position to a draining position and from the draining position to the honey collection position, wherein,
the opening mechanism comprises
an opening shaft (36) with a free end,
at least one guide hole (31),
at least one second guide hole (32),
which are shaped to the cell frame (7), and
guide protrusion (39) shaped to the cell strip (8) and support members (42) of the guide protrusion (39),
wherein the structure (1) is arranged to function by the opening shaft (36) so that
the cell strips (8) move from the honey collection position to the draining position one by one by pushing said opening shaft (36) through the first guide holes (31),
by the conical surface of the free end of the opening shaft touching the guide protrusions (39) of the cell strips (8) one by one, while each at least one first edge (40) of each guide protrusion (39) is arranged to touch the opening shaft (36) in ones turn and
said opening shaft (36) being arranged to then move each cell strip (8) one by one of the honeycomb frame to the draining position, and
wherein correspondingly the structure (1) being arranged to function so that by the opening shaft (36)
the cell strips (8) move one by one to the honey collection position from the draining position by
pushing the opening shaft (36) through the second guide holes (32) and
by the conical surface of the free end of the opening shaft touching the guide protrusions (39) of the cell strips (8), while each at least one second edge (41) of each guide protrusion (39) is arranged to touch the opening shaft (36) in ones turn, and
said opening shaft (36) being arranged to then move each cell strip (8) of the honeycomb frame one by one to the honey collection position,
wherein the opening mechanism comprising said opening shaft (36) with longitudinal axis and a conical free end with a conical surface, said opening shaft (36) being enabled by while being pushed or simultaneously continuously pushed and rotated around its said longitudinal axis of the opening shaft (36),
to move one by one each cell strip (8) of the honeycomb frame
from said honey collection position to said draining position while being applied to the first guide holes (31), and
from said draining position to said honey collection position while being applied to the second guide holes (32).

* * * * *